United States Patent [19]
Carpenter-Smith et al.

[11] Patent Number: 5,838,973
[45] Date of Patent: Nov. 17, 1998

[54] SYSTEM AND METHOD FOR INTERACTIVELY TRANSFORMING A SYSTEM OR PROCESS INTO A VISUAL REPRESENTATION

[75] Inventors: Theodore R. Carpenter-Smith, St. Charles; Michael John Gombar, Elburn; James B. Fisher, Naperville; Thomas M. Barfield, El Grove, all of Ill.

[73] Assignee: Andersen Consulting LLP, Chicago, Ill.

[21] Appl. No.: 642,782

[22] Filed: May 3, 1996

[51] Int. Cl.⁶ .............................. G06F 9/40; G06T 15/00
[52] U.S. Cl. ..................... 395/701; 395/705; 395/710; 395/500; 395/682; 395/685; 395/200.35; 345/326; 345/329; 345/331; 345/333; 345/334; 345/335; 345/419; 345/418; 345/433; 345/961; 345/967
[58] Field of Search ................................. 395/701, 705, 395/710, 682, 685, 500, 200.35; 345/326, 329, 333, 334, 419, 418, 425, 433, 440, 473, 331, 335, 952, 961, 967, 976, 977

[56] References Cited

U.S. PATENT DOCUMENTS

| | | | |
|---|---|---|---|
| 5,519,862 | 5/1996 | Schaeffer et al. | 395/701 |
| 5,530,864 | 6/1996 | Matheny et al. | 395/682 |
| 5,680,619 | 10/1997 | Gudmundson et al. | 395/701 |
| 5,682,468 | 10/1997 | Fortenbery et al. | 345/419 |

OTHER PUBLICATIONS

Advanced Visual Systems, Abstract: "Advanced Visual Systems Enters Commerical Data Mining with Revmaped Version of AVS/Express", Source: Computergram International, pp. N/A, ISSN: 0268–716X, Oct. 1995.

"Sun Continues To Resist OpenGL Tide", Lee Bruno, Source: Open Systems Today, pp. S1, ISSN: 1061–0839, Nov. 1994.

"Graphical Frontiers", Jon Vogler, Source: UNIX News, p. 26, ISSN: 0956–2753, Nov. 1995.

"WorldToolKit User's Guide", Version 2.02, Senses Corporation; (Copyright page, Table of Contents, Chapter 1) Mar. 25, 1994.

WoldToolKit for Windows version 2.04 Relfase Notes, Senses Corporation Jun. 23, 1995.

"Drag–1100" User's Manuel, Kelro Software (Copyright page, Table of Contents, Introduction pp. 1–3) 1994.

*Primary Examiner*—Emanuel Todd Voeltz
*Assistant Examiner*—Tuan Q. Dam
*Attorney, Agent, or Firm*—Merchant, Gould, Smith, Edell, Welter & Schmidt, P.A.

[57] ABSTRACT

A computerized modeling system is provided. The present invention is a computer-implemented, interactive, real-time software tool, for physically transforming a system or process into a visual representation. The software tool includes a class developer for interactively developing the visual representation in real time. The visual representation is physically embodied in a computer-readable medium for visualization on a computer display device, and includes at least one of a class, a class behavior, a class attribute, a collaboration, and a collaboration message flow. The software tool also includes a three-dimensional visual representation module for displaying a three-dimensional depiction of the visual representation on the display device.

101 Claims, 42 Drawing Sheets

SYSTEM AND METHOD FOR INTERACTIVELY TRANSFORMING A SYSTEM OR PROCESS INTO A VISUAL REPRESENTATION

FIELD OF THE INVENTION

The present invention relates to computerized system modeling, and more particularly to an interactive, real-time software tool for physically transforming a system or process into a visual representation.

BACKGROUND OF THE INVENTION

System "modeling" refers to the representation of a process or system that attempts to relate a part or all of the variables in the process or system so that a better understanding of the system is attained. An "object" is a component or element of the model being represented, and is made of methods and data. The present invention provides a software tool to facilitate object model creation and visualization.

The process or system is physically transformed into an object-oriented visual representation that allows it to be viewed and manipulated in a variety of ways. The software tool guides users through the object modeling process, while capturing the necessary information to build object models. The tool allows creation and representation of system or process models in a two-dimensional space.

The tool also allows creation and representation of the system or process model in a three-dimensional space. Visualizing models in a three-dimensional space provides users the opportunity to validate their models by analyzing the amount of emphasis that is placed on each object. Most importantly, changes made in either the two or three-dimensional views are reflected in the other. For example, it may be desirable to include a new class as an object in the two-dimensional space. A corresponding three-dimensional object is automatically created in the three-dimensional space, in real-time, to allow an instant three-dimensional view of the new class and its surroundings. This real-time relationship provides a powerful interactive modeling system.

The present invention offers these and other advantages and benefits, as will become apparent from the following detailed description, drawings, and appended claims.

SUMMARY OF THE INVENTION

A novel computerized modeling system is provided. The present invention is an interactive, real-time software tool, implemented by a computer, for physically transforming an applied object-oriented programming (OOP) based system or process into a visual representation. The software tool includes a class developer for interactively developing the visual representation in real time. The visual representation is physically embodied in a computer-readable medium for visualization on a computer display device, and includes at least one of a class, a class behavior, a class attribute, a collaboration, and a collaboration message flow. The software tool also includes a three-dimensional visual representation module for displaying a three-dimensional depiction of the visual representation on the display device. In one embodiment of the invention, the software tool also includes a common data model maintainer, for automatically maintaining a common data model of the object-oriented visual representation in order to simultaneously reflect development of the common data model throughout the software tool.

These and various other features as well as advantages which characterize the present invention will be apparent upon reading of the following detailed description and review of the associated drawings.

DETAILED DESCRIPTION OF THE PREFERRED EMBODIMENTS

System "modeling" refers to the representation of a process or system that attempts to relate a part or all of the variables in the process or system so that a better understanding of the system is attained. An "object" is a component or element of the model being represented, and is made of methods and data. The present invention provides a mechanism for modeling many different processes or systems, including business processes, databases, network architectures, and client-server architectures. The process or system is physically transformed into an object-oriented visual representation that allows the process or system to be viewed and manipulated in a variety of ways.

The process or system to be modeled includes requirements. For example, a model for an airline reservation system would include various business requirements that define how the system should work. The Object Technology Visualization (OTV) software tool guides the user through the object modeling process, while capturing the necessary information to build object models. While building object models, users are able to view their model in a two-dimensional and a three-dimensional representation. Visualizing models in three dimensions provides users the opportunity to validate their models by, among other things, analyzing the emphasis placed on each object, and analyzing the associations with other objects.

Figure 1:
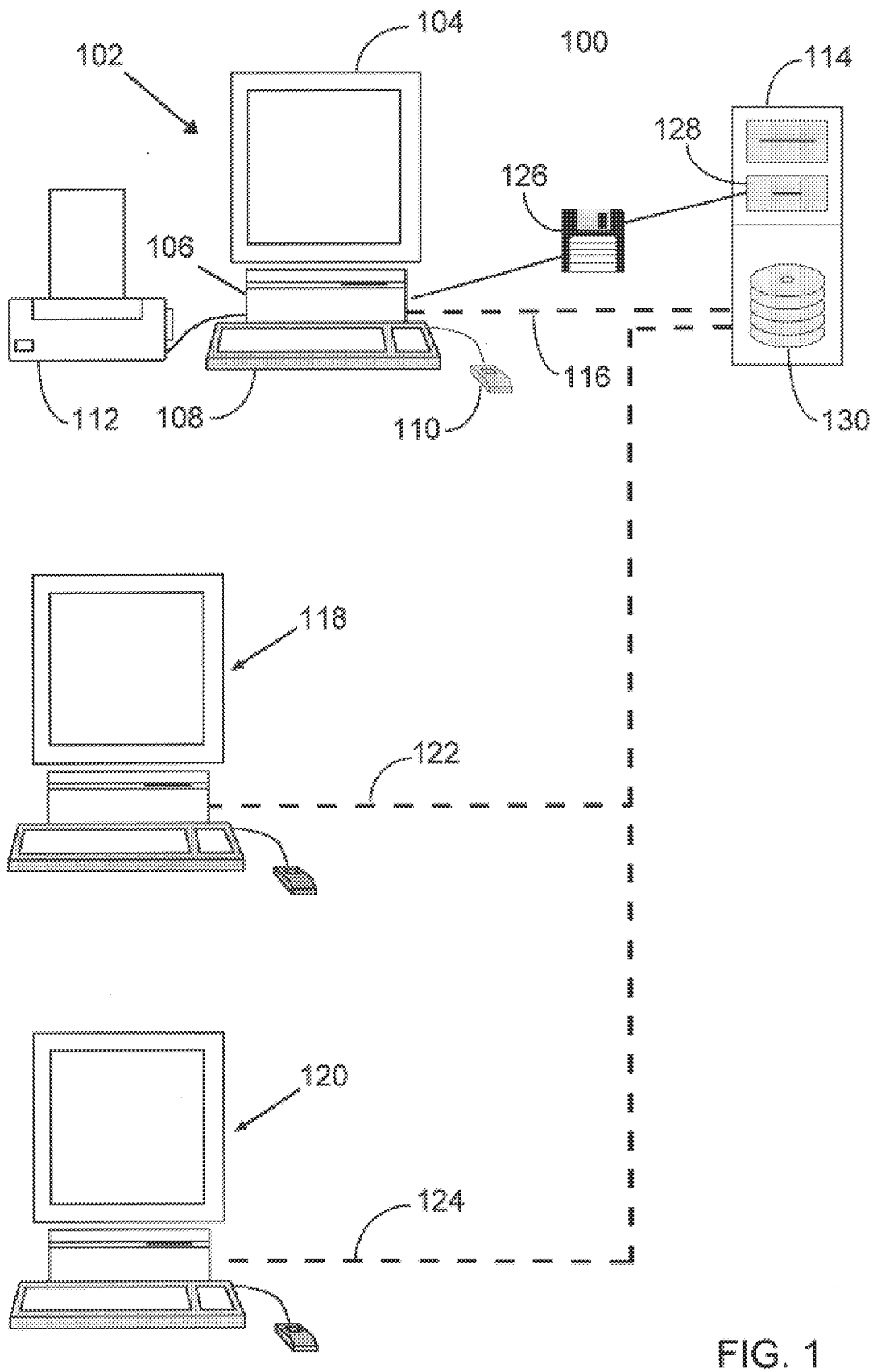
FIG. 1 illustrates the Object Technology Visualization (OTV) system environment of the preferred embodiment.

FIG. 1 illustrates the Object Technology Visualization (OTV) system environment 100. Computer 102 is shown as a stand-alone computing device, having a visual display device 104, a processing unit 106, a keyboard 108 and a pointing device 110. Computer 102 is connected to printing device 112 to allow hardcopy documents to be printed from the OTV system. The OTV system environment 100 may also be connected in a network configuration, where server 114 services a number of terminals for providing user interfaces for multiple users. Server 114 can be coupled to computer 102 as seen by dashed line 116, and can be connected to other terminals 118 and 120 as shown by dashed lines 122 and 124. The computer 102 and terminals 118 and 120 become clients of server 114 in a client-server architecture. The number of client terminals is dependent on the number of users requiring access to the OTV system. In the preferred embodiment, the server 114 is a data server providing the model information to the client terminals.

The processing unit 106 in computer 102 includes an internal hard disk (not shown), and further includes one or more disk drives for transferring data to and from an external diskette 126. Similarly, where configured in a client-server architecture, server 114 includes disk drive 128 for transferring data to and from diskette 126. Hard disk 130 in server 114 is similar to the hard disk in processing unit 106, as each is capable of storing data and program information. The hard disk in processing unit 106, the hard disk 130, and the diskette 126 all represent computer-readable mediums for storing information for use by computer 102 or server 114. The data representing the model information is also stored on one or more of these computer-readable mediums. For instance, in a client-server system, hard disk 130 in data server 114 provides the stored model data to the client systems. Other computer-readable mediums can also be used, including compact disk, read-only memory (CD-ROM) mediums. The OTV software tool is stored on any of the computer-readable mediums, and is executed by the computer 102 or server 114.

The user-interface to the OTV software tool is preferably designed as a graphical user-interface (GUI). This allows the user to use a pointing device such as pointing device 110, typically a mouse or trackball, to perform operations with the OTV software tool. Although commands may be issued by typing keystrokes on the keyboard 108, the user can select options by "pointing and clicking" with the mouse or trackball.

Figure 2:
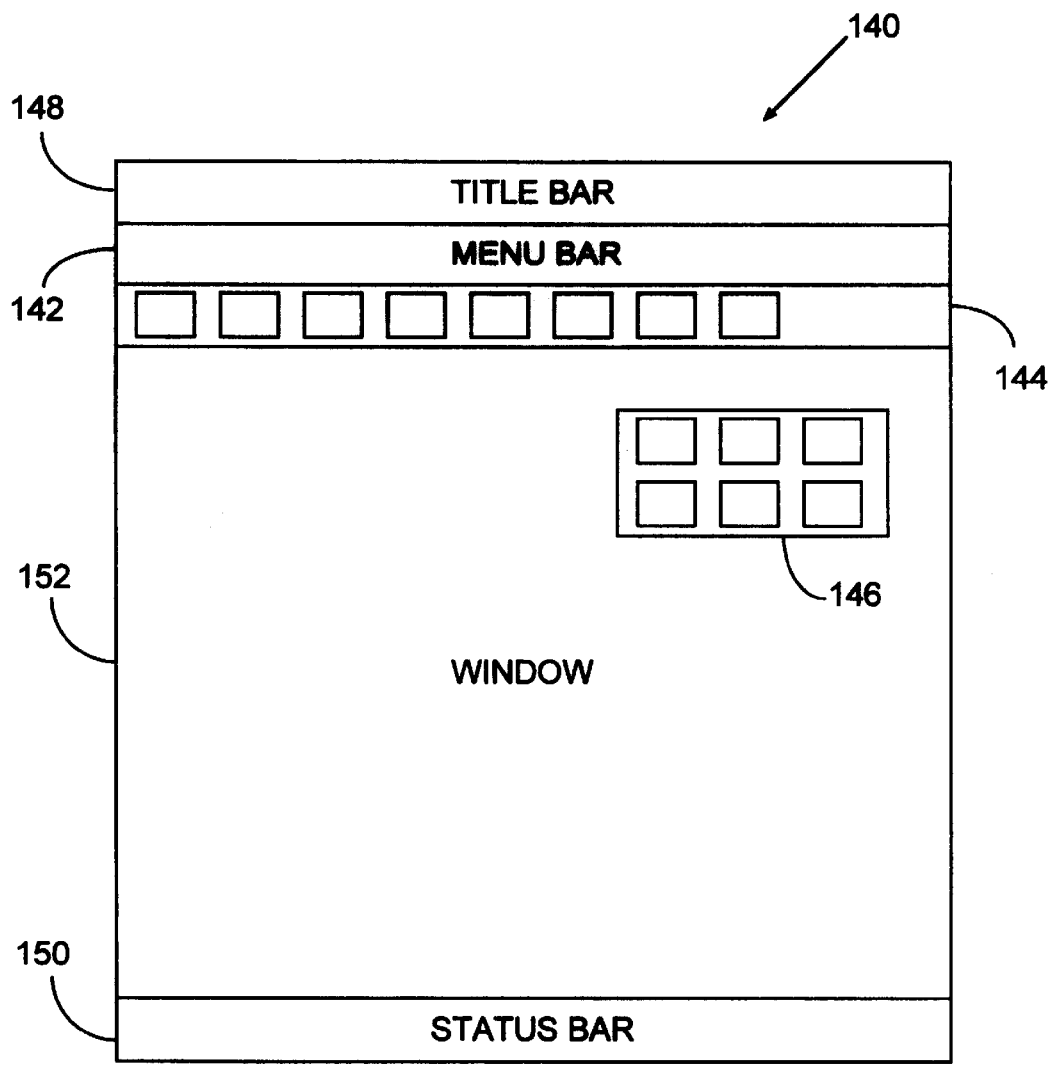
FIG. 2 is a diagram illustrating the preferred user-interface screen 140 for the OTV software tool.

FIG. 2 is a diagram illustrating the preferred user-interface screen 140 for the OTV software tool. The preferred user-interface is a graphical user-interface (GUI) which allows a variety of different user inputs, including menu-driven input, toolbar input, and keystroke input. Keystroke input is accomplished by activating predefined key assignments on keyboard 108, which carries out the predefined function. The user-interface of FIG. 2 includes menu bar 142 which allows menu-driven input by selecting menu items within a pull-down menu box. Toolbars 144 and 146, which can typically be moved to different locations within the user-input screen 140, allow the user to execute commands and functions by selecting command icons within the toolbars 144 and 146. The user-input screen 140 also includes a title bar 148 which identifies the OTV software tool. Status bar 150 provides status and instructions for the OTV software tool. Window area 152 is the area in which the various user-interface windows of the OTV software tool are displayed.

Figure 3:
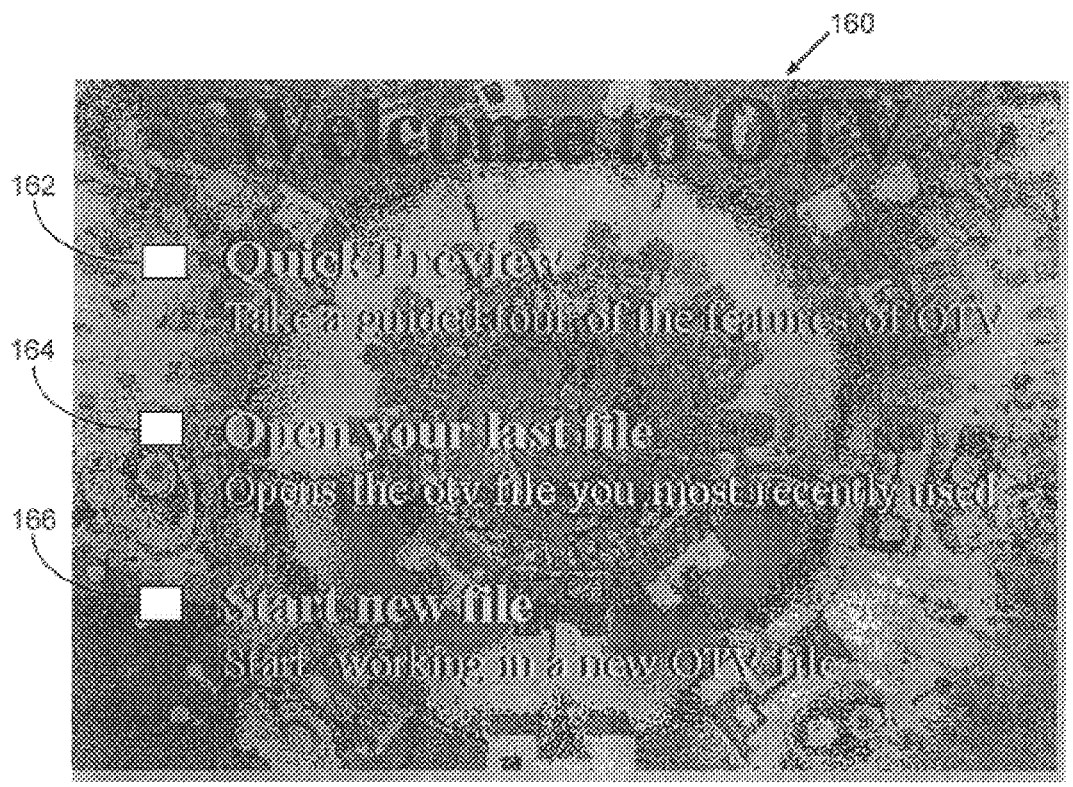
FIG. 3 is a depiction of the OTV introduction window 160 which provides the user-interface for accessing the OTV software tool.

Referring now to FIG. 3, a depiction of the OTV introduction window 160, which provides the user-interface for entering the OTV system, is shown. Introduction window 160 provides quick entry to predetermined areas of the system. Clicking on the quick preview box 162 takes the user through a guided tour of the features of the OTV software tool. Clicking on the open file box 164 allows the user to open the OTV user file most recently used. Clicking on the new file box 166 allows the user to create a new OTV user file.

Figure 4:
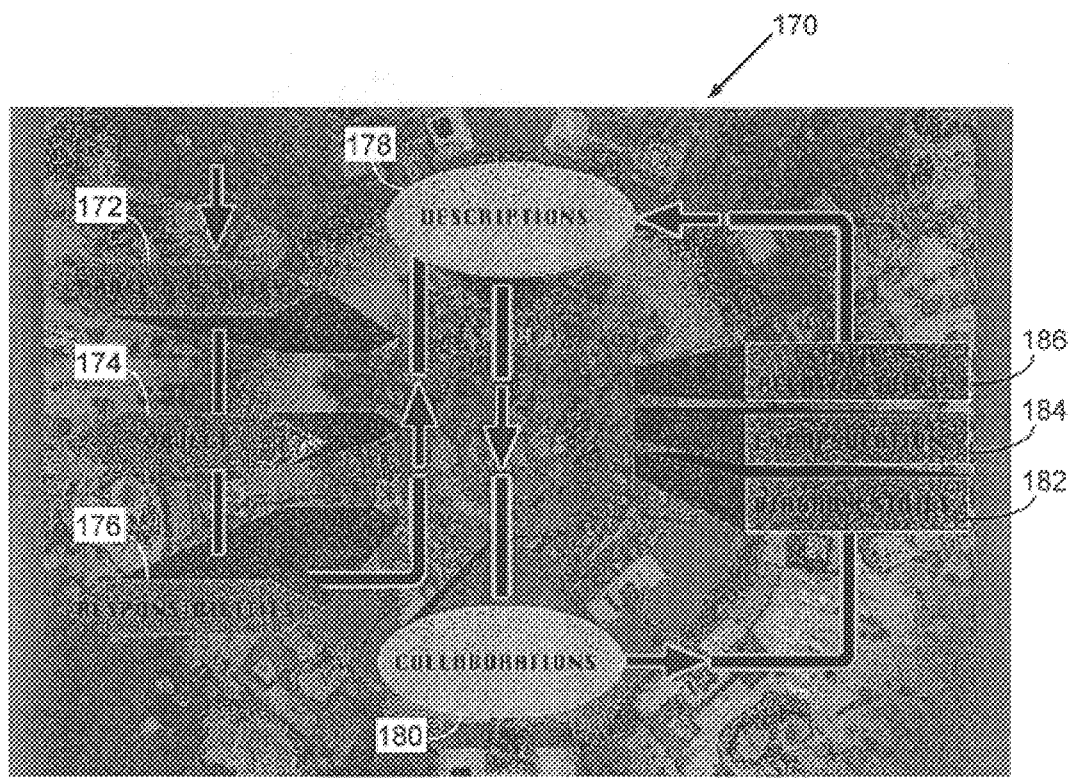
FIG. 4 is a depiction of the process map window 170 of the preferred embodiment.

FIG. 4 is a depiction of the process map window 170 of the preferred embodiment. A new file may be opened by selecting the new file box 166 of FIG. 3, or by way of the other available user-inputs including the previously described menu-driven input, toolbar input, and keystroke input. Upon opening a new user file, the process map window 170 is presented, which guides the user through the object-oriented design process. Selection of a process icon in process map window 170 automatically takes the user to a different step in the object modeling process. The process icons in process map window 170 include the parse & clarify process icon 172, the object process icon 174, the responsibilities process icon 176, the descriptions process icon 178, the collaborations process icon 180, the diagram states process icon 182, the encapsulation process icon 184, and the static relationships process icon 186.

Figure 5:
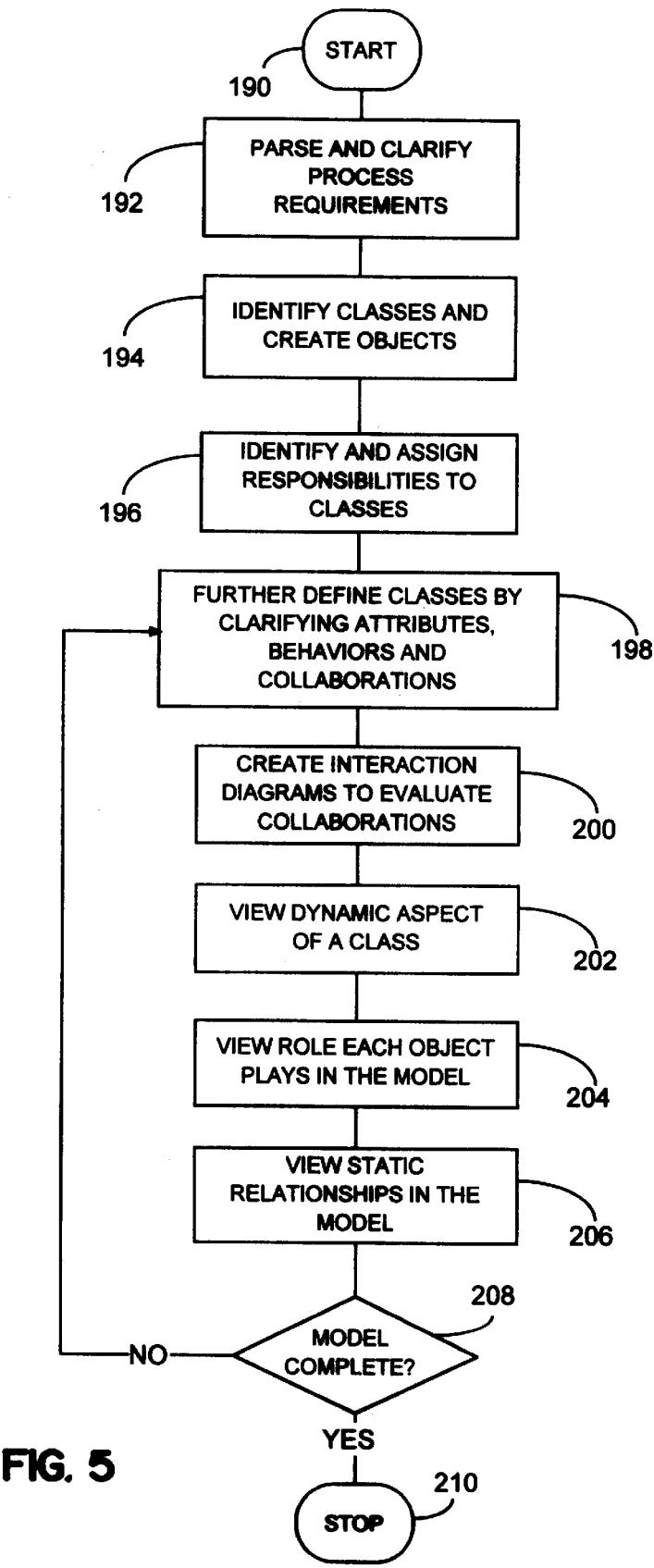
FIG. 5 is a flow diagram of the process set forth in the process map window 170.

FIG. 5 is a flow diagram of the process map window 170 of FIG. 4. Referring now to FIGS. 4 and 5, the process begins at start step 190, where the process map window 170 is presented. Step 192 includes creating a process document where the process requirements are parsed and clarified. Step 192 is initiated by selecting the parse & clarify process icon 172. Selection of the object process icon 174 advances processing to step 194, where classes of the model are identified, and model objects are created. Processing continues at step 196, which is initiated by selection of the responsibilities process icon 176. Step 196 involves identifying and assigning responsibilities to the classes identified in step 194. The ability to continually enhance and modify the model is apparent at step 198, where the classes are further defined by further clarifying the responsibilities. This includes clarifying attributes, behaviors and collaborations for the classes. Step 198 is initiated by selecting the descriptions process icon 178 in the process map window 170.

When the classes, attributes, behaviors and collaborations have been defined, processing continues at step 200 which is initiated by selecting the collaborations process icon 180. Step 200 involves the creation of interaction diagrams that allow the collaborations between the objects to be evaluated. Specific interactions between objects can be created, modified or deleted at step 200. Steps 202, 204 and 206 allow the user to view various aspects of the model that was created. Step 202 is initiated by selecting the diagram states process icon 182, which allows the user to view the dynamic aspect of a class. The user can view the role that each object plays in the model at step 204 by selecting the encapsulation process icon 184. The static relationships of the model can be viewed at step 206 by selecting the static relationships process icon 186. Processing continues at decision step 208, where it is determined whether the model is complete. If the user has completed the model, the process ends at stop step 210. If the process is to be further enhanced, the model is not complete, and processing is returned to step 198, where the classes, attributes, behaviors and collaborations can be further defined. It should be noted that any of the process icons in the process map window 170 can be selected to return to any particular step in the flow diagram of FIG. 5 if the user so desires.

Figures 6, 7:
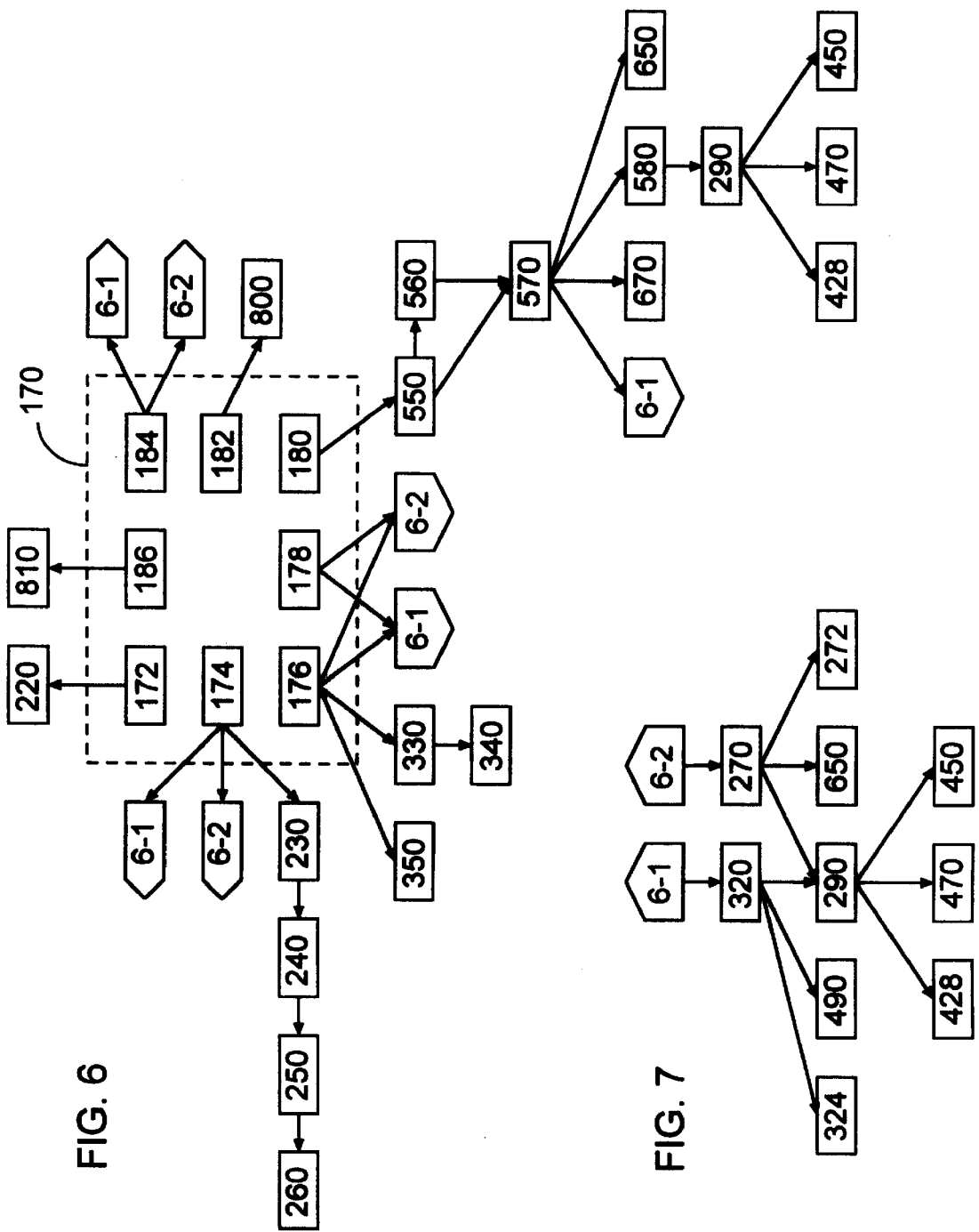
FIG. 6 is a diagram illustrating the preferred hierarchy of user-interface windows for carrying out the process of FIG. 5.
FIG. 7 is a continuation of FIG. 6 illustrating the preferred hierarchy of user-interface windows for carrying out the process of FIG. 5.

Referring now to FIG. 6, a diagram illustrating the preferred hierarchy of the user-interface windows for carrying out the process of FIG. 5 is shown. From process map window 170, user-interface windows can be initiated for each of the steps 192 through 206 by selecting the corresponding process icon. Each of the windows will be described in detail throughout this description, however FIG. 6 provides a map of the window relationships.

Selection of the parse and clarify process icon 172 presents the parse and clarify dialog window 220. Selection of the object process icon 174 provides the user with the identifying objects dialog window 230, which in turn provides the object parsing dialog window 240. Where a file is to be opened, the open file window 250 is opened to allow the user to select a file. Finally, quick tips window 260 is provided upon selection of a file. Selection of object process icon 174 also provides the user with access to a two-dimensional object window and a three-dimensional object window, which are described in FIG. 7. Continuation indicators 6-1 and 6-2 depict the connection points of FIG. 6 to the corresponding continuation indicators of FIG. 7.

Selection of the responsibilities process icon 176 also provides the user with access to the two-dimensional object window and the three-dimensional object window described in FIG. 7. Continuation indicators 6-1 and 6-2 again depict the connection points of FIG. 6 to the corresponding continuation indicators of FIG. 7. Two other windows are available by selecting the responsibilities process icon 176, including the assigning responsibilities dialog window 330 and the recipient list window 350. From the assigning responsibilities dialog window 330, the user can also access the action parsing dialog window 340.

Selection of the descriptions process icon 178 allows the user to modify and refine the system model. This is accomplished through the two-dimensional and three-dimensional object windows described in FIG. 7. Again, continuation indicators 6-1 and 6-2 depict the connection points of FIG. 6 to the corresponding continuation indicators of FIG. 7.

The collaborations process icon 180, when selected, presents the interactions diagram selection window 550. From the interactions diagram selection window 550 the user can create a new interaction diagram from the new interactions diagram window 560, or view and modify an existing interaction diagram. In either case, the interaction diagram window 570 is provided. From the interaction diagram window 570, the user can access the destination class window 580, the view zoom window 650, and the interaction player window 670. From the destination class window 580, the class editor window 290 can be accessed, which provides the attributes window 428, the behaviors window 450, and the overview window 470. From the interaction diagram window 570, the three-dimensional view can also be accessed, which is described in FIG. 7 and connected to the flowchart of FIG. 7 via the continuation indicator 6-1.

Selection of the diagram states process icon 182 presents the user with the create state diagrams window 800. Selection of the encapsulation process icon 184 again is accomplished through the two-dimensional and three-dimensional object windows described in FIG. 7. Continuation indicators 6-1 and 6-2 depict the connection points of FIG. 6 to the corresponding continuation indicator of FIG. 7. Because system modeling is an iterative process, the encapsulation step allows the user to view the role of each object in the system model, and further enhance the system model by modifying the classes, attributes, and behaviors. Finally, selection of the static relationships process icon 186 presents the static relationships window 810.

A description of each of these windows is presented in the following detailed description. FIGS. 6 and 7 provide a guide to some of the major user-interface windows of the OTV software tool, however other user-interface windows also exist within the OTV software tool.

Referring now to FIG. 7, a continuation of the preferred hierarchy of the user-interface windows for carrying out the process of FIG. 5 is shown. Continuation indicators 6-1 and 6-2 are extensions of the flowchart of FIG. 6. From continuation indicator 6-1 is the preferred hierarchy of the three-dimensional user-interface windows. The 3D object window 320 is the main three-dimensional window that provides a three-dimensional view of the system model. From the 3D object window 320, the user can access the class editor window 290, which in turn provides the attributes window 428, the behaviors window 450, and the overview window 470. The user can also access the 3D object toolbar 324 and the viewpoint name window 490 from the 3D object window 320.

From continuation indicator 6-2 is the preferred hierarchy of the two-dimensional user-interface windows. The object window 270 is the main two-dimensional window that provides a two-dimensional view of the system model. From the object window 270, the user can access the class editor window 290, which in turn provides the attributes window 428, the behaviors window 450, and the overview window 470. The 2D object toolbar 272 and the view zoom window 650 can also be accessed from the object window 270.

Figure 8:
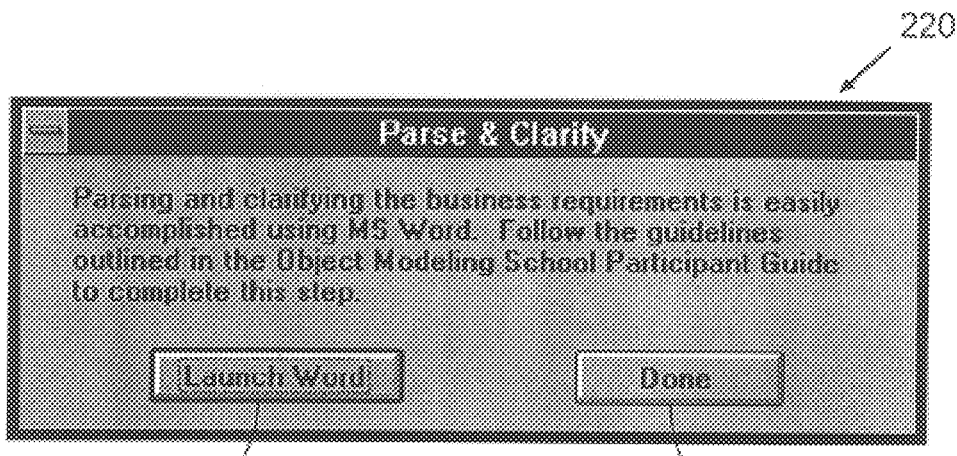
FIG. 8 is a depiction of the parse and clarify dialog window 220.

Referring now to FIG. 8, selection of the parse & clarify process icon 172 of FIG. 4 displays the parse and clarify dialog window 220 as shown. This first step of parsing and clarifying system requirements allows the user to identify and set forth the requirements of the process or system. These requirements can be entered using a word processing application which can be launched by selecting button 222 in the parse and clarify dialog window 220. In the preferred embodiment, the word processing application used is Microsoft® Word, and selection of button 222 will initiate the Microsoft® Word word processing program. Other word processing programs could be used without departing from the scope of the invention. The user enters the system requirements into a word processing document which will define the system requirements for the current system model. Alternatively, such a document may be a pre-existing document previously prepared setting forth the system requirements. The user may use the pre-existing document to define the system requirements for the current system model. Table 1 shows an example of possible system requirements for an airline reservation business model.

TABLE 1

SYSTEM REQUIREMENTS ENTERED INTO DOCUMENT

For each segment of the requested reservation, the system tries to find a flight that meets the requested schedule, and find a flight that has enough available seats to satisfy the reservation request. Priority is given to the preferred carrier. If a flight matches the requirements, but has no available seat, it is determined if the customer wants to be put on the waiting list for that flight. The customer can be a member of the. frequent traveler program of the carrier, in which case his or her request is put in the frequent traveler waiting list, otherwise it is put in the regular waiting list.

When this information has been entered, the done button 224 in the parse and clarify dialog window 220 is selected to return the user to the process map window 170. The parse & clarify process icon 172 in FIG. 4 is then marked, letting the user know that this step has been carried out. The user may, however, return to the parse and clarify step 192 of FIG. 5 by selecting the parse & clarify process icon 172 at any time.

Figure 9:
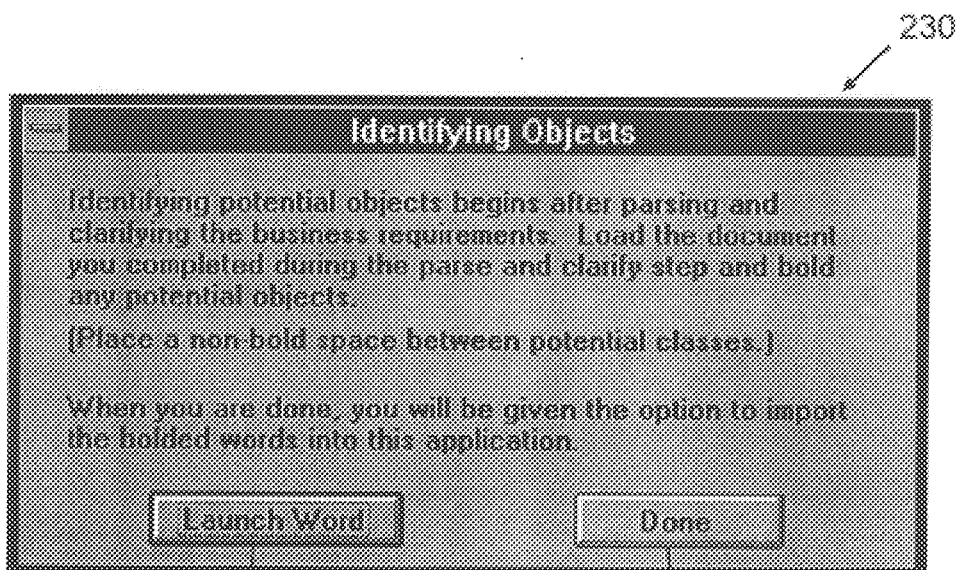
FIG. 9 is a depiction of the identifying objects dialog window 230.

Selecting the object process icon 174 of FIG. 4 allows the user to identify potential objects after the system requirements have been clarified. The result of identifying potential objects will be a group of classes for the model. Upon selecting the object process icon 174, the identifying objects dialog window 230 of FIG. 9 is provided. The document of Table 1 is then loaded into the word processing application to identify the potential objects. This is accomplished by selecting button 232 of the identifying objects dialog window 230, which again activates the word processing application. Object words in the system requirements document of Table 1 can be tagged to identify the various classes of the system model. In the preferred embodiment, these objects are tagged by boldfacing potential objects in the system requirements document. Table 2 shows the system requirements of the word processing document after having been tagged by boldfacing the potential system objects.

TABLE 2

SYSTEM OBJECTS TAGGED IN DOCUMENT

For each segment of the requested reservation, the system tries to find a flight that meets the requested schedule, and find a flight that has enough available seats to satisfy the reservation request. Priority is given to the preferred carrier. If a flight matches the requirements, but has no available seat, it is determined if the customer wants to be put on the waiting list for that flight. The customer can be a member of the frequent traveler program of the carrier, in which case his or her request is put in the frequent traveler waiting list, otherwise it is put in the regular waiting list.

When the system objects have been tagged as shown in Table 2, the done button 234 in the identifying objects dialog window 230 of FIG. 9 is then selected to return the user to the process map window 170.

Figure 10:
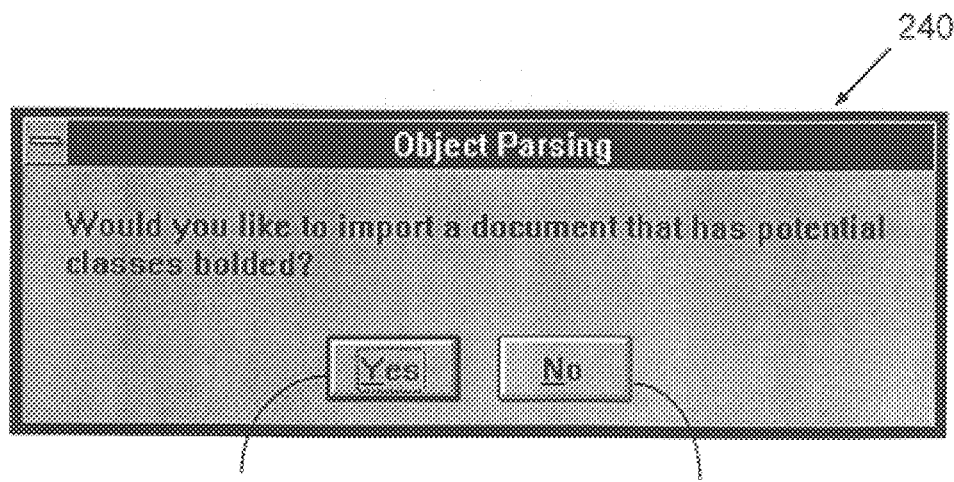
FIG. 10 is a depiction of the object parsing dialog window 240 which allows the user to import a text document.
Figure 11:
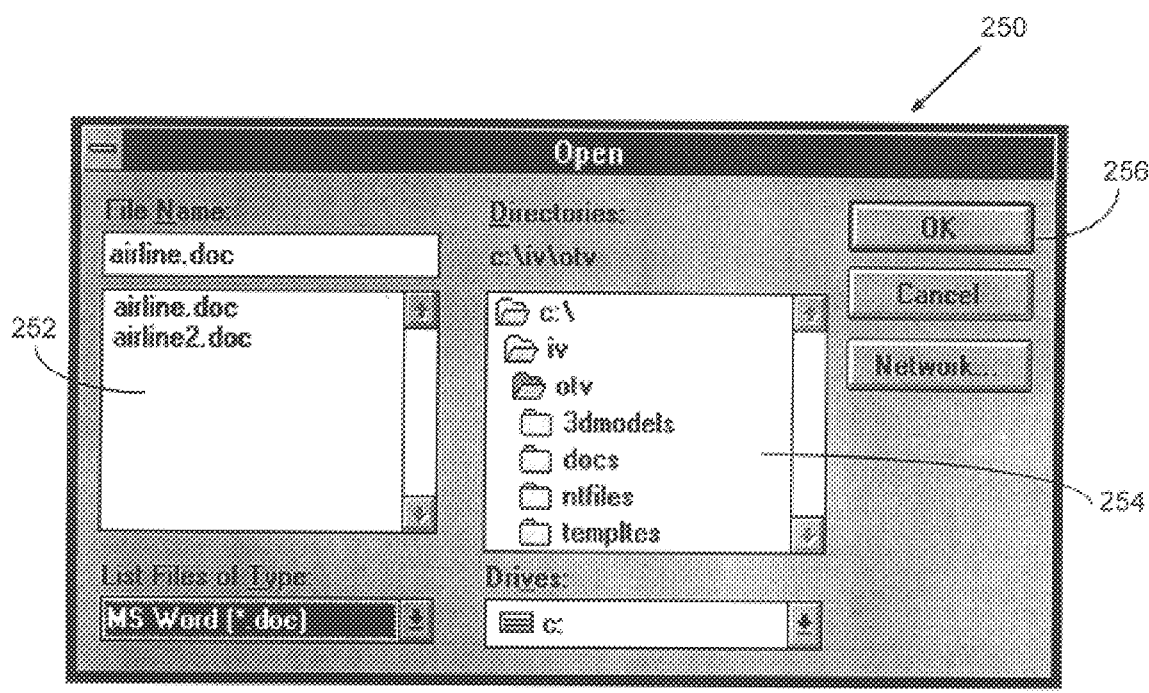
FIG. 11 is a depiction of the open file window 250 that allows the user to select the file name of the text document.

The object parsing dialog window 240 is presented to the user upon clicking the done button 234 as shown in FIG. 10. The object parsing dialog window 240 allows the user to import the document of Table 2 which has its potential business objects tagged as boldfaced words. If no document is to be imported, the user selects the no button 242 to close the object parsing dialog window 240. Upon clicking the yes button 244 in the object parsing window 240, the open file window 250 of FIG. 11 is provided to allow the user to select the file name of the word processing document created from the text of Table 2. The desired file name is selected by selecting the name of the file in the file list field 252 after selecting the appropriate directory from the directory list field 254, and selecting the OK button 256.

Figure 12:
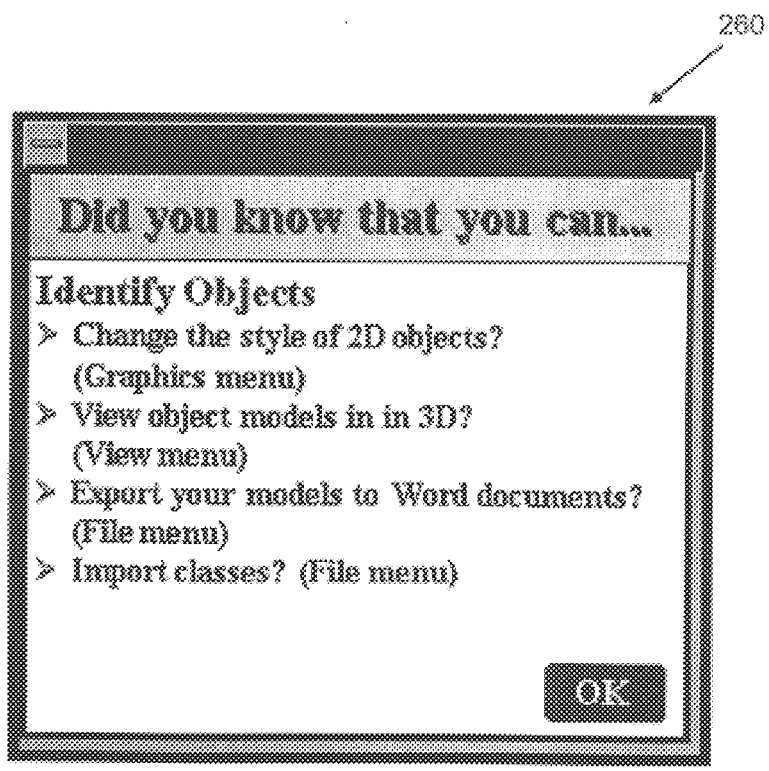
FIG. 12 is a depiction of the quick tips window 260 that informs the user of useful features and provides implementation guidance.

FIG. 12 is a depiction of the quick tips window 260. The quick tips window 260 is provided to the user the first time the object process icon 174 is selected and the user has opened a document from the file open window 250 or has chosen not to import a document by selecting the no button 242 in the object parsing dialog window 240. The quick tips window 260 informs the user of useful features used in identifying objects, and provides guidance on how to implement the corresponding menu, toolbar or keystroke command.

Figure 13:
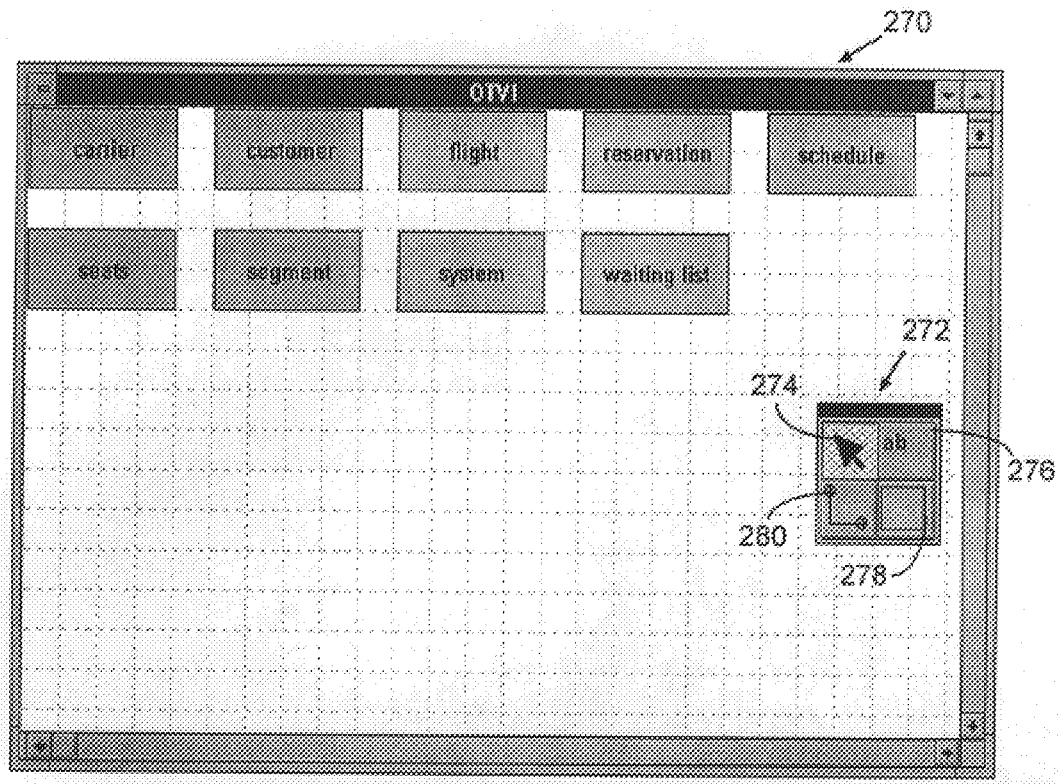
FIG. 13 illustrates the two-dimensional object window 270 that presents a number of objects in a two-dimensional form.

FIG. 13 shows object window 270 which depicts a number of objects in a two-dimensional form. Each of the objects which were tagged in the document of Table 2 are separately presented as a two-dimensional object in 2D object window 270. Four object tools are shown in the 2D object toolbar 272. The pointer object tool 274 allows the two-dimensional objects in 2D object window 270 to be moved from their current locations to new locations in the 2D object window 270. The text object tool 276, when selected, allows the user to enter text into 2D object window 270. The new object tool 278, when selected, allows the user to add new objects in addition to the current objects in 2D object window 270. The link object tool 280, when selected, allows the user to draw lines connecting certain objects to show a relationship between those connected objects.

Figure 14:
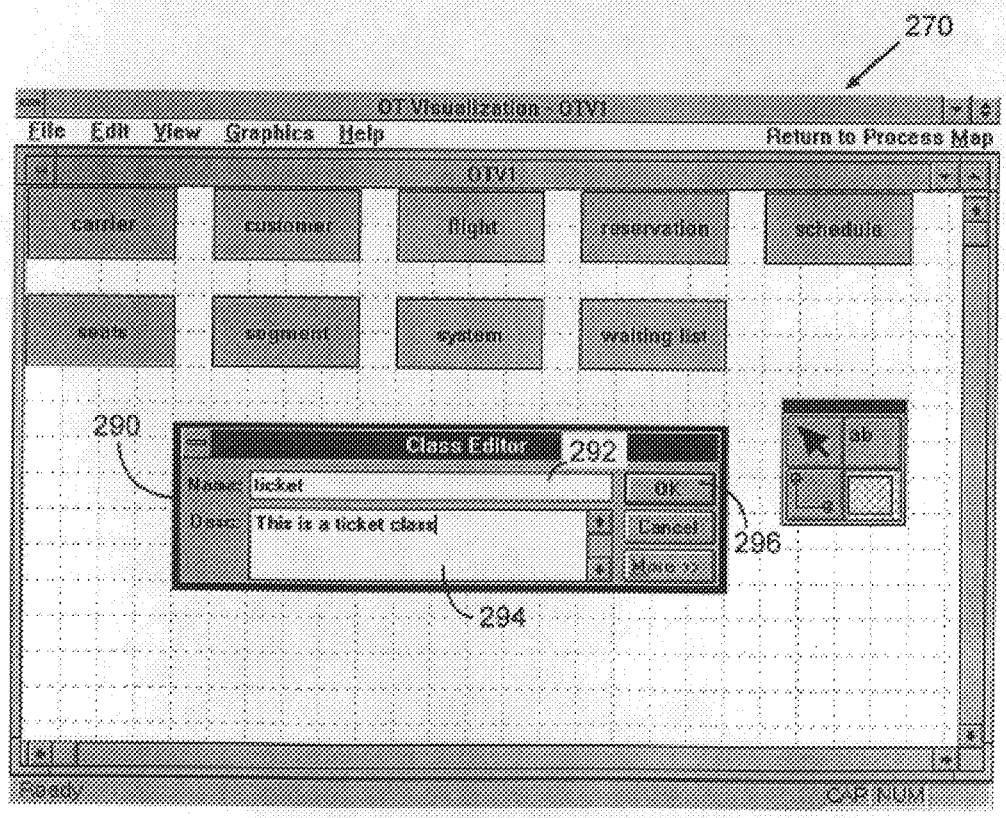
FIG. 14 illustrates the 2D object toolbar 272, and the new object tool 278 for creating new objects.

Upon selection of the new object tool 278, the class editor window 290 of FIG. 14 is provided. Class name entry field 292 allows the user to enter the name of the new class, which is shown as "ticket" in FIG. 14. A description of this class can be entered in the class description field 294. A new object will be entered in the 2D object window 270 upon selecting the OK button 296 in the class editor window 290.

Figure 15:
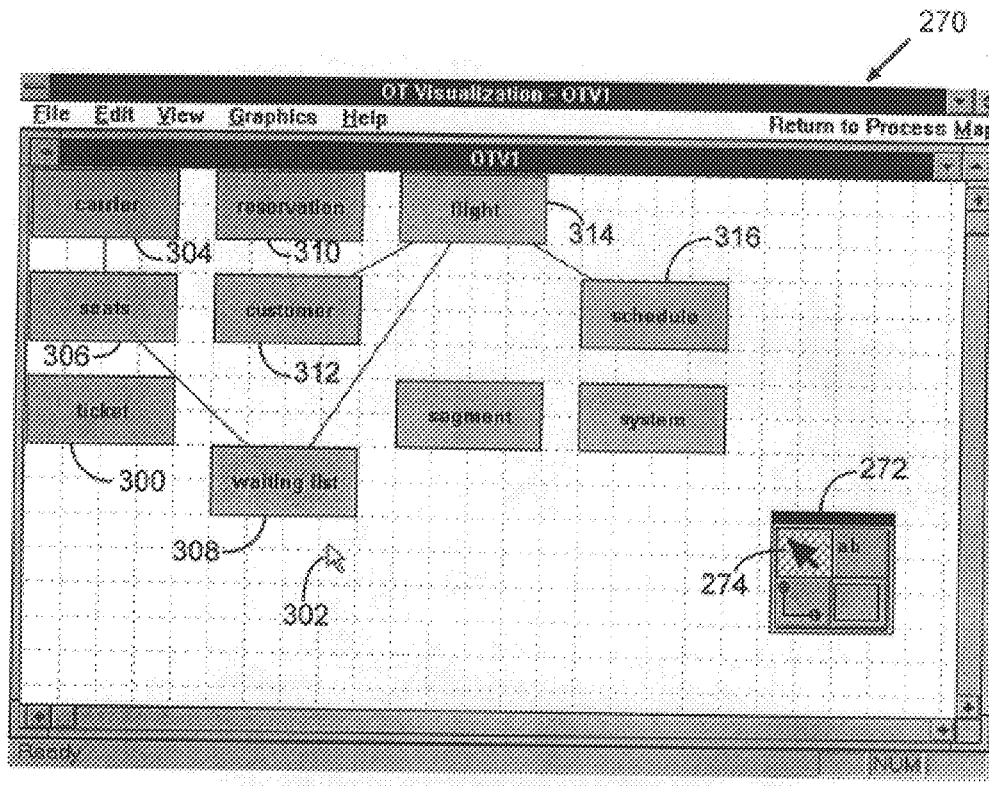
FIG. 15 illustrates the ability of objects in the 2D object window 270 to be added and moved.

FIG. 15 illustrates the ability of objects in 2D object window 270 to be added and moved. The ticket object 300 created by the class editor window 290 of FIG. 14 is shown in 2D object window 270. Objects have been moved by selecting the pointer object tool 274 in the 2D object toolbar 272, selecting the desired object with the cursor arrow 302, and moving the selected object to a new location. Some of the objects in 2D object window 270 are also shown to be linked. This is accomplished by selecting the link object tool 280, and selecting two objects to be linked. The carrier object 304 of FIG. 15 is linked to the seats object 306, which is in turn linked to the waiting list object 308. The reservation object 310 is shown linked to the customer object 312. The flight object 314 is linked to the customer object 312, the waiting list object 308, and the schedule object 316. Linking is performed when the link object tool 280 is selected, a first object is selected by clicking on the object in the 2D object window 270, and clicking on a second object to be linked. This linkage shows that there is some relationship between the linked objects.

The OTV software tool provides various graphics options to change or enhance the 2D object window 270. These graphics options can be selected by way of the different user inputs, including menu-driven input, toolbar input, and keystroke input. The various options include fill patterns, pen styles, colors, alignment and fonts. Using these and other options allow the visual depiction in the 2D object window 270 to be set or changed at the user's preference.

The OTV software tool also includes various viewing options, which also can be selected by way of the different user inputs, including menu-driven input, toolbar input, and keystroke input. The viewing options include toggle switches for viewing the status bar 150 shown in FIG. 2, the 2D object toolbar 272, and a visual grid. A "snap-to-grid" toggle function is also provided to ease alignment and movement of the objects.

A three-dimensional viewing window is provided by the OTV software tool. Viewing the object model in three dimensions allows users to view their model quantitatively, and interactions between the objects are brought to life. A three-dimensional view of the 2D object window 270 can be initiated by way of any of the different user inputs.

Figure 16:
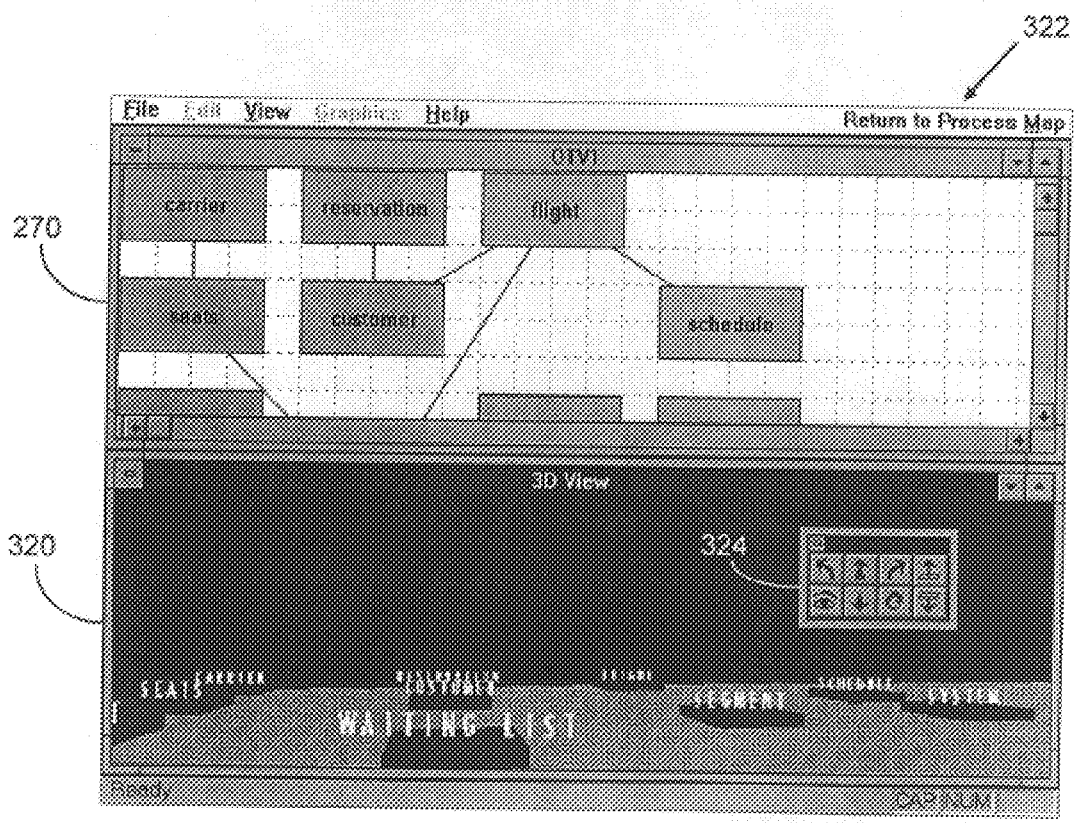
FIG. 16 illustrates the three-dimensional (3D) object window 320.

Referring now to FIG. 16, the 3D object window 320 is shown. The 3D object window 320 is shown concurrently with the 2D object window 270 to form a split image in a single object window 322. The 3D object window 320 provides a three-dimensional view of 2D object window 270, as the same objects and their relative positions in the 2D object window 270 are shown in three dimensions in the 3D object window 320. A 3D object toolbar 324 in object window 322 allows the user to move through the 3D object window 320, in order to view the objects from various vantage points.

Each of the objects defined in Table 2, and shown in 2D object window 270 and 3D object window 320, represent a class within the system model. A class is defined by its collective responsibilities, including its attributes and behaviors. By describing the responsibilities of each class, the role that each class plays is defined within the system model.

Figure 17:
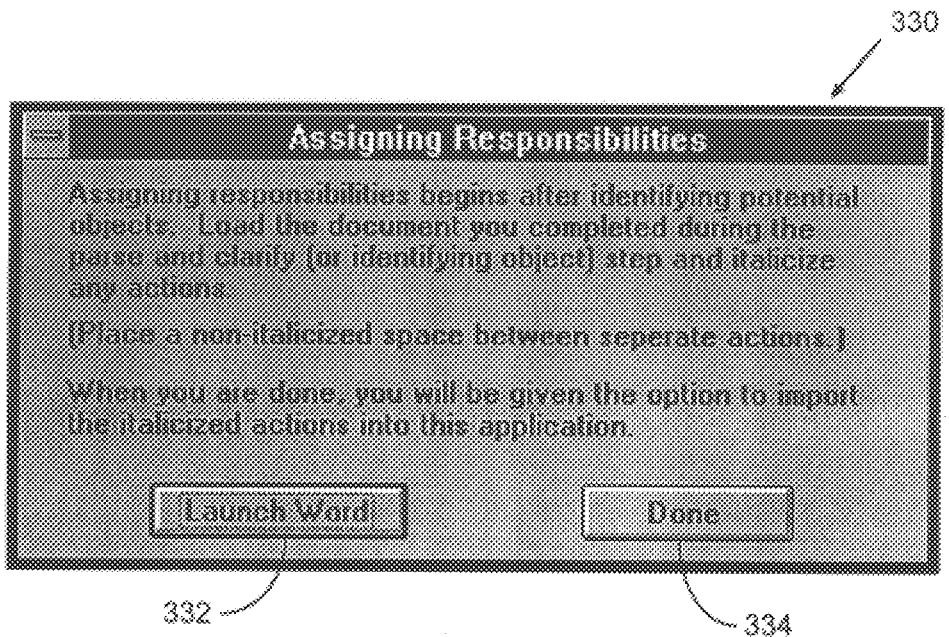
FIG. 17 is a depiction of the assigning responsibilities dialog window 330.

Referring briefly to FIGS. 4 and 5, step 196 of identifying and assigning responsibilities to the classes is initiated by selecting the responsibilities process icon 176. Selection of the responsibilities process icon 176 opens the assigning responsibilities dialog window 330 as shown in FIG. 17. The assigning responsibilities dialog window 330 allows the user to tag the actions that each of the classes are responsible for providing. The word processor can again be initiated by clicking on button 332 in the assigning responsibilities dialog window 330. The system requirements in the document are again tagged, this time tagging the actions of each class. In the preferred embodiment, the tagging of the actions of each class is accomplished by italicizing action phrases associated with each of the objects. The action phrases could alternatively be tagged in other ways without departing from the scope of the invention, such as underlining, capitalization, etc. The tagging of action phrases can be seen in Table 3, where the actions have been tagged by italicizing various phrases. The italicized words are also underlined for illustrative purposes in Table 3 to allow the tagged phrases to be seen more clearly in the table.

TABLE 3

CLASS RESPONSIBILITIES TAGGED IN DOCUMENT

For each segment of the requested reservation, the system tries to find a flight that meets the requested schedule, and find a TABLE 3-continued

CLASS RESPONSIBILITIES TAGGED IN DOCUMENT flight that has enough available seats to satisfy the reservation request. Priority is given to the preferred carrier. If a flight matches the requirements, but has no available seat, it is determined if the customer wants to be put on the waiting list for that flight. The customer can be a member of the frequent traveler program of the carrier, in which case his or her request is put in the frequent traveler waiting list, otherwise it is put in the regular waiting list.

When the document has been changed to tag each of the class responsibilities, the done button 334 in the assigning responsibilities dialog window 330 is selected, indicating that the tagging is complete, and closing the assigning responsibilities dialog window 330.

Figure 18:
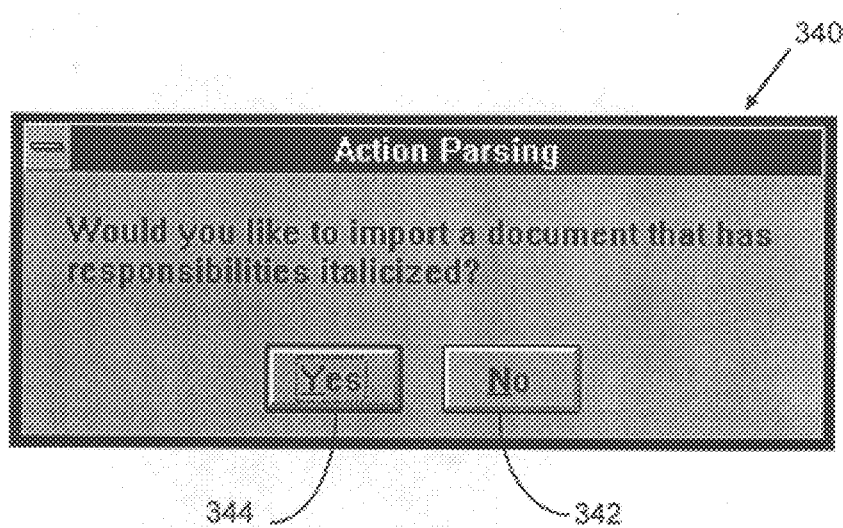
FIG. 18 is a depiction of the action parsing dialog window 340, which allows the user to import the text document with tagged class responsibilities.

FIG. 18 shows the action parsing dialog window 340, presented upon selecting the done button 334 of the assigning responsibilities dialog window 330, which allows the user to import the document with the tagged class responsibilities shown in Table 3. The user has the option of not importing the document by selecting the no button 342, whereby the user would manually enter the class responsibilities. Otherwise, the user selects the yes button 344 in the action parsing dialog window 340 to import the document having the tagged class responsibilities. The OTV software tool recognizes the tagged, italicized action phrases, and automatically enters those phrases into a responsibility list of the recipient list window 350 of FIG. 19.

Figure 19:
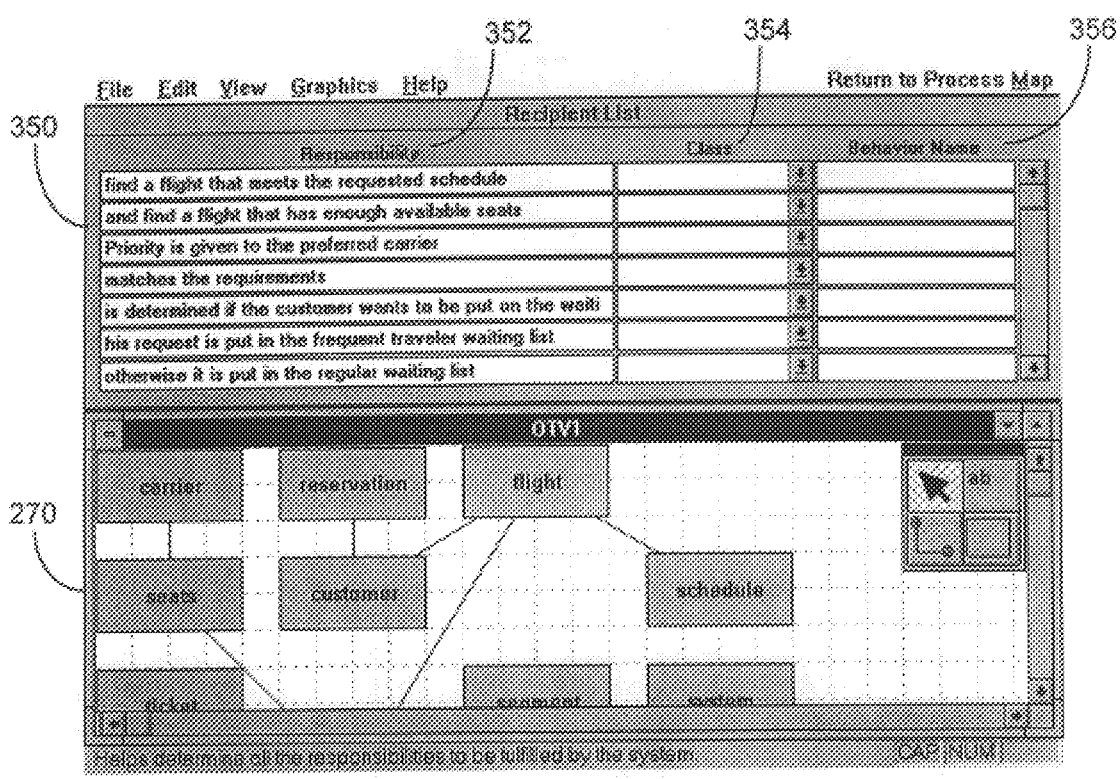
FIG. 19 illustrates the recipient list window 350, having a responsibility list, a class list, and a behavior name list.

FIG. 19 shows the recipient list window 350, having a responsibility list 352, a class list 354 and a behavior name list 356. When the user selects the yes button 344 in the action parsing dialog window 340, the individual tagged action phrases are automatically entered into the responsibility list 352. The responsibilities listed in the responsibility list 352 are each assigned to a class, which is entered into the class list 354. Each of the responsibilities listed in the responsibility list 352 are also assigned a behavior name in the behavior name list 356, which provides a name for the corresponding responsibility. As seen in FIG. 19, the 2D object window 270 can be shown simultaneously with the recipient list window 350 to assist the user in defining the classes and behaviors.

Figure 20:
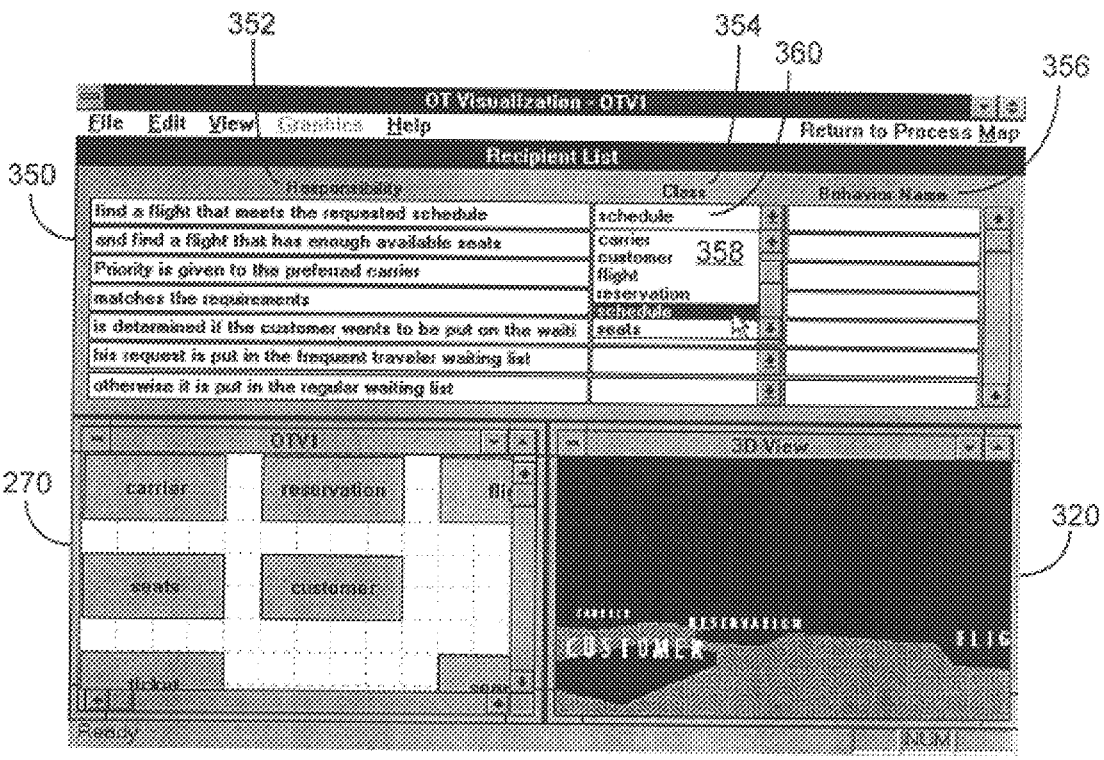
FIG. 20 illustrates that the 3D object window 320 can be simultaneously displayed with the 2D object window 270 and the recipient list window 350.

FIG. 20 further illustrates that the 3D object window 320 can also be simultaneously displayed with the 2D object window 270, and the recipient list window 350. The three-dimensional view provides immediate feedback to the user when assigning behavior names to classes, as will be shown in more detail below.

Each of the tagged responsibilities in the responsibility list 352 is assigned to a particular class, where each class represents one of the objects in 2D object window 270 and 3D object window 320. FIG. 20 illustrates how classes are assigned to each of the responsibilities in the responsibility list 352. A class can be directly entered into each field of class list 354, or can be selected from a pull-down list 358 of classes displayed by clicking on the pull-down button 360, and clicking on the desired class in the pull-down list 358. Each of the responsibilities in the responsibility list 352 can similarly be assigned to a class.

Figure 21:
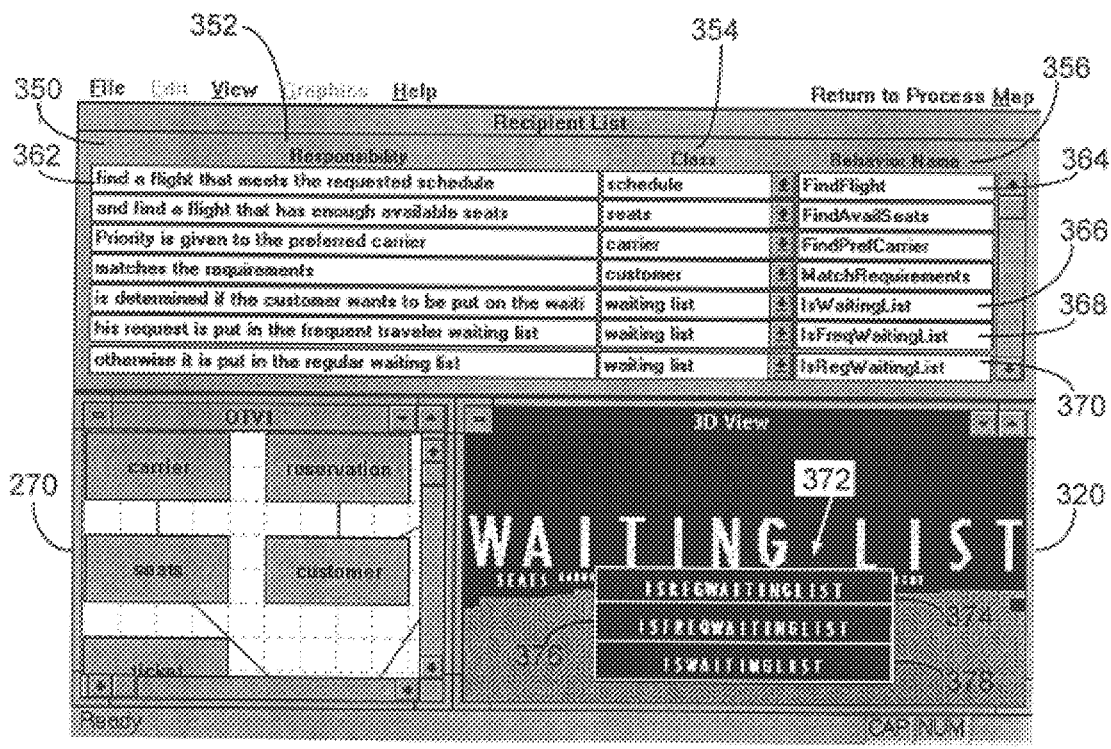
FIG. 21 depicts a completed recipient list window 350.

Referring now to FIG. 21, the recipient list window 350 is shown having a completed responsibility list 352, class list 354, and behavior name list 356. Each of the responsibilities in the responsibility list 352 has been assigned to a class in the class list 354. Behavior names associated with the responsibilities in the responsibility list 352 are shown in the behavior name list 356. Each of the behavior names in the behavior name list 356 is a user-generated name that the user creates to identify one of the responsibilities in the responsibility list 352.

Behaviors describe the capabilities that a particular class can provide. A behavior is a method associated with a class that defines the responsibility of that class. For instance, in the responsibility field 362, the responsibility is to "find a flight that meets the requested schedule". The item being acted on is the schedule, which represents the class, and the behavior associated with that responsibility for that class is named "FindFlight" in behavior field 364. As the user adds behavior names to each of the classes, the behaviors are dynamically added to the classes in the 3D object window 320. For example, the class labeled "waiting list" in class list 354 has three behaviors associated with it in behavior fields 366, 368, and 370. These behaviors are respectively labeled IsWaitingList, IsFreqWaitingList, and IsRegWaitingList. These behaviors are dynamically added to the three-dimensional view of the waiting list class in the 3D object window 320. The classes are shown in the 3D object window 320 as three-dimensional "cells", which are the three-dimensional representations of the two-dimensional "objects" in the 2D object window 270. The waiting list cell 372 shows the corresponding behaviors in behavior blocks 374, 376 and 378. The waiting list cell 372 can be dynamically brought into the view shown in FIG. 21 by clicking on the waiting list cell 372 from any view within the 3D object window 320.

Figure 22:
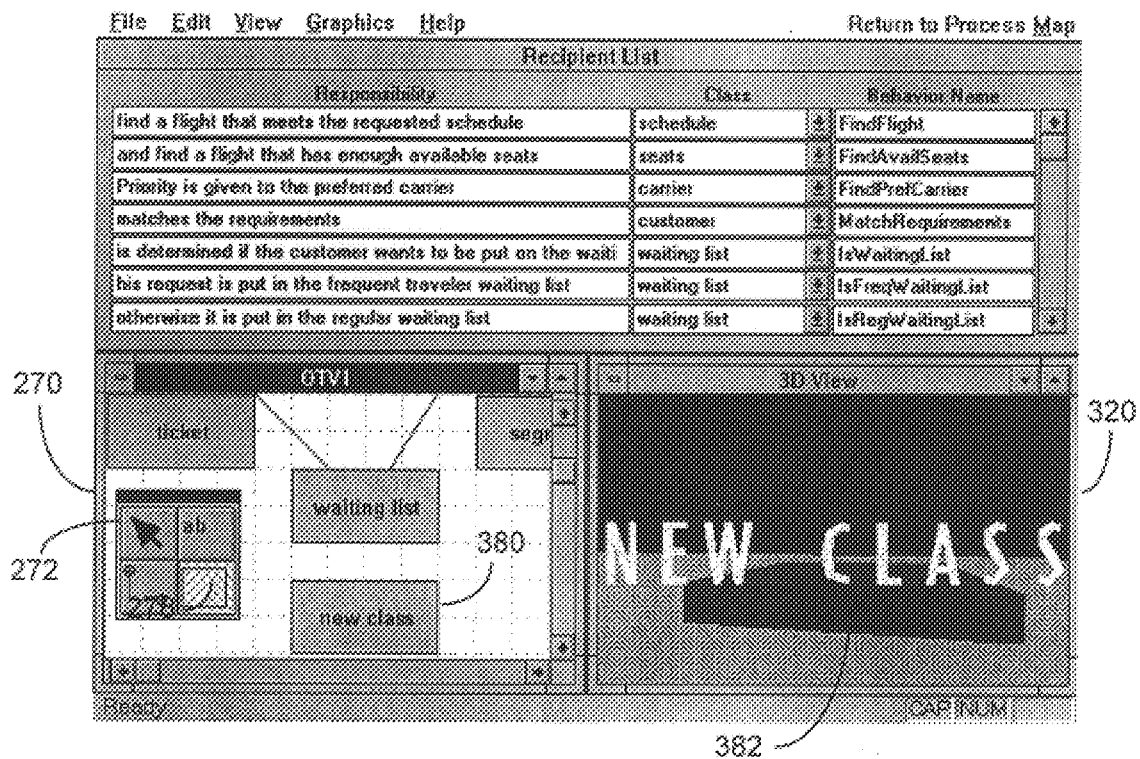
FIG. 22 illustrates the creation of new classes during the responsibility design stage.

FIG. 22 illustrates how new classes can be added during the responsibility design stage. By selecting the new object tool 278 in the 2D toolbar 272 in 2D object window 270, the class editor window 290, previously shown in FIG. 14, is opened. The name of the new class is then entered into the class name entry field 292, and a description of the new class is entered into the class description field 294. The new class object 380 is shown in the 2D object window 270, and is also shown as a new class cell 382 in the 3D object window 320. Selection of the pointer object tool 274 in the 2D toolbar 272 allows the new class object 380 to be moved within the 2D object window 270, which will simultaneously move the three dimensional new class cell 382 in the 3D object window 320. Similarly, moving the cells in the 3D object window 320 automatically moves the objects represented in the 2D object window 270.

Figure 23:
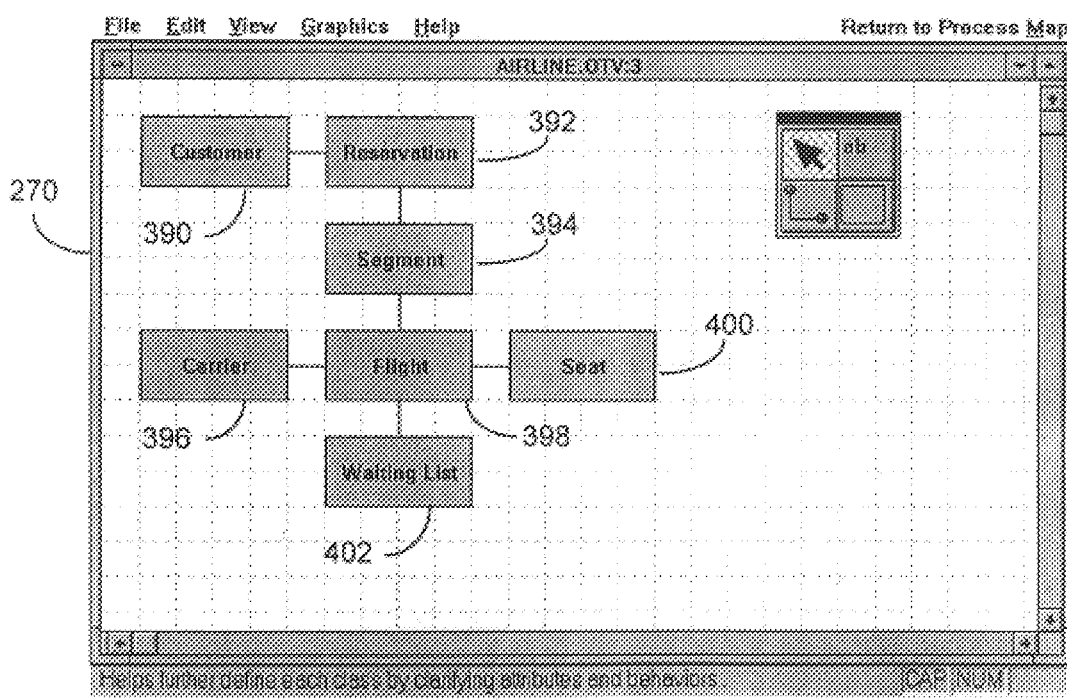
FIG. 23 illustrates a particular system model in the 2D object window 270.

Returning now to FIGS. 4 and 5, step 198 of FIG. 5 is initiated by selecting the descriptions process icon 178 of FIG. 4. Step 198 allows the user to describe the classes and their behaviors to clearly define the rule of each class in the model and to define the services that it provides. Upon selecting the descriptions process icon 178, the desired system model can be captured in the 2D object window 270 of FIG. 23. The system model in FIG. 23 has seven objects, including the customer object 390, the reservation object 392, the segment object 394, the carrier object 396, the flight object 398, the seat object 400, and the waiting list object 402. When these objects have been defined after performing steps 192, 194 and 196 in the flow chart of FIG. 5, the user can further define and describe the classes and their behaviors.

Figure 24:
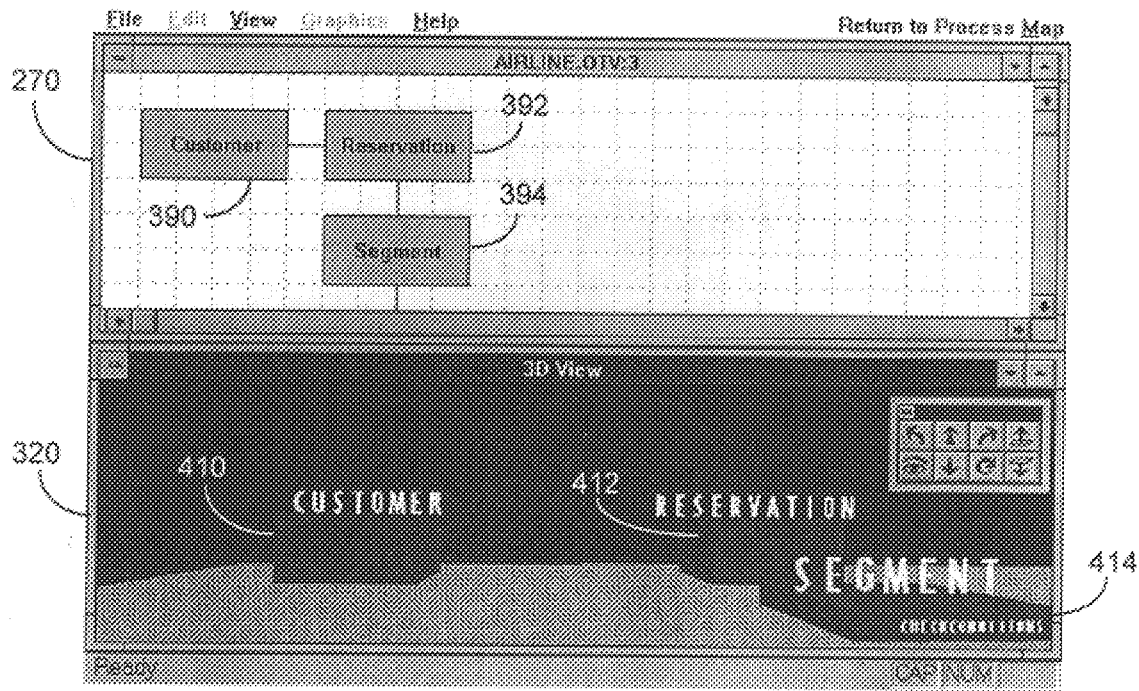
FIG. 24 illustrates the relationship of the two-dimensional objects in the object window 270 to the three-dimensional cells in the 3D object window 320.

Referring now to FIG. 24, the objects in the 2D object window 270 are also shown as three dimensional cells in the 3D object window 320. The pointer object tool 274 in the 2D object toolbar 272 (shown in FIG. 13) allows objects to be moved within the 2D object window 270. The cells in the 3D object window 320 can also be moved within the 3D object window 320 by selecting and moving the desired cell, which can be accomplished by clicking on the desired cell and "dragging" it to a new location. FIG. 24 also illustrates the relationship between the locations of the two-dimensional objects in the 2D object window 270 and the locations of the three-dimensional cells in the 3D object window 320. The customer object 390 is shown located to the left of the reservation object 392 in the 2D object window 270. The segment object 394 is positioned directly in front of the reservation object 392. In the 3D object window 320, it can be seen that the three-dimensional customer cell 410 is located to the left of the reservation cell 412, and the segment cell 414 is positioned directly in front of the reservation cell 412. Therefore, the relative positions of the objects in the 2D object window 270 parallel the relative positions of the cells in the 3D object window 320.

Figure 25:
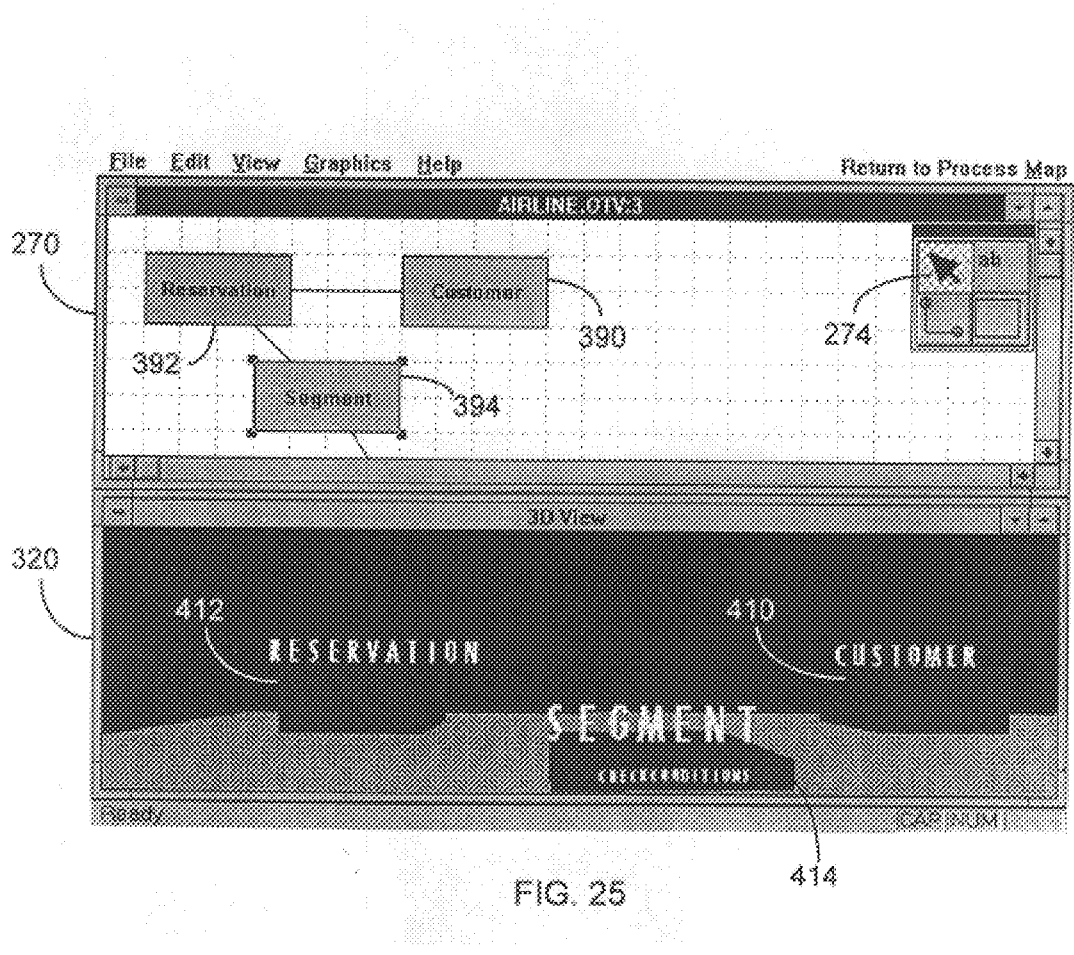
FIG. 25 illustrates that a change of location in the object window 270 simultaneously changes the locations of the cells in the 3D object window 320.

Referring now to FIG. 25, it can be seen that a change of location in the 2D object window 270 simultaneously changes the locations of the cells in the 3D object window 320. Through the use of the pointer object tool 274, the reservation object 392 has been moved to the left, to the original position of the customer object 390. The customer object 390 has been moved to the right, to a point beyond the original position of the reservation object 392. The segment object 394 has been moved to the left so that it is located in front of, and approximately between, the reservation object 392 and the customer object 390. The customer cell 410, the reservation cell 412, and the segment cell 414 in the 3D object window 320 have also been automatically repositioned according to the new locations in the 2D object window 270. The reverse is also true, that is, repositioning of the cells in the 3D object window 320 automatically repositions the objects in the 2D object window 270.

The attributes and behaviors associated with each class can be modified within the 2D object window 270 or the 3D object window 320. In the preferred embodiment of the 2D object window 270, the attributes and behaviors associated with a particular class can be modified by double-clicking on the desired object when the pointer object tool 274 is selected. In the preferred embodiment of the 3D object window 320, the attributes and behaviors associated with a particular class can be modified by double-clicking on the desired cell. Selecting the desired object or cell in the above manner presents the class editor window 290 for the selected class, where modifications to the class can be performed.

Figure 26:
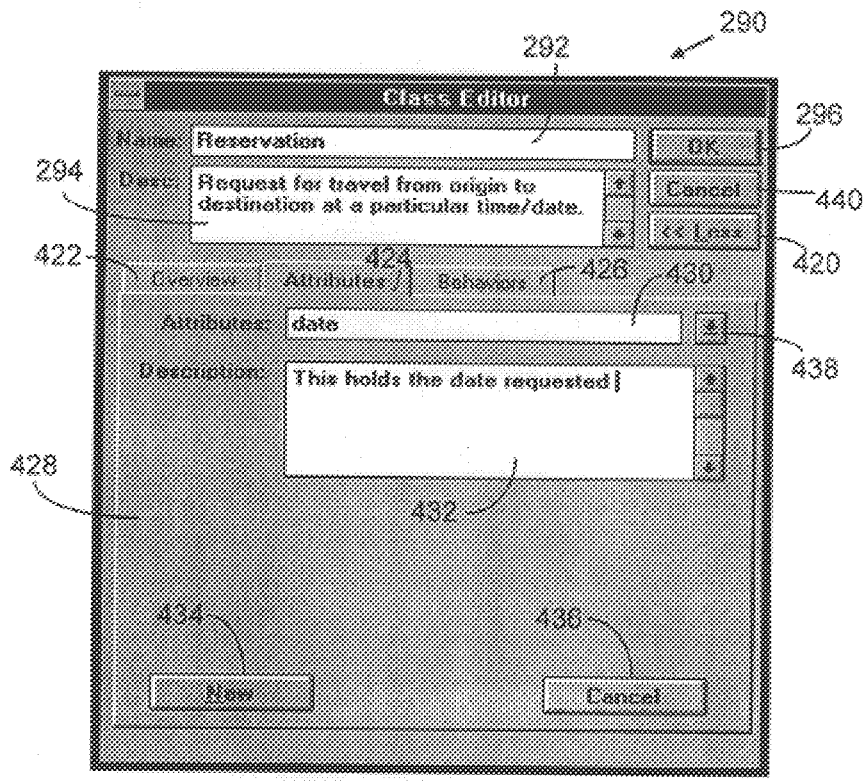
FIG. 26 is a depiction of the class editor window 290 for a selected class.

FIG. 26 shows the class editor window 290 for a selected class. Where an object or cell is selected from the 2D object window 270 or the 3D object window 320, the class editor window 290 is presented having all associated information for that class which was entered into the recipient list window 350. For example, FIG. 26 displays the class editor window 290 where the reservation cell 412 was selected from the 3D object window 320. The class editor window 290 is the same class editor window 290 of FIG. 14, except that an option within the class editor window 290 has been selected. The class editor display button 420 in the class editor window 290 allows the user to toggle between displaying an abbreviated version of the class editor window 290 as shown in FIG. 14, and the full version as shown in FIG. 26. Selecting the class editor display button 420 when the full version of the class editor window 290 is displayed reduces the class editor window 290 to its abbreviated version shown in FIG. 14. The abbreviated version is accomplished by hiding the lower portion of the class editor window 290 that includes the overview tab 422, the attributes tab 424, and the behaviors tab 426. Selecting the class editor display button 420 again would restore the full display as shown in FIG. 26.

The class editor window 290 of FIG. 26 includes the class name entry field 292, which automatically presents the name of the class associated with the object or cell selected from the 2D object window 270 or the 3D object window 320 respectively. The selected class for this case is the "reservation" class. The class description field 294 includes a description of the reservation class.

The user can select any one of the overview tab 422, the attributes tab 424 and the behaviors tab 426. In FIG. 26, the attributes window 428 is shown, which is presented upon selection of the attributes tab 424. Selection of the attributes tab 424 presents an attribute name field 430, and an attribute descriptions field 432 in the attributes window 428. The attribute name field 430 allows the user to enter a new attribute for the reservation class, or view an existing attribute. A description of the attribute is presented in the attribute description field 432. In the example of FIG. 26, a new attribute has been added to the reservation class. The attribute has been named "date" in the attribute name field 430, and is described in the attribute description field 432 as "This holds the date requested". To enter this new attribute, the new button 434 in attribute window 428 is selected. The user can also decide not to enter the new attribute by selecting the cancel button 436. Existing attributes and their descriptions can be viewed by selecting the attribute pull-down button 438, which provides a selectable list of the current attributes associated with the class. The class editor window is closed with changes saved by selecting the OK button 296, and is closed without saving changes by selecting the cancel button 420.

Figure 27:
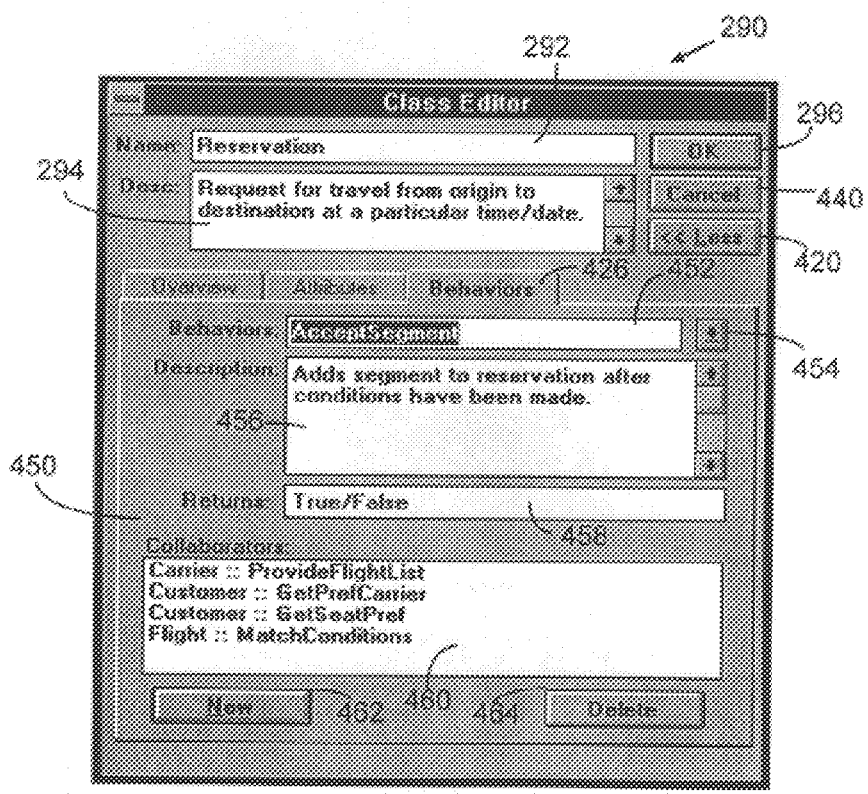
FIG. 27 is a depiction of the behaviors window 450 within the class editor window 290.

FIG. 27 shows the behaviors window 450 which is presented upon selection of the behaviors tab 426 from the class editor window 290. A new behavior can be entered in the behavior name field 452, or an existing behavior can be entered in the behavior name field 452 by selecting the behavior pull-down button 454 and selecting an existing behavior from a list of existing behaviors. In the example of FIG. 27, an existing behavior labeled "AcceptSegment" has been selected in the behavior name field 452. A description of the behavior in the behavior name field 452 is provided in the behavior description field 456. The returns field 458 allows the user to describe the return value of the behavior named in the behavior name field 452. The collaborators field 460 is automatically filled out for the behavior named in the behavior name field 452 based on information provided during the collaboration step. Each of the entries in the collaborators field 460 represents an interaction from the class named in the class name entry field 292 to the class named in the particular entry in the collaborators field 460. The behaviors associated with of the classes in the collaborators field 460 are also listed. For example, an entry in the collaborations field 460 which reads "Carrier::ProvideFlightList" represents an interaction from the reservation class named in the class name entry field 292 to the carrier class. The behavior associated with this interaction is the "ProvideFlightList" behavior. The returns field 458 and the collaborators field 460 will be described in more detail in connection with the description of the interaction diagrams described below.

New behaviors and their descriptions are entered by the user into the behavior window 450. A new behavior name is entered into the behavior name field 452, and a description and a return value are then entered into the behavior description field 456 and the returns field 458 respectively. The new behavior is accepted upon selection of the new button 462. Any of the existing behaviors, which are presented upon selection of the behavior pull-down button 454, can be deleted from the system by selecting the delete button 464 in the behaviors window 450.

Figure 28:
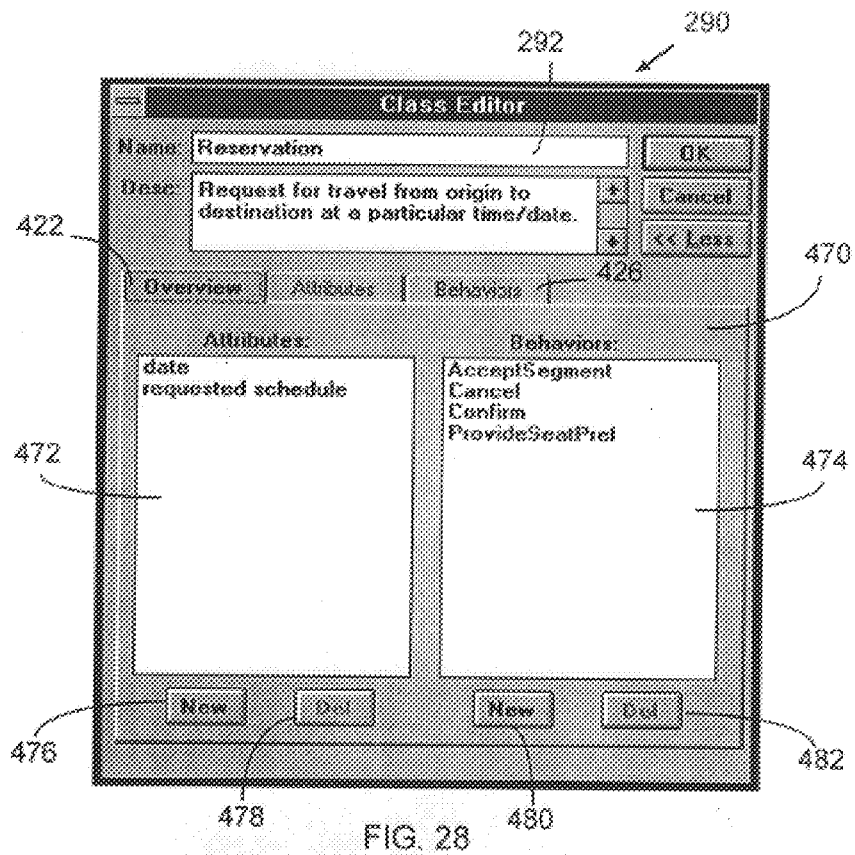
FIG. 28 is a depiction of the overview window 470 within the class editor window 290.

Referring now to FIG. 28, the overview window 470 of the class editor window 290 is shown. Selection of the overview tab 422 presents an attribute list 472 and a behaviors list 474. All of the attributes associated with the class in the class name entry field 292 are listed in the attribute list 472. Similarly, all of the behaviors associated with the class in the class name entry field 292 are listed in the behaviors list 474. The overview tab 422 can be selected from the class editor window 290 at any time to view a particular class's attributes and behaviors.

When the user has entered a new attribute, the overview window 470 will update the attribute list 472 to include the new attribute. The attribute list 472 shows the new attribute named "date". New attributes can also be entered from the overview window 470 by selecting the new attribute button 476 from the overview window 470. The user can similarly delete an attribute from the attribute list 472 by selecting the desired attribute in the attribute list 472, and then selecting the delete attribute button 478 located under the attribute list 472.

When the user has entered a new behavior, the overview window 470 will update the behavior list 474 to include the new behavior. The behavior list 474 in FIG. 28 shows the behaviors currently associated with the reservation class. New behaviors can be entered by selecting the behaviors tab 426 as previously described, or they can also be entered from the overview window 470 by selecting the new behavior button 480 from the overview window 470. The user can delete a behavior from the behavior list 474 by selecting the desired behavior in the behavior list 474, and then selecting the delete behavior button 482 located under the behavior list 474.

Figure 29:
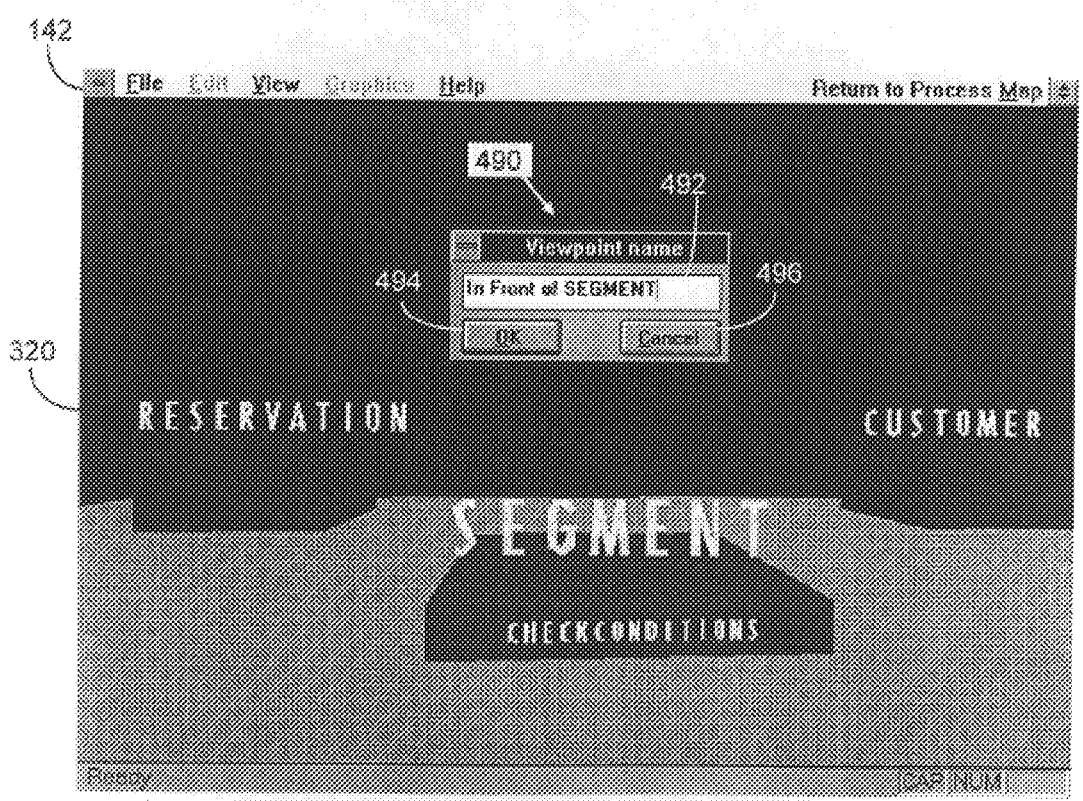
FIG. 29 depicts the viewpoint name window 490, and illustrates the manner in which viewpoints can be saved in the 3D objects window 320.

FIG. 29 illustrates the manner in which viewpoints can be saved in the 3D objects window 320. The "add viewpoint" function can be initiated by various user input mechanisms, including menu-driven input. One of the menu selections on the menu bar 142 is a view menu selection, which includes sub-menus. One sub-menu item allows the user to save a particular view in the 3D object window 320 for future reference. The user can move to any view within the 3D object window 320, and open the viewpoint name window 490 by selecting the corresponding sub-menu or by providing other appropriate user input. The viewpoint name window 490 allows the user to enter a name for the view being saved. The name entered in the viewpoint name field 492 is "In Front of SEGMENT", which is saved as the viewpoint name when the user selects the OK button 494. Saving a viewpoint name can be canceled, if desired, by selecting the cancel button 496. A saved viewpoint name is made available to the user by entering appropriate user input. In the preferred embodiment, the saved viewpoint name is added to a list of viewpoint names in a menu list. The desired view can then be seen by choosing the desired viewpoint name from the menu list. This will automatically change the view in the 3D objects window 320 to the view that was captured at the time the viewpoint name was saved. Viewpoint names can also be deleted from the list when the saved view is no longer needed.

In the preferred embodiment, two default views are always available to the user, which are named the "overhead view" and the "ground view". Selection of the ground view viewpoint name from the viewpoint name menu list automatically changes the view in the 3D object window 320 to a view as seen from the plane on which the cells in the 3D object window 320 are positioned. Selection of the overhead view viewpoint name from the menu list of viewpoint names provides a view in the 3D object window 320 which is perpendicular to the plane on which the cells are positioned, or in other words, from the top of the cells.

Figure 30:
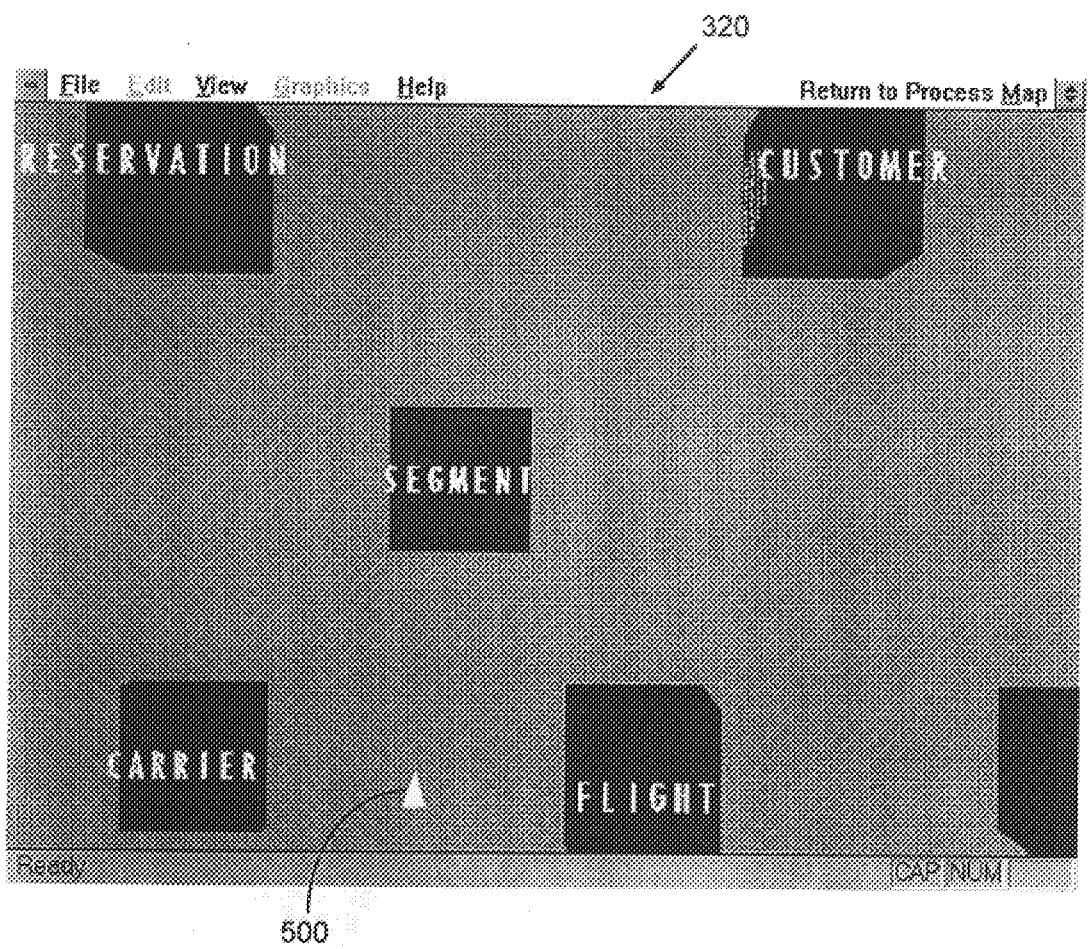
FIG. 30 is an overhead view in the 3D object window 320, and illustrates how saved views are denoted in the 3D object window.

FIG. 30 illustrates an overhead view in the 3D object window 320, and further illustrates how saved views can be denoted in the 3D object window 320. The overhead view displays the class objects as seen from a vantage point above and approximately perpendicular to the plane on which the cells are positioned. Furthermore, the vantage point from which a particular view was saved can be denoted in the 3D object window 320 by selecting a "show viewpoint" function that can be initiated by various user input mechanisms, including menu-driven input. The view menu selection on the menu bar 142 in the preferred embodiment includes a menu selection item that toggles viewpoint indicators on and off. When enabled, viewpoints indicators are shown in the 3D object window 320, as is seen by viewpoint indicator 500 in FIG. 30. The viewpoint indicator 500 represents the vantage point from which the "In Front of SEGMENT" view was saved using the viewpoint name window 490 shown in FIG. 29. Referring to FIGS. 29 and 30, it can be seen that the viewpoint indicator 500 is located in a position from which the view was saved in the 3D object window 320 in FIG. 29. The viewpoint indicator 500 of the preferred embodiment is represented as a cone-shaped icon which points in the direction of the saved view from the location of the saved view. When enabled, viewpoint indicators can be seen in any view within the 3D object window 320, whether from the ground view, the overhead view, or any other view created by the user. The viewpoint indicators can also be seen as the user moves throughout the 3D object window 320 using the 3D object toolbar 324.

Figure 31:
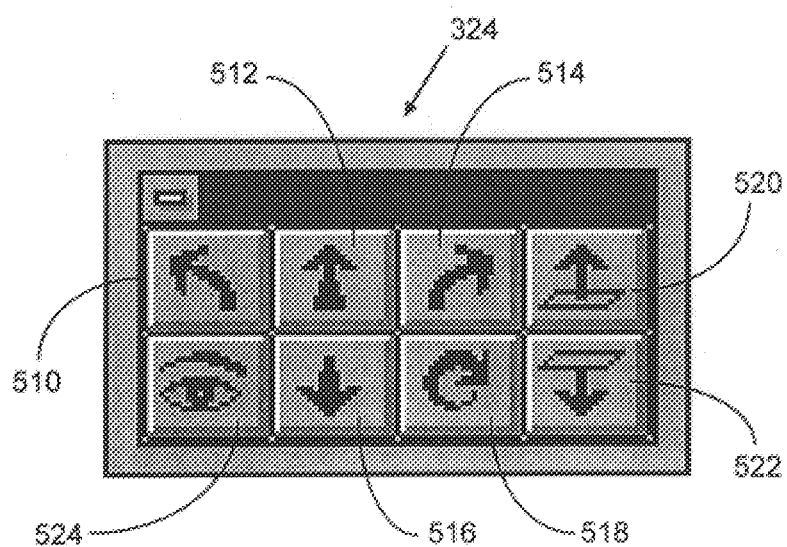
FIG. 31 illustrates the toolbar icons of the 3D object toolbar 324.

In order for a user to move throughout the 3D object window 320, the user selects directional icons from the 3D object toolbar 324, as shown in FIG. 31. These directional icons allow the user to maneuver around the cells in the 3D object window 320 to view the three-dimensional model from any vantage point. The left arrow icon 510 dynamically changes the view as if rotating a line of sight to the left. The forward arrow icon 512 dynamically changes the view in the 3D object window 320 as if moving forward into the three-dimensional view. The right arrow icon 514 dynamically changes the view as if a line of sight was rotated to the right. The reverse arrow icon 516 changes the view to back away from the current view in the 3D object window 320. The rotate icon 518 changes the view as if the viewer were rotating around a substantially central point in the 3D object window 320. The up arrow icon 520 changes the view by raising the viewing vantage point to a higher location. The down arrow icon 522 changes the view by lowering the viewing vantage point, which can be lowered until the ground plane is reached. The cycle viewpoint icon 524 allows the user to toggle between views that have been saved using the viewpoint name window 490, as well as the default views which in the preferred embodiment include the ground view and the overhead view. Each time the cycle viewpoint icon 524 is selected, the next viewpoint is activated, and the user is taken to that view in the 3D object window 320.

Figure 32:
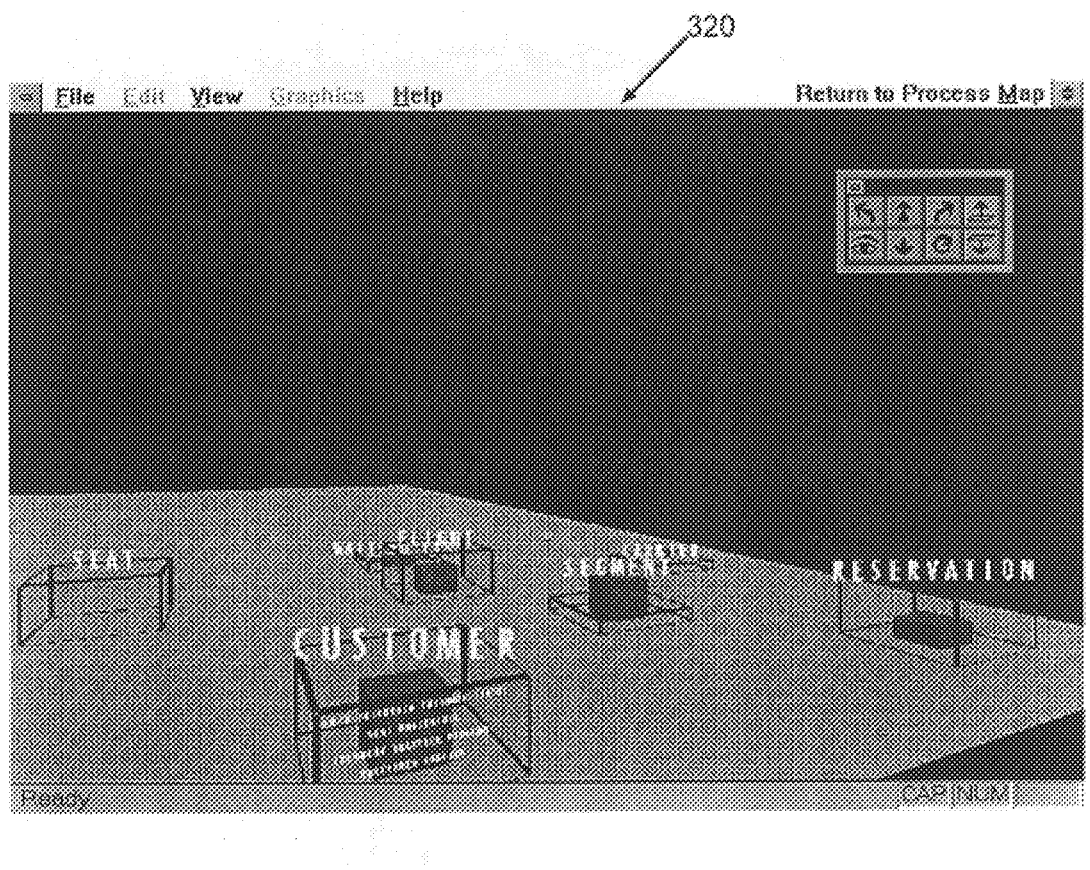
FIG. 32 illustrates the capability of the OTV software tool to display the attributes of each class in the 3D object window 320.

Referring now to FIG. 32, the capability of the OTV software tool to show the attributes in each class is shown. The "show attributes" function can be initiated by various user input mechanisms, including menu-driven input. In the preferred embodiment, the user selects a menu selection item that toggles the display of attributes on and off. The view shown in FIG. 32 displays the 3D object window 320 when the show attributes function has been toggled to the "on" position, thereby displaying the encapsulated attribute data within each cell. The outer shell of each cell becomes partially transparent, leaving each outer shell displayed as a wire frame 534. The attributes associated with each cell become visible, being displayed as an inner core of one or more stacked attribute layers surrounded by the wire frame 534 outer shell.

Figure 33:
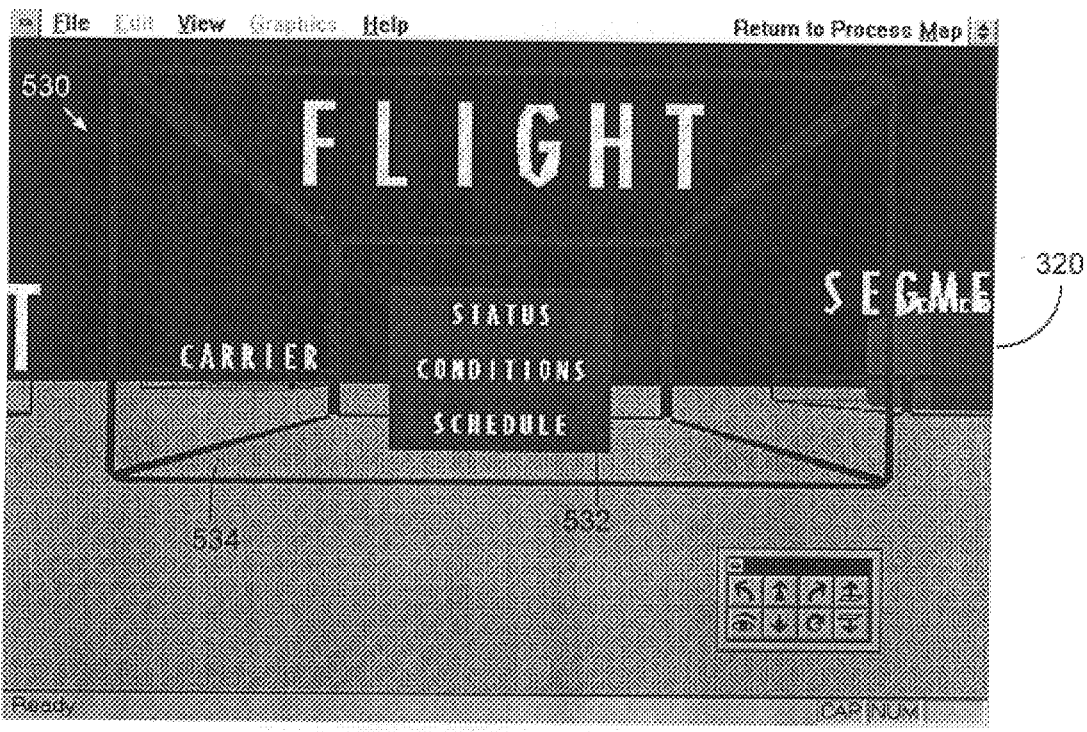
FIG. 33 illustrates a maximized view of the flight cell 530 in the 3D object window 320 when the user elects to display attributes.
Figure 34:
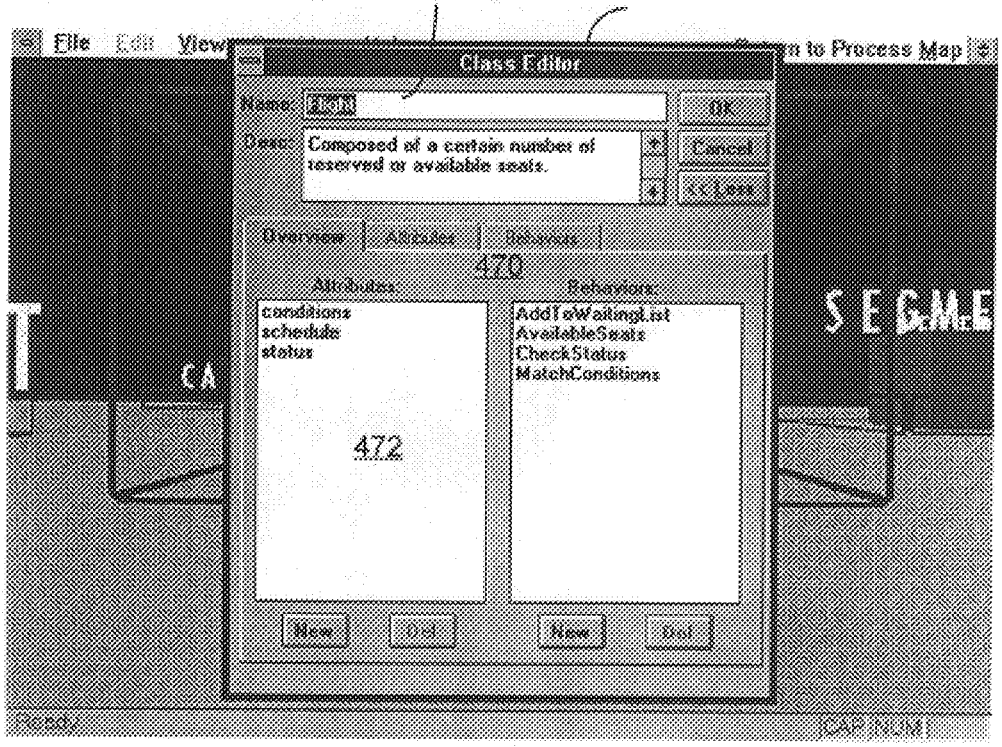
FIG. 34 displays the class editor window 290 as presented by selecting a cell in the 3D object window 290.

FIG. 33 illustrates a maximized view of the flight cell 530 in the 3D object window 320 when the user elects to display attributes. As can be seen, the outer shell, or the surface walls of the flight cell 530 are transparent, and an attribute box 532 representing the stacked attribute layers within the flight cell 530 becomes visible. There are three attributes associated with the flight cell 530, including the status, condition, and schedule attributes. Any of the attributes in the attribute box 532 can be selected by clicking on the desired attribute. This allows the user to view, modify, or add attributes for the class represented by the cell, by opening of the class editor window 290 as seen in FIG. 34. The class editor window 290 automatically presents the name of the class associated with the selected attribute in the class name entry field 292. The attributes associated with the respective class are then presented in the attribute list 472 of the overview window 470. At this point, attributes and behaviors can be added or deleted as described in connection with FIGS. 26, 27 and 28.

Figure 35:
FIG. 35 is a depiction of the flight cell 530 having the "show attributes" function disabled, hiding the inner core of stacked attribute layers, and displaying one or more stacked opaque behavior layers.

Referring now to FIG. 35, the flight cell 530 is shown having the show attributes function disabled. The outer shell of the flight cell 530 becomes visible, hiding the inner core of stacked attribute layers, and displaying one or more stacked opaque behavior layers 536. The three-dimensional flight cell 530 lists its associated behaviors on its outer shell. A "show behavior names" function can be initiated by various user input mechanisms, including menu-driven input. In the preferred embodiment, the user selects a menu selection item that toggles the display of behavior names on behavior layers 536 on and off. When the user has enabled the display of the behavior names, the outer shell displays the one or more stacked opaque behavior layers relating to the behaviors of the class corresponding to the cell. In FIG. 35, the stacked opaque behavior layers 536 display the behavior names "AddToWaitingList", "CheckStatus", "AvailableSeats", and "MatchConditions", which parallel the behavior names in the behavior list 474 of the class editor window 290 of FIG. 34. Each of these layers is labeled with the respective behavior name when the show behavior names function is enabled. When the show behavior names function is disabled, the stacked opaque behavior layers are still visible, but the behavior name labels are not visible thereon.

A "collaboration" is a relationship that exits between two or more objects to fulfill the responsibility of a certain object. The process of finding collaborations between objects helps to identify the communication and relationships between objects. This is an important step in determining the points of intersection between classes, and helps to minimize the number of interactions between objects. An interaction diagram is one way to display the collaborations which occur in a given scenario.

Figure 36:
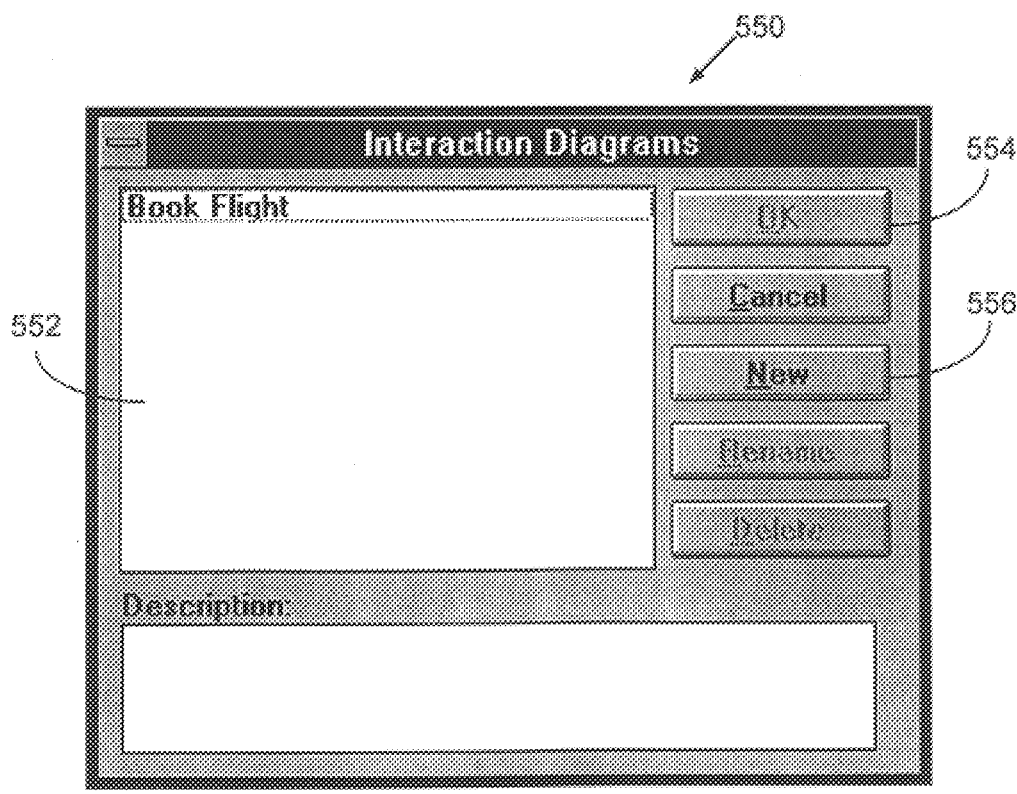
FIG. 36 is a depiction of the interaction diagram selection window 550.
Figure 37:
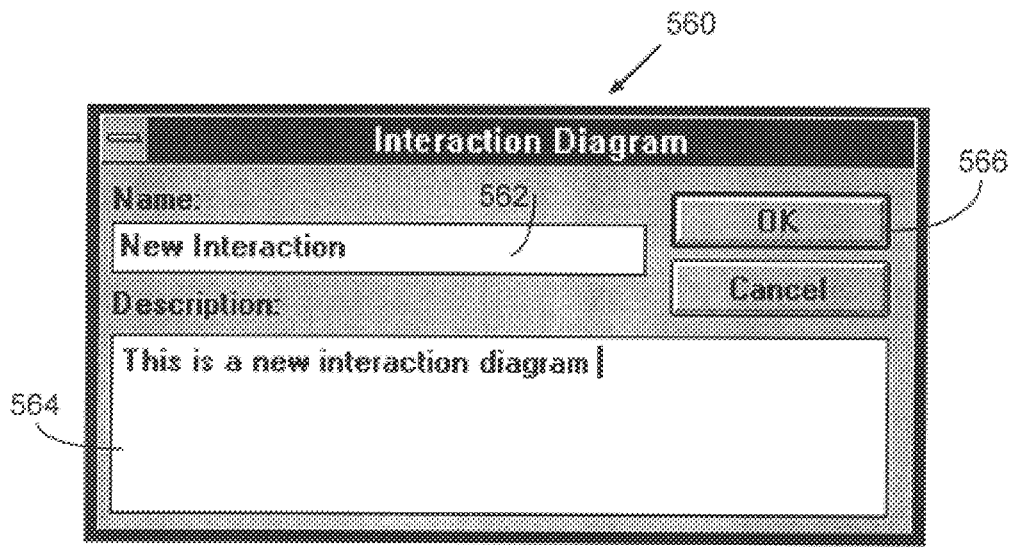
FIG. 37 is a depiction of the new interaction diagram window 560.

Collaborations are entered at step 200 of FIG. 5 by selecting the collaborations icon 180 in FIG. 4. Selection of the collaboration icon 180 presents the interaction diagram selection window 550 as shown in FIG. 36. A list of existing interaction diagrams will be shown in the interaction list field 552 to allow the user to select collaborations previously entered by selecting the interaction, and selecting the OK button 554. New interactions can be entered by selecting the new button 556. Selecting the new button 556 opens the new interaction diagram window 560 as shown in FIG. 37. The new interaction diagram window 560 allows the user to enter a name for the interaction diagram in the interaction diagram name field 562, and a description of the new interaction diagram in the interaction diagram description field 564. Selection of the OK button 566 on the new interaction diagram window 560 opens the interaction diagram window 570 as shown in FIG. 38.

Figure 38:
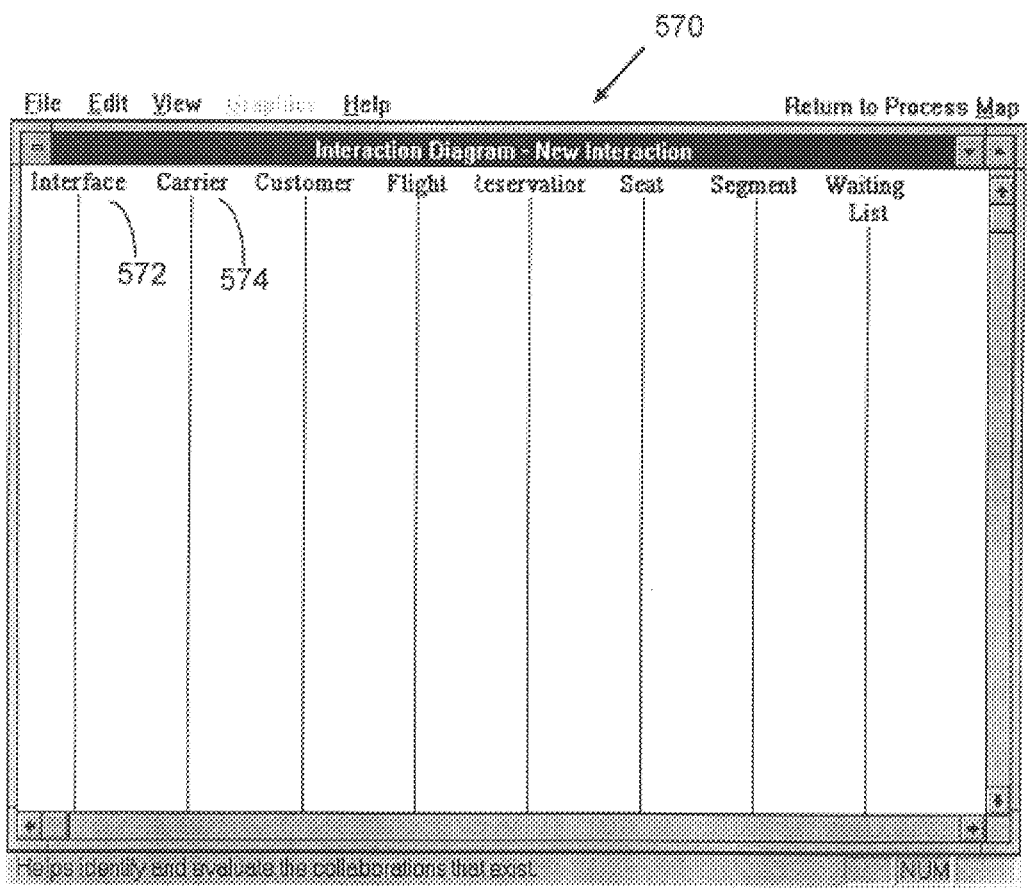
FIG. 38 is a depiction of the interaction diagram window 570.
Figure 39:
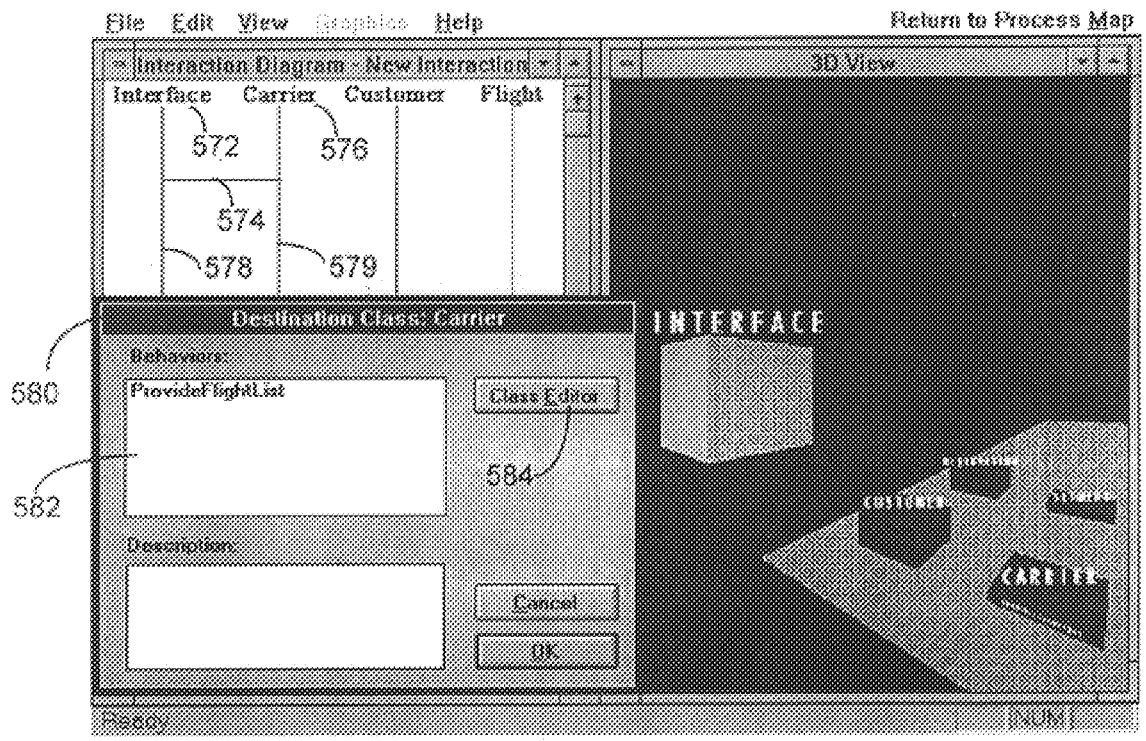
FIG. 39 is a depiction of the destination class window 580, and illustrates the manner in which interactions can be created between classes in the interaction diagram window 570.
Figure 40:
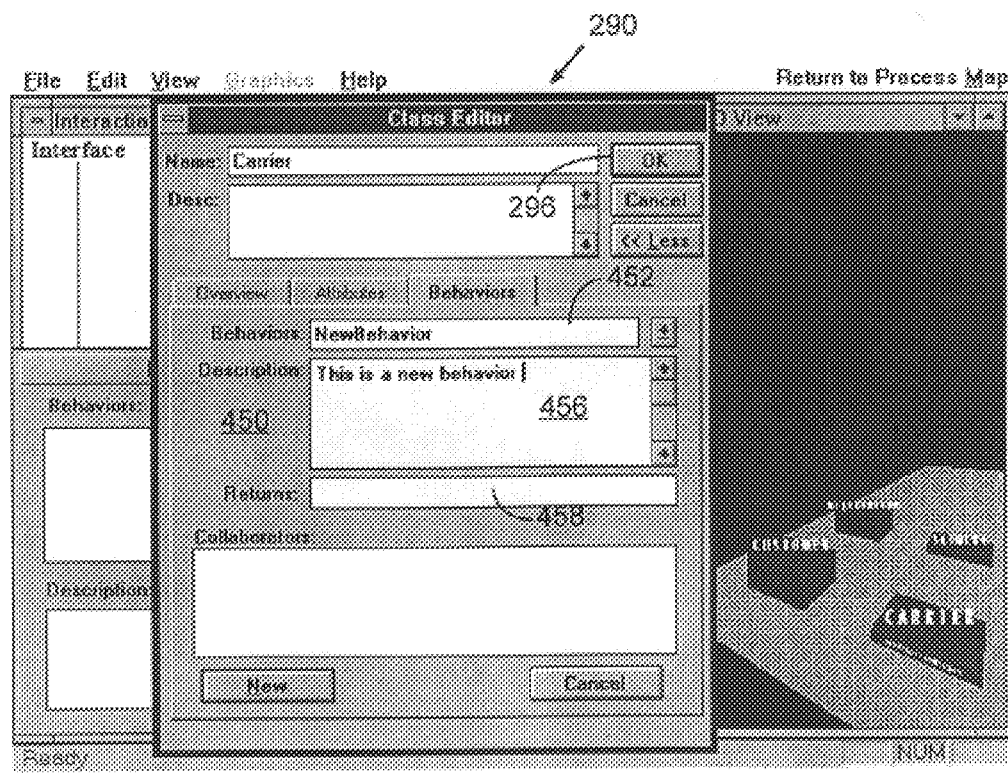
FIG. 40 illustrates how new behaviors can be added via the class editor window 290 from the interaction diagram window 570.

The interaction diagram window 570 of FIG. 38 allows the user to map interactions between objects to help identify the communication relationships. Collaborations between classes are created by drawing a line from one class to another class. The class labeled interface 572 is a starting point for the interaction diagram. Using a pointing device such as a mouse, a line 574 can be drawn from the interface object line 578 to the carrier object line 579 as shown in FIG. 39. Upon releasing the mouse button near the carrier object line 579 associated with the carrier class 576, the destination class window 580 for the carrier class is presented. The behaviors associated with the carrier class are listed in the behavior list field 582. Any of the behaviors in the behavior list field 582 can be selected as the behavior interaction between the interface class 572 and the carrier class 576. New behaviors can be added in the behavior list field 582 by selecting the class editor button 584 which opens the class editor window 290 as shown in FIG. 40. The new behavior can be entered in the behavior name field 452 in the behavior window 450, and a description of that new behavior can be added in the behavior description field 456. The new behavior is accepted upon selection of the OK button 296.

Figure 41:
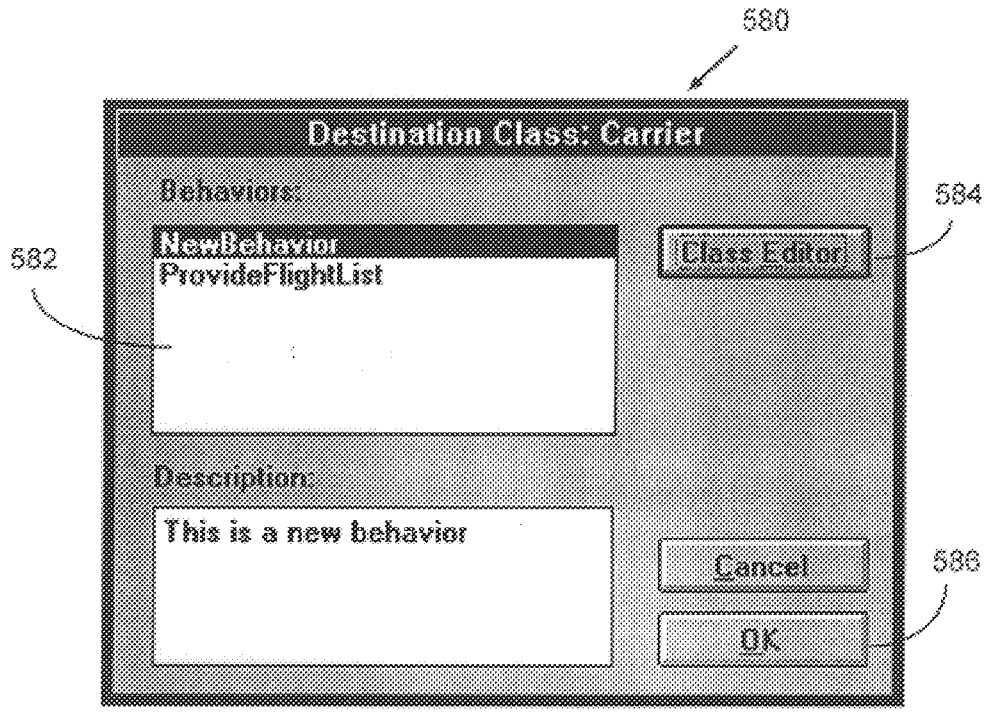
FIG. 41 is a depiction of the destination class window 580 including the new behavior in the behavior list field.
Figure 42:
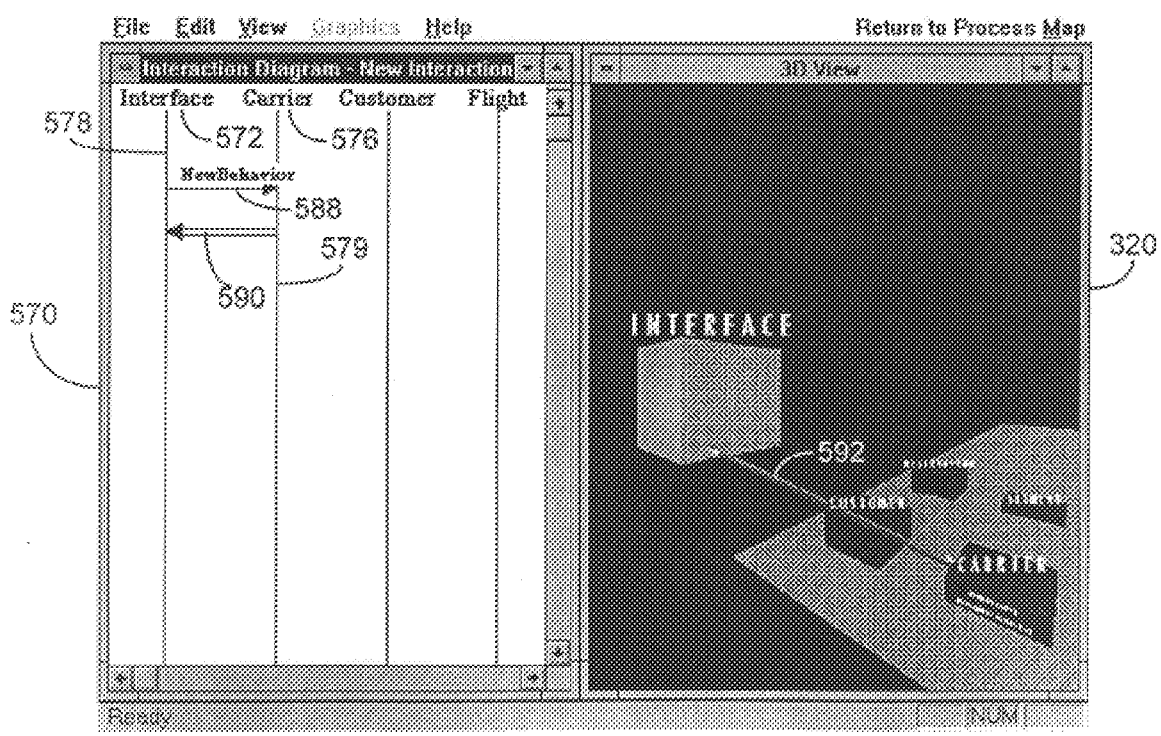
FIG. 42 illustrates two-dimensional interaction lines in the interaction diagram window 570.

Referring now to FIG. 41, the destination class window 580 is shown to include the new behavior in the behavior list field 582. The new behavior is then selected by highlighting the new behavior, and selecting the OK button 586. A directional interaction line 588 labeled NewBehavior is then created from the interface object line 578 to the carrier object line 579 as shown in FIG. 42. A return interaction line 590 is unlabeled because the returns field 458 in the class editor window 290 of FIG. 40 was left blank. This interaction diagram therefore includes an action called NewBehavior, and processing then returns to the interface class 572 with no return value. Additional interactions between other classes are created similarly.

When the interaction labeled NewBehavior on interaction line 588 and the return interaction line 590 are created between the interface class 572 and the carrier class 576, a three-dimensional view of the interactions can be seen in the 3D object window 320. In order to show these interaction lines in the 3D object window 320, a "show interactions" function must be enabled. The show interactions function is initiated in the preferred embodiment by selecting a menu item that toggles the display of three-dimensional interactions on and off. When the show interactions function is enabled, all collaborations defined in the interaction diagram window 570 will be shown in the 3D object window 320 as three-dimensional interaction lines 592.

Figure 43:
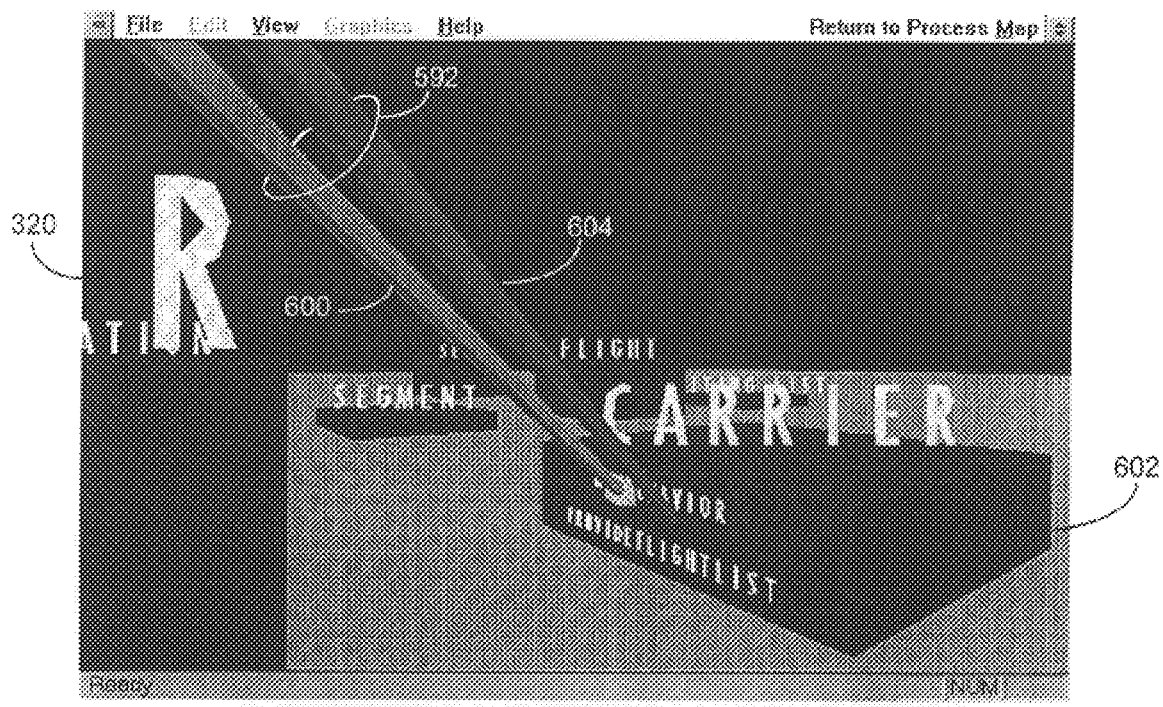
FIG. 43 shows three-dimensional interaction lines in the 3D object window 320.

Referring now to FIG. 43, the three-dimensional interaction lines 592 are individually shown in the 3D object window 320. The NewBehavior interaction line 588 of FIG. 42 is shown as three-dimensional NewBehavior interaction line 600, shown entering the carrier cell 602 proximate the behavior labeled NEWBEHAVIOR on the outer shell of the carrier cell 602. The 3D return interaction line 604 corresponds to the return interaction line 590 in the interaction diagram window 570 of FIG. 42, and is shown exiting the carrier cell 602 proximate the behavior labeled NEWBEHAVIOR on the outer shell of the carrier cell 602.

Figure 44:
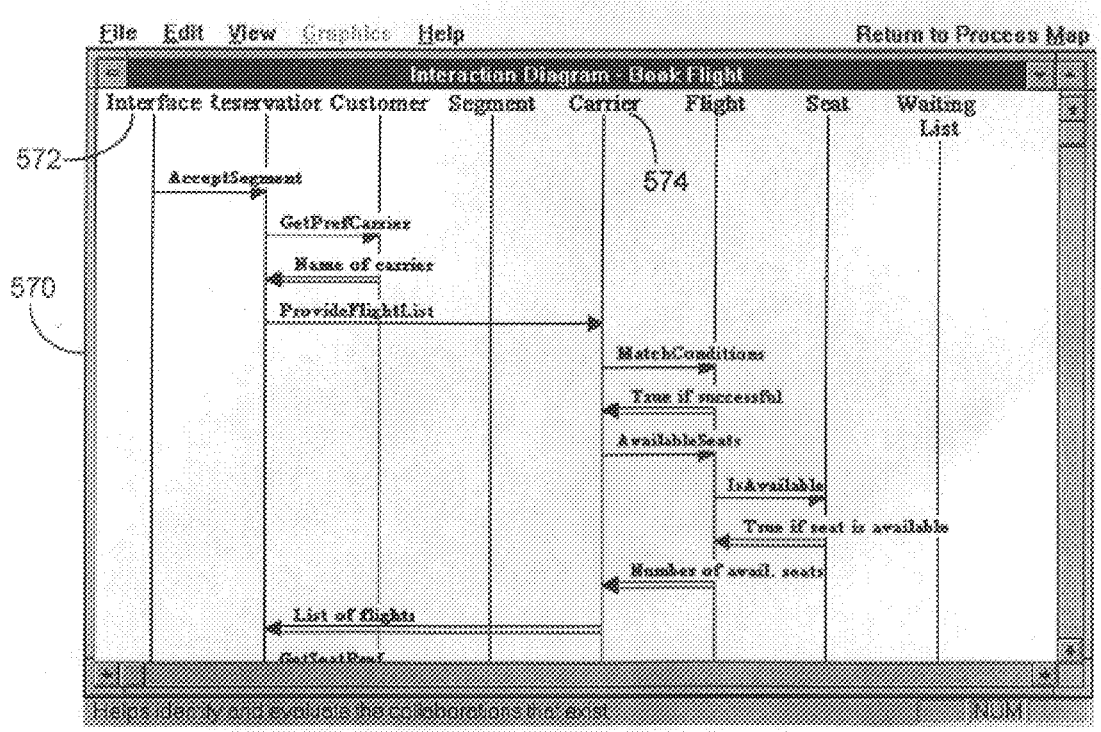
FIG. 44 illustrates a previously defined interaction diagram in the interaction diagram window 570.

FIG. 44 illustrates a previously defined interaction diagram in the interaction diagram window 570. This interaction diagram can be loaded in the interaction diagram window 570 by selecting the interaction diagram labeled "Book Flight" in the interaction diagram selection window 550 of FIG. 36. All interaction lines and interaction return lines can be seen in the interaction diagram window 570.

The order in which the classes are presented in the interaction diagram window 570 can be modified in the interaction diagram window 570. Using a known "click and drag" method, a class can be moved to change the appearance of the interaction lines in the interaction diagram window 570. For example, in FIG. 38, the carrier class 574 is shown to the immediate right of the interface class 572. By "clicking and dragging" on the text "Carrier" associated with the carrier class 574, the text "Carrier" can be moved to the location shown in FIG. 44. In FIG. 44, the carrier class 574 is shown as the fourth class to the right of the interface class 572. The carrier class 574, along with all of its associated interactions, are redrawn at the new location.

Figure 45:
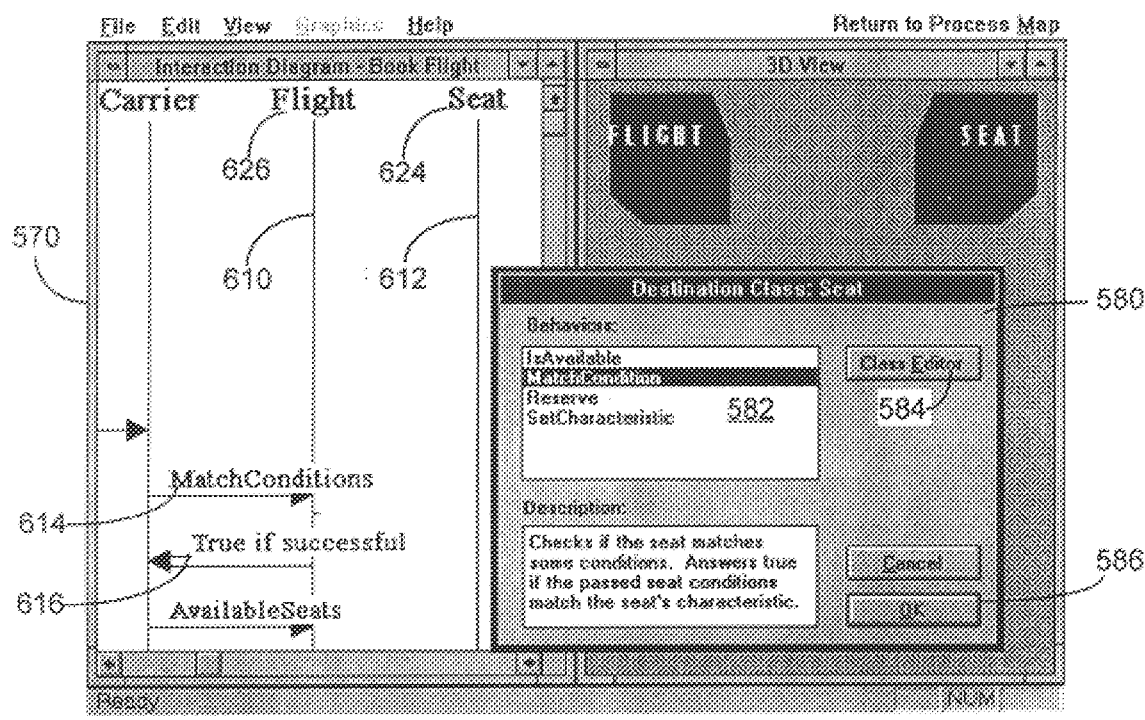
FIG. 45 illustrates the preferred process of creating new interactions in a pre-existing interaction diagram.
Figure 46:
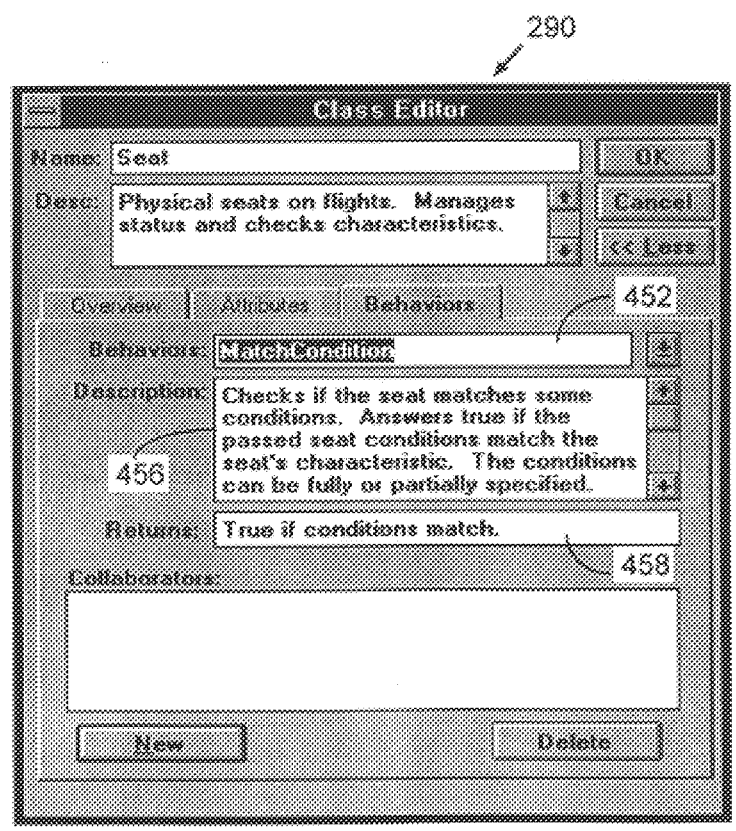
FIG. 46 illustrates how new behaviors may be included for a class from the class editor window 290.

Referring now to FIG. 45, the process of creating new interactions in a pre-existing interaction diagram is shown. To create a new interaction line from the flight object line 610 to the seat object line 612 between the "MatchConditions" interaction line 614 and the "True if successful" return interaction line 616, the user clicks on the flight object line 610 and drags the mouse pointer to the seat object line 612. Releasing the mouse button proximate the seat object line 612 presents the destination class window 580 which lists all the behaviors associated with the seat class in the behavior list field 582. Any of the behaviors in the behavior list field 582 can be selected by highlighting the desired behavior and clicking on the OK button 586. If a new behavior is desired, the user may select the class editor button 584, which allows the user to add new behaviors for particular classes from the class editor window 290 as shown in FIG. 46. The class editor button 584 in the destination class window 580 of FIG. 45 can also be selected to review or amend the behavior name, the description and return value in the class editor window 290. The class editor window 290 shows the behavior name in the behavior name field 452, the description of the behavior in the behavior description field 456, and the return value in the returns field 458, from which the behavior name, the description and the return value can be modified.

Figure 47:
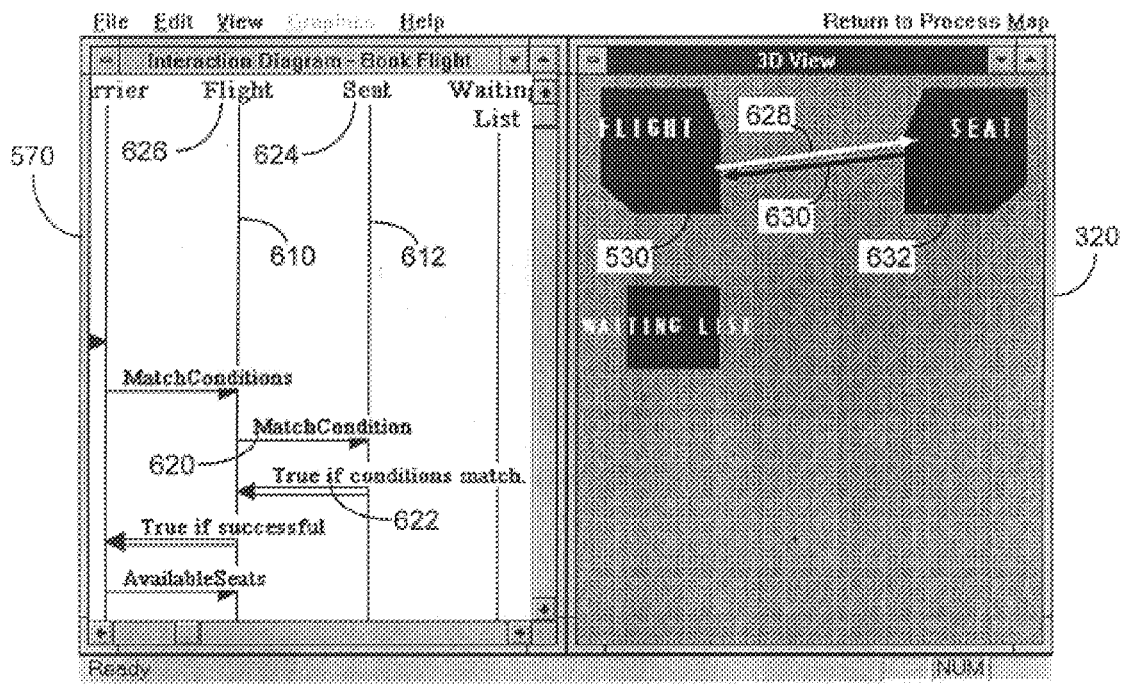
FIG. 47 shows the new behavior on the interaction lines of the interaction diagram window 570 and shows the three-dimensional interaction in the 3D object window 320.

Referring to FIG. 47, the behavior labeled "MatchCondition" on interaction line 620 from the behavior name field 452 of FIG. 46 is shown extending from the flight object line 610 to the seat object line 612. The return value in the returns field 458 of FIG. 46 can be seen on the return interaction line 622, which shows the return value labeled "True if conditions match" from the seat object line 612 to the flight object line 610. This return value is derived from the return value entered in the returns field 458 of the class editor window 290 of FIG. 46. The interaction line 620 and the return interaction line 622 in the interaction diagram window 570 are also shown as 3D interaction line 628 and 3D interaction line 630 between the flight cell 530 and the seat cell 632 in the 3D object window 320, which is shown from the overhead view.

Figure 48:
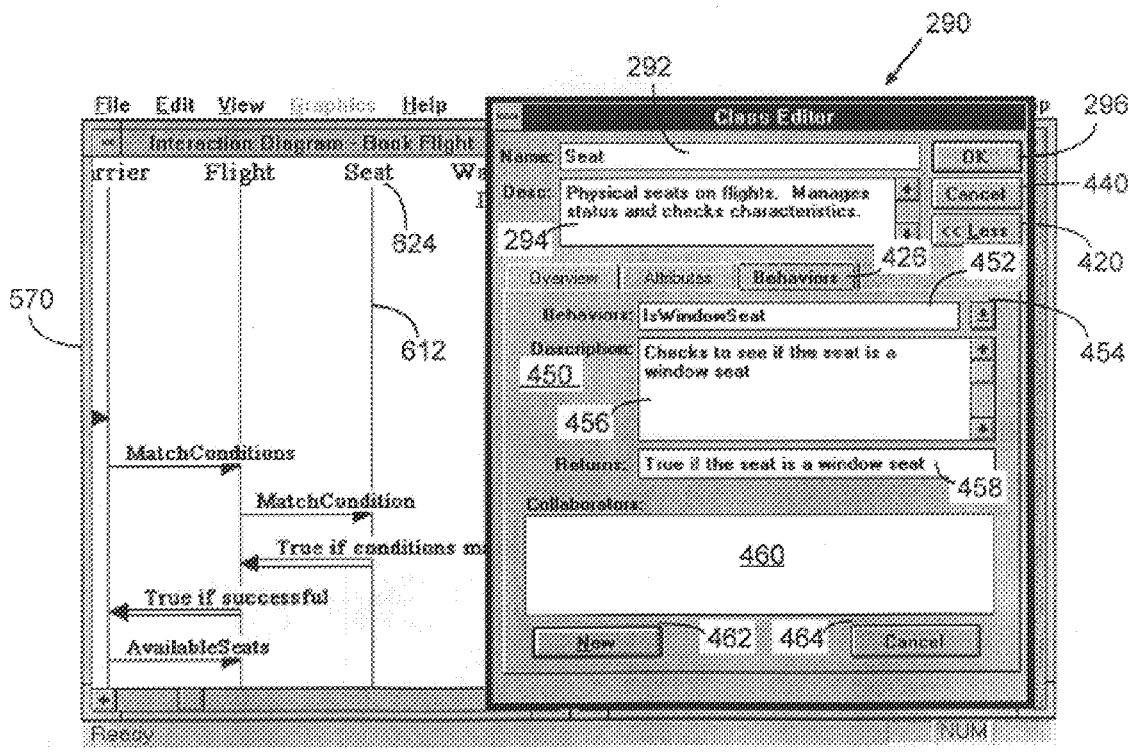
FIG. 48 illustrates the manner in which new behaviors can be added from the destination class window 580.

FIG. 48 illustrates the manner in which new behaviors can be added from the destination class window 580 of FIG. 45. Where a behavior to be associated with an interaction line is not listed in the behavior field 582 of the destination class window 580, the class editor button 584 is again selected.

The system then presents the class editor window 290 having the name of the class in the class name entry field 292. A new behavior can be entered as previously described by selecting the behaviors tab 426, which opens the behaviors window 450. The new behavior name is then entered into the behavior name field 452, which for the present example is labeled "IsWindowSeat". A description of the new behavior is entered into the behavior description field 456, and the return value is entered into the returns field 458. Upon selecting the OK button 296, the class editor window 290 is closed, and the destination class window 580 displays the new behavior labeled IsWindowSeat in the behavior list field 582.

The user may decide to add a new behavior upon analyzing the interactions in the interaction diagram window 570. Referring to FIG. 48, the user may determine that an interaction within a single class is necessary. For instance, the user may select the seat object line 612 by clicking and releasing on the seat object line 612. This will present the destination class window 580, and the class editor window 290 can be activated as discussed above. The new behavior named "IsWindowSeat" in the behavior name field 452 is the new behavior for the interaction from the seat class 624 to itself.

Figures 49, 50:
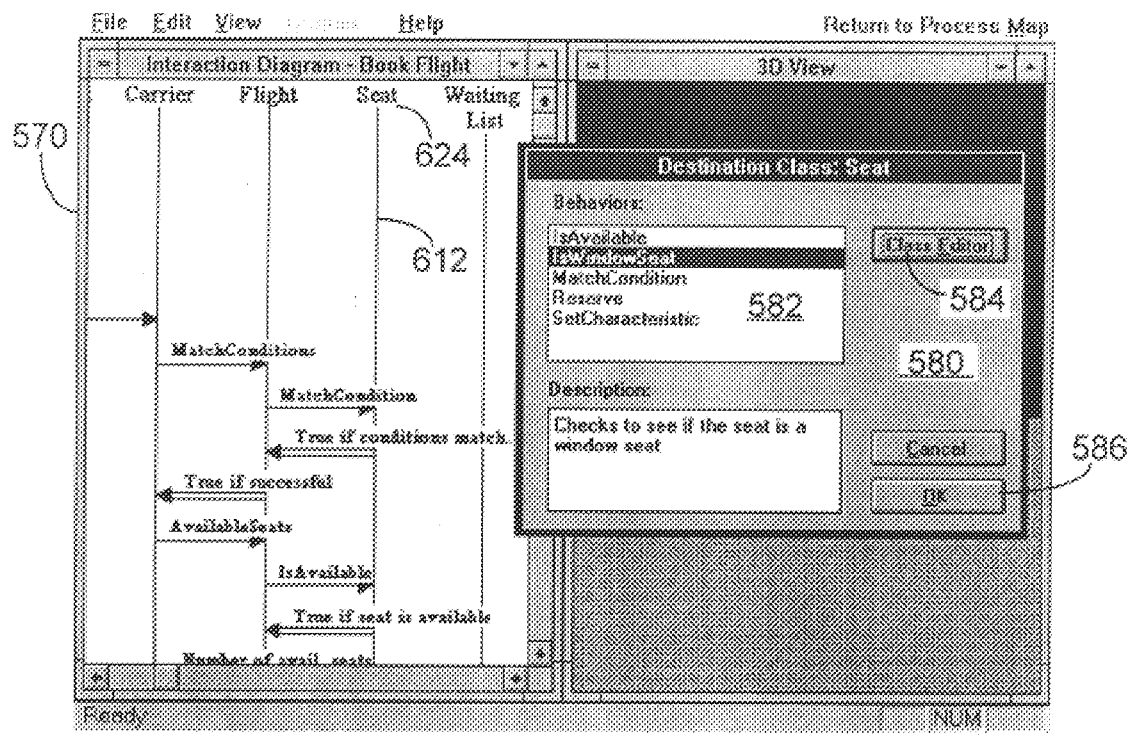
FIG. 49 shows the destination class window 580 having the new behavior in the behavior list field 582.
FIG. 50 shows the new interaction at the seat class 624 in the interaction diagram window 570, and shows the simultaneously generated three-dimensional interaction lines in the 3D object window 320.

Referring now to FIG. 49, the destination class window 580 having the new behavior in the behavior list field 582 is shown. The new behavior labeled "IsWindowSeat" can be highlighted in the behavior list field 582. Selection of the OK button 586 when the new behavior is highlighted will enter the new behavior as an interaction from the seat class 624 to itself on seat object line 612 in the interaction diagram window 570.

FIG. 50 shows the new interaction at the seat class 624 in the interaction diagram window 570. The new interaction labeled "IsWindowSeat" on interaction line 640 is shown beginning at the seat class 624 on seat object line 612, and returning to the seat object line 612. Similarly, the return value labeled "True if the seat is a window seat" on return interaction line 642 begins at the seat class 624 on seat object line 612 and returns to the seat object line 612.

FIG. 50 also illustrates that the interactions in the interaction diagram window 570 are simultaneously illustrated in the 3D object window 320. The new behavior is shown in the 3D object window 320 by 3D line 644 which can be seen leaving the seat cell 632 and re-entering the seat cell 632. 3D return line 646 represents the return value that was labeled "True if the seat is a window seat". These three-dimensional interaction and interaction return lines provide the user with a clear visual representation of the interactions associated with the class.

Figure 51:
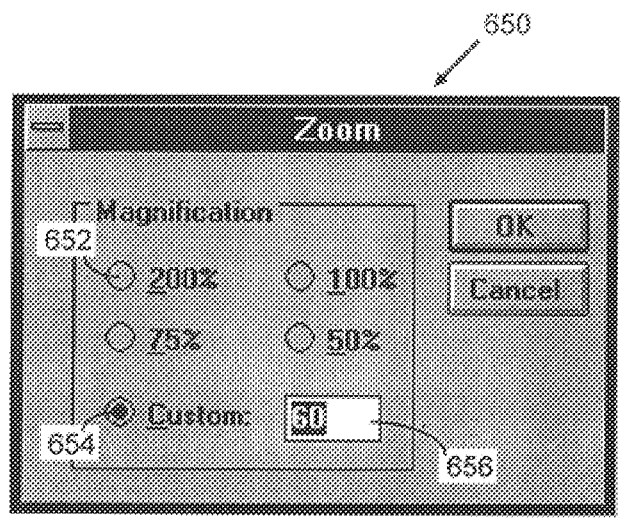
FIG. 51 is a depiction of the view zoom window 650.
Figure 52:
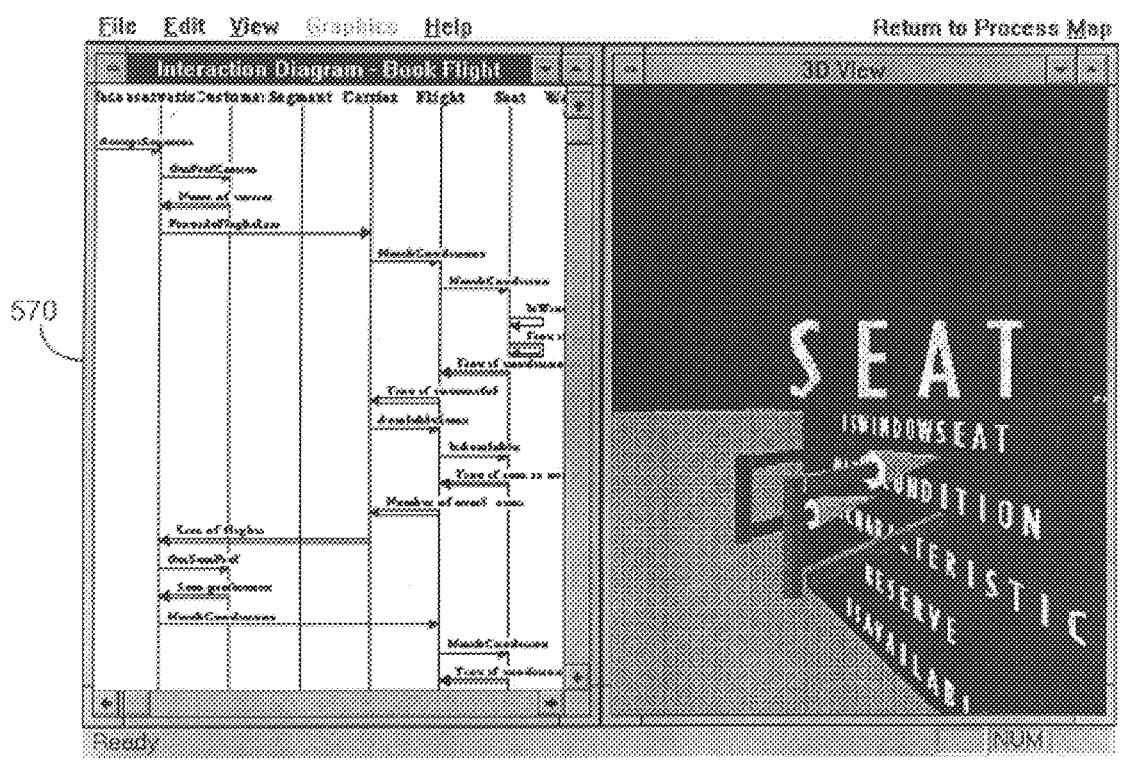
FIG. 52 shows the interaction diagram window 570 where a custom value has been entered into the view zoom window 650.

Referring now to FIG. 51, the view zoom window 650 is shown. The view zoom window 650 allows the user to change the view of the interaction diagram window 570 by "zooming" in and out. The view zoom window 650 provides fixed magnification option buttons, such as the 200% option button 652, which magnifies the standard view in the interaction diagram window 570 by two-hundred percent. The view zoom window 650 also provides a custom magnification option button 654, which provides custom zooming capabilities. For instance, in the example of FIG. 51, the custom magnification option button 654 is selected, and a custom value of "60" is entered into the custom magnification field 656. This will reduce the interaction diagram window 570 to sixty percent of the standard view size. FIG. 52 shows the interaction diagram window 570 where a custom value of "60" has been entered into the custom magnification field 656 of the view zoom window 650.

Interactions between classes can be viewed individually in conjunction with the interaction diagram window 570 as described above. These interactions are shown in the 3D object window 320 so that the user can see a visual depiction of the interrelations between classes. In order to further enhance this visual depiction, the preferred embodiment of the invention provides a moving image of the interactions within the 3D object window 320. Depending on the mode of operation chosen, the interactions between cells can be viewed progressively from the first interaction to the last interaction, being analogous to a motion picture. The motion in the 3D object window 320 is a result of real-time rendering, rather than a series of previously saved images.

Figure 53:
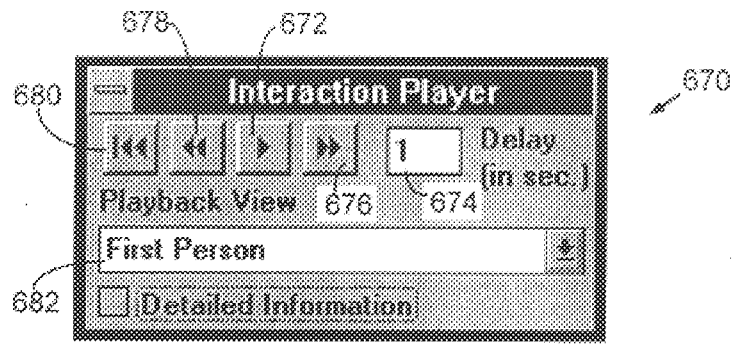
FIG. 53 is a depiction of the preferred interaction player window 670.

Referring now to FIG. 53, the interaction player window 670 is shown. The interaction player window 670 can be opened through a variety of different user inputs, including menu-driven input, tool bar input, and keystroke input. In the preferred embodiment, the interaction player window 670 is activated by selecting a menu selection item. The interaction player window 670 allows the user to control the playback of interaction in the 3D object window 320.

The interaction player window 670 includes control buttons for displaying the interactions in the 3D object window 320. The play button 672 starts playback of the interactions in the order they are presented in the interaction diagram window 570. The interactions in the interaction diagram window 570 will be played back in a top-to-bottom order as displayed in the interaction diagram window 570. Playback of the interactions will be delayed each time an interaction line or interaction return line reaches a three-dimensional cell in the 3D object window 320. The delay can be controlled by the user by entering the desired delay in the interaction delay field 674. The play button 672 changes to a pause button (not shown) during actual interaction playback to allow the user to pause the playback at any point. The step forward button 676 allows the user to move forward one interaction, and one interaction only, each time the step forward 676 is activated. The step back button 678 allows the user to step back one interaction, and one interaction only, each time the step back button 678 is selected. The playback rewind button 680, when selected, returns the interaction playback to the first interaction in the sequence. The detailed information option button 682 is a toggle button that enables and disables an additional display in the interaction player window 670. The detailed information option button 682 is shown in its disabled state in FIG. 53.

Figure 54:
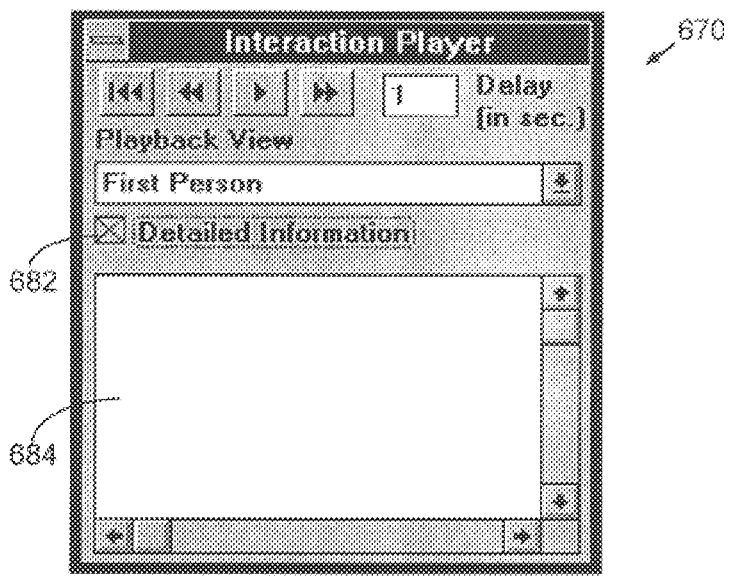
FIG. 54 illustrates the interaction player window 670 when the detailed information option button is enabled.

FIG. 54 illustrates the interaction player window 670 when the detailed information option button 682 is enabled. When the detailed information option button 682 is enabled the interaction player window 670 displays the detailed information field 684. This field provides a textual representation of each of the interactions as the interactions are played back.

Figure 55:
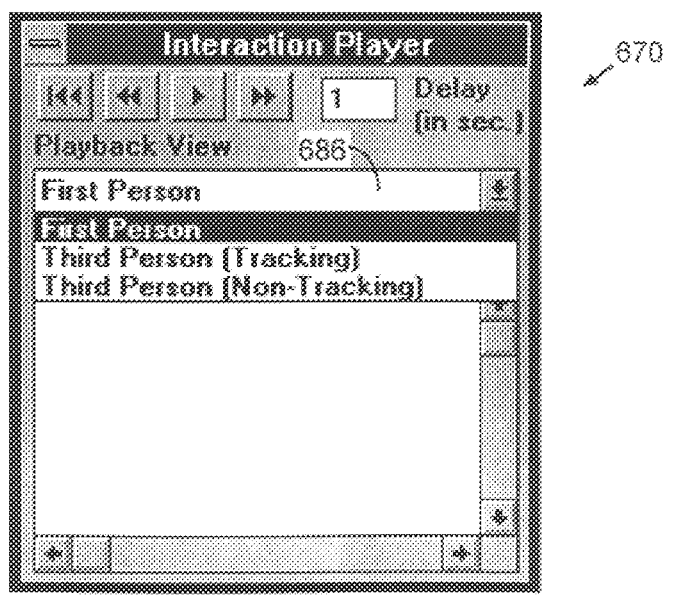
FIG. 55 shows the playback view field 686 in the interaction player window 670.

Referring now to FIG. 55, the playback view field 686 is shown. In the preferred embodiment, three different playback views are provided: a first person view, a third person tracking view, and a third person non-tracking view. Each of these different views provide the user with a different view of the 3D object window 320 as each is seen from a different vantage point.

Figure 56:
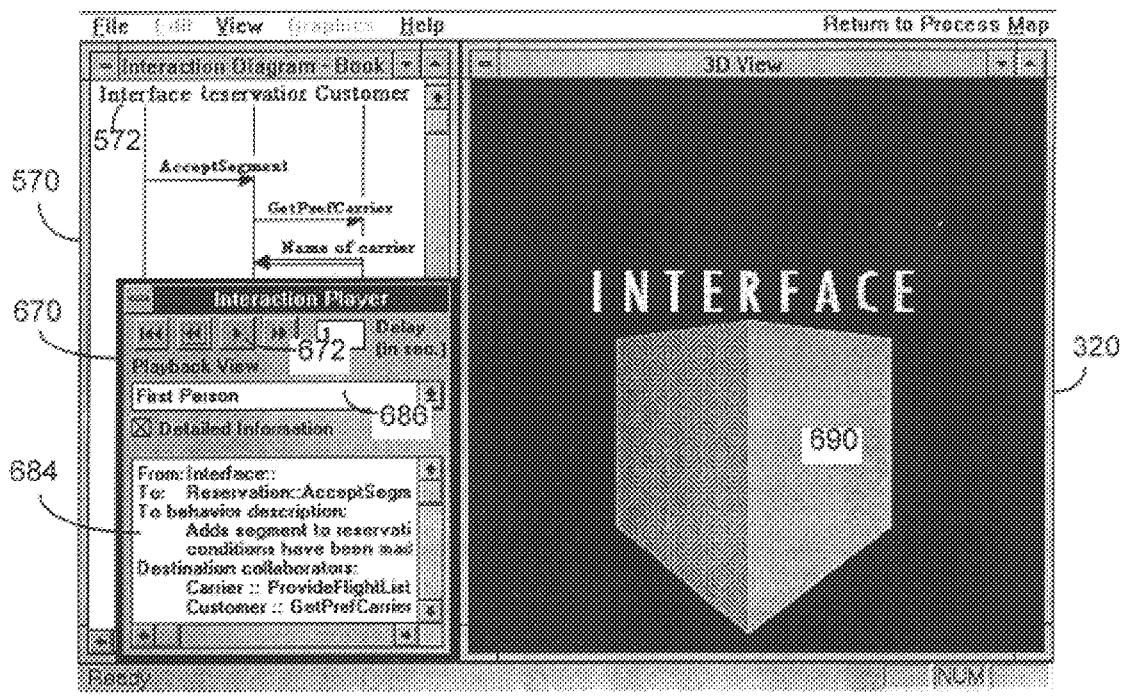
FIGS. 56 and 57 illustrate the first person view playback when selected in the playback view field of interaction player window 670.
Figure 57:
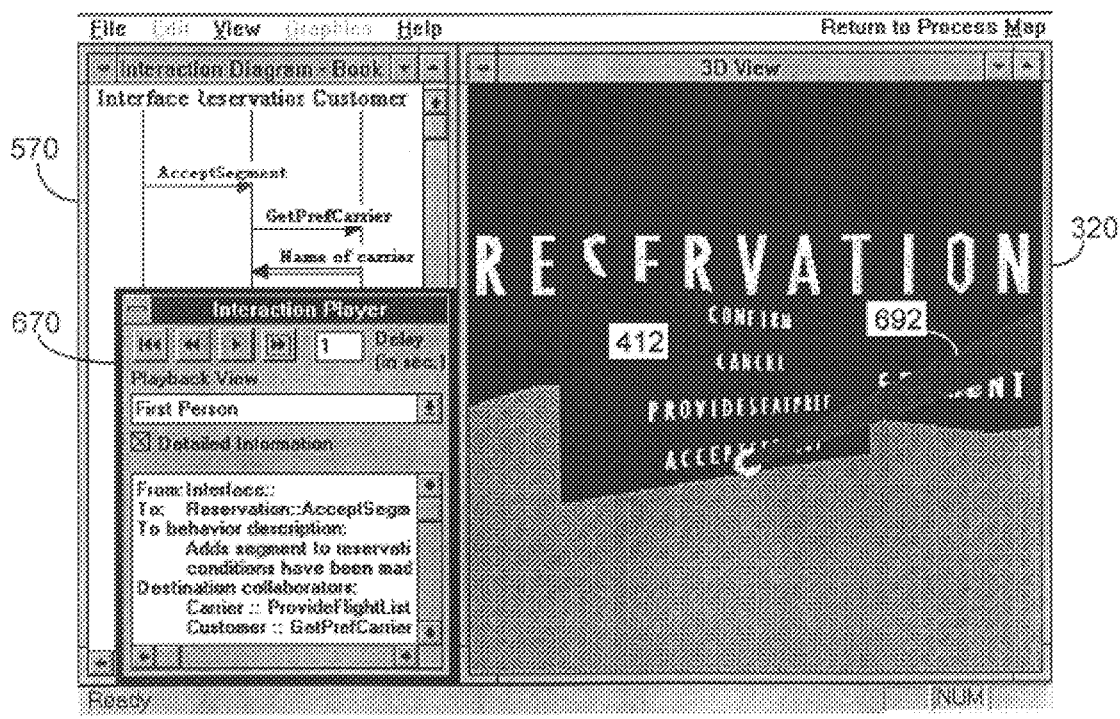

Referring now to FIG. 56, the first person view is selected in the playback view field 686 of interaction player window 670. The information in the detailed information field 684 provides the textual equivalent of the interaction sequence set forth in the interaction diagram window 570. The interface playback begins at the interface class 572, which represents the interface to the system model. An interface cell 690 is shown in the 3D object window 320. When the play button 672 is selected in the interaction player window 670, the view within the 3D object window 320 will dynamically change to rotate from the interface cell 690 towards a recipient class which is the termination point of the first interaction. After the view has dynamically rotated towards the recipient class, which is the reservation class in the example of FIG. 56, the display within the 3D object window 320 is dynamically moved towards the reservation cell 412 as shown in FIG. 57. The rotation from the interact cell 690 and the movement towards the reservation cell 412 occurs in first person view, where the vantage point for the line of sight moves from the interface cell towards the reservation cell 412. This has the appearance of actually moving from the interface cell 690 to the reservation cell 412. A 3D interaction line 692 is shown in FIG. 57 terminating at the reservation cell 412. The 3D interaction line 692 terminates proximate its corresponding behavior name on the reservation cell 412. This corresponding behavior name on reservation cell 412 will be the same as the behavior name associated with the interaction line in the interaction diagram window 570.

Figure 58:
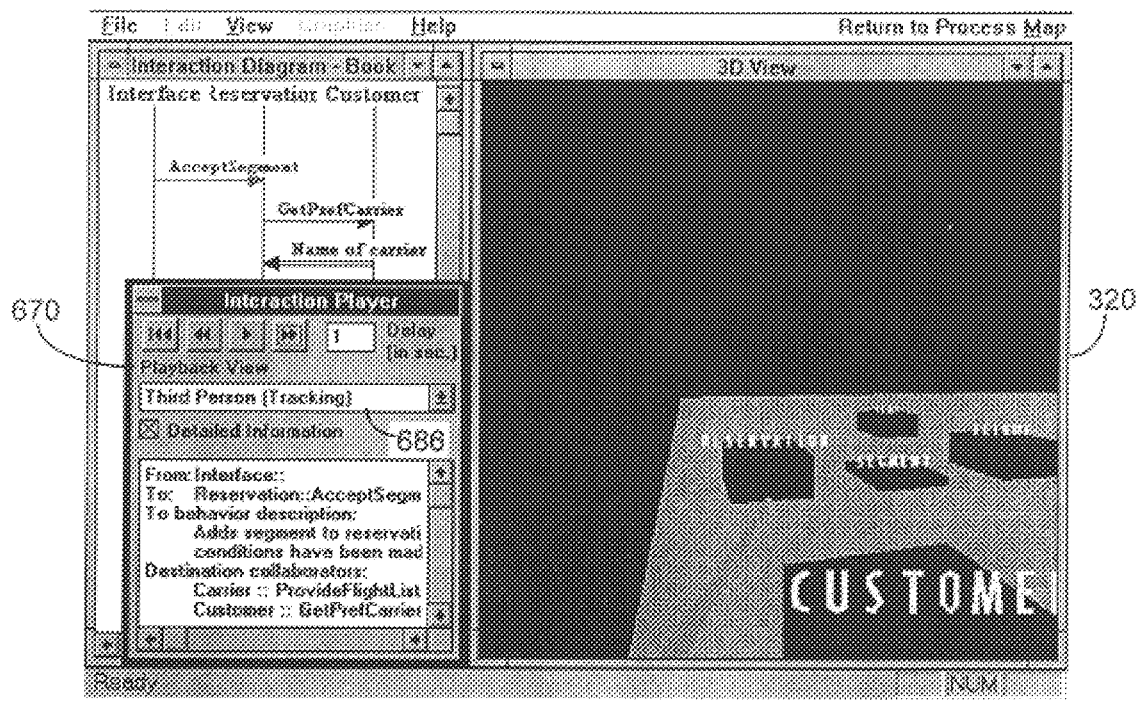
FIG. 58 illustrates the third person tracking view playback when selected in the playback view field of interaction player window 670.

Referring now to FIG. 58, the first interaction is shown from the third person tracking view selected in the playback view field 686. The third person tracking view provides a view in the 3D object window 320 from a different vantage point than that of the first person view. In the third person tracking view, the user moves the cursor within the 3D object window 320 to a desired location, and the view within the 3D object window 320 is rotated about that fixed location to show each of the interactions. In other words, where the first person view gives the appearance of the user moving throughout the 3D object window 320, the third person tracking view gives the appearance of a fixed user vantage point having the view within the 3D object window 320 move and rotate about that vantage point. The fixed vantage point can be set by the user to any location within the 3D object window 320. The motion in the 3D object window 320 is the result of real-time image rendering.

Figure 59:
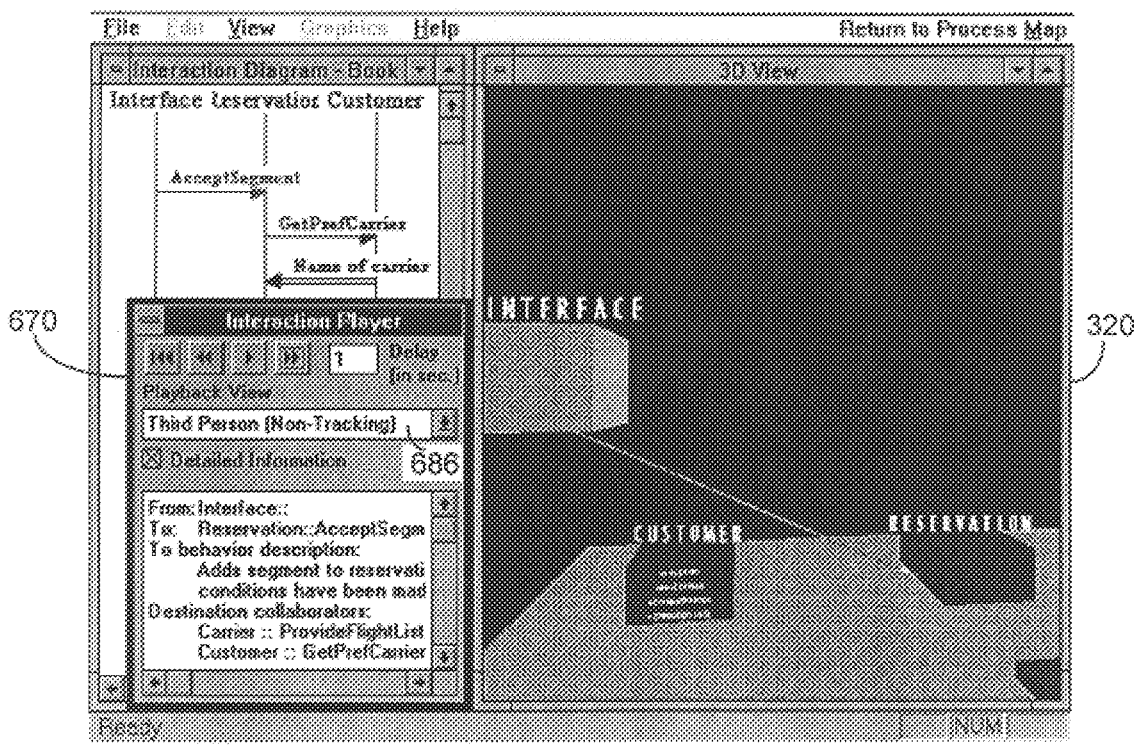
FIG. 59 illustrates the third person non-tracking view playback when selected in the playback view field of interaction player window 670.

Referring now to FIG. 59, the third person non-tracking view is illustrated. When the third person non-tracking view is selected in the playback view field 686 of the interaction player window 670, the view in the 3D object window 320 represents a fixed view from a fixed vantage point. Therefore, the third person non-tracking view differs from the third person tracking view in that the view in the 3D object window 320 does not rotate or move about the user's fixed vantage point. Only those interactions associated with the cells currently in the 3D object window 320 will be seen.

Figure 60:
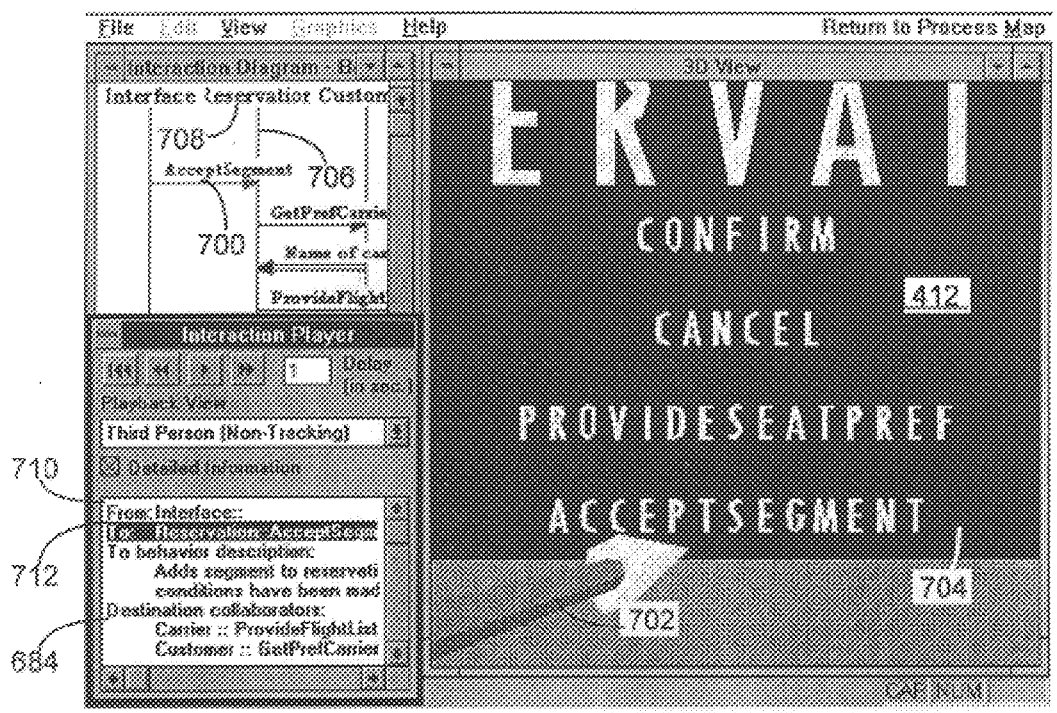
FIG. 60 illustrates the correlation between the interaction diagram window 570, the interaction player window 670, and a three-dimensional cell in the 3D object window 320.

Referring now to FIG. 60, the correlation between the interaction diagram window 570, the interaction player window 670, and a three-dimensional cell in the 3D object window 320 is shown. An interaction line 700, having the behavior name "AcceptSegment" corresponds to the 3D interaction line 702 terminating at the reservation cell 412 in the 3D object window 320. The 3D interaction line 702 is shown to terminate at the behavior layer labeled "ACCEPT-SEGMENT" 704. This corresponds with the interaction line 700 in the interaction diagram window 570 which terminates at the reservation object line 706 associated with the reservation class 708. The interaction player window 670 has an origin text line and a destination text line for each of the interactions which occur. The interaction origin text line 710 in the interaction player window 670 includes the text, "From: Interface::", which indicates that the origin of the particular interaction is from the interface class. The interaction destination text line 712 in the interaction player window 670 reads, "To: Reservation:: AcceptSegment". The interaction origin text line 710 and the interaction destination text line 712 will correspond to the interaction line 700 in the interaction diagram window 570, and the 3D interaction line 702 in the 3D object window 320. The information in the detailed information field 684 will continually scroll as interaction playback progresses.

Figure 61:
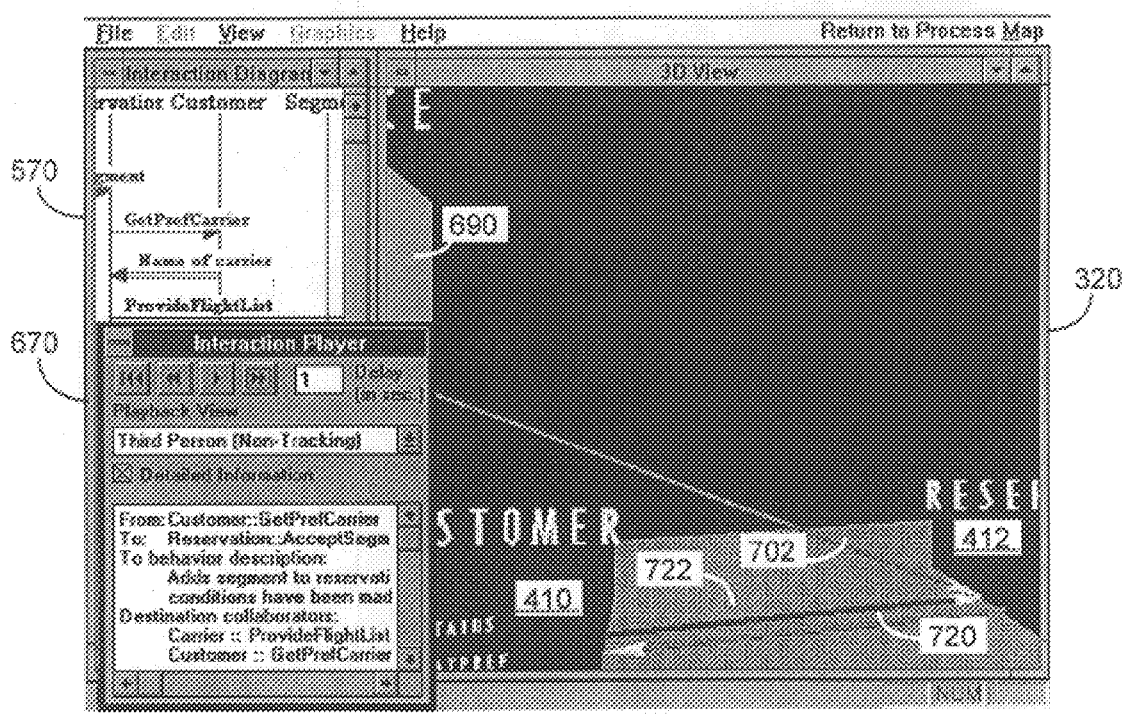
FIG. 61 shows the interaction diagram window 570, the interaction player window 670, and the 3D object window 320 after playback of three interactions.

Referring now to FIG. 61, the interaction diagram window 570, the interaction player window 670, and the 3D object window 320 are shown after three interactions have been played back. As each interaction is played back, the interaction lines and the behavior names in the interaction diagram window 570 are preferably changed to a different color to indicate that this interaction has been played back. Furthermore, the preferred embodiment uses a single interaction line in the interaction diagram window 570, and a double line to indicate interaction return lines. Referring to the 3D object window 320, the 3D interaction lines corresponding to the three played back interactions are shown. 3D interaction line 702 is again shown originating at the interface cell 690 and terminating at the reservation cell 412. The next interaction shown is 3D interaction line 720, which originates at the reservation cell 412 and terminates at the customer cell 410. The customer cell 410 provides a return value depicted by 3D interaction return line 722 which originates at the customer cell 410 and terminates again at the reservation cell 412. In the preferred embodiment, the 3D interaction lines and the 3D interaction return lines are of different colors to allow the user to quickly distinguish between the two types of interaction lines.

Figure 62:
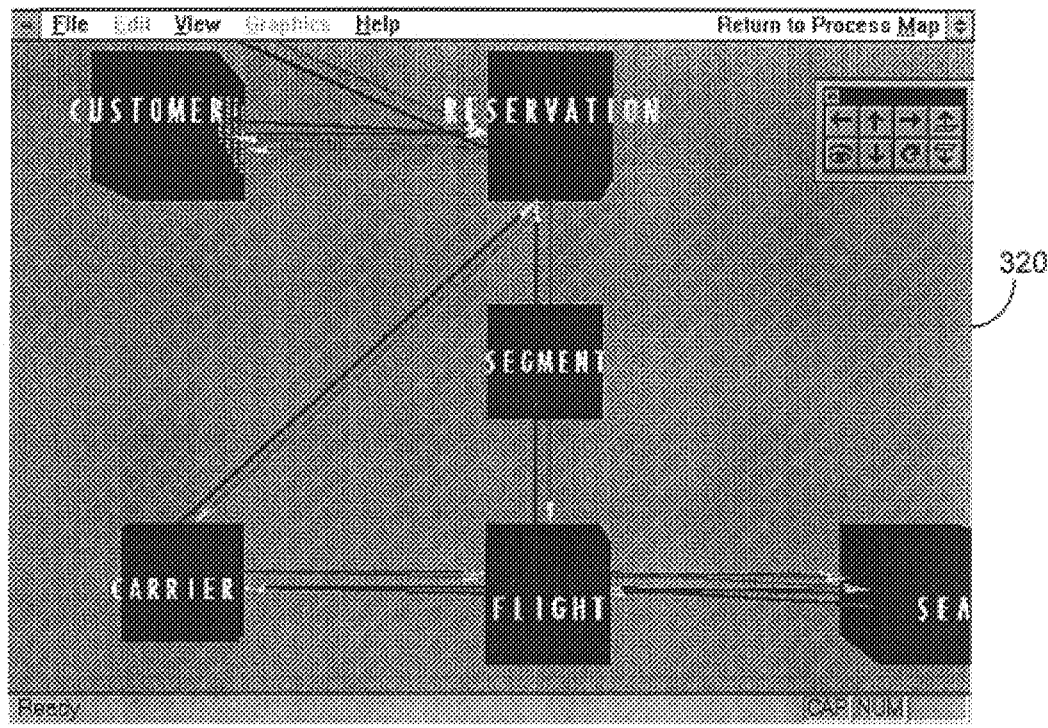
FIG. 62 illustrates an overhead view of multiple cells, and their 3D interaction lines and 3D interaction return lines.

FIG. 62 illustrates an overhead view of multiple cells and their 3D interaction lines and 3D interaction return lines. As playback continues by way of the interaction player window 670, the 3D interaction lines and 3D interaction return lines become visible in the 3D object window 320.

Figure 63:
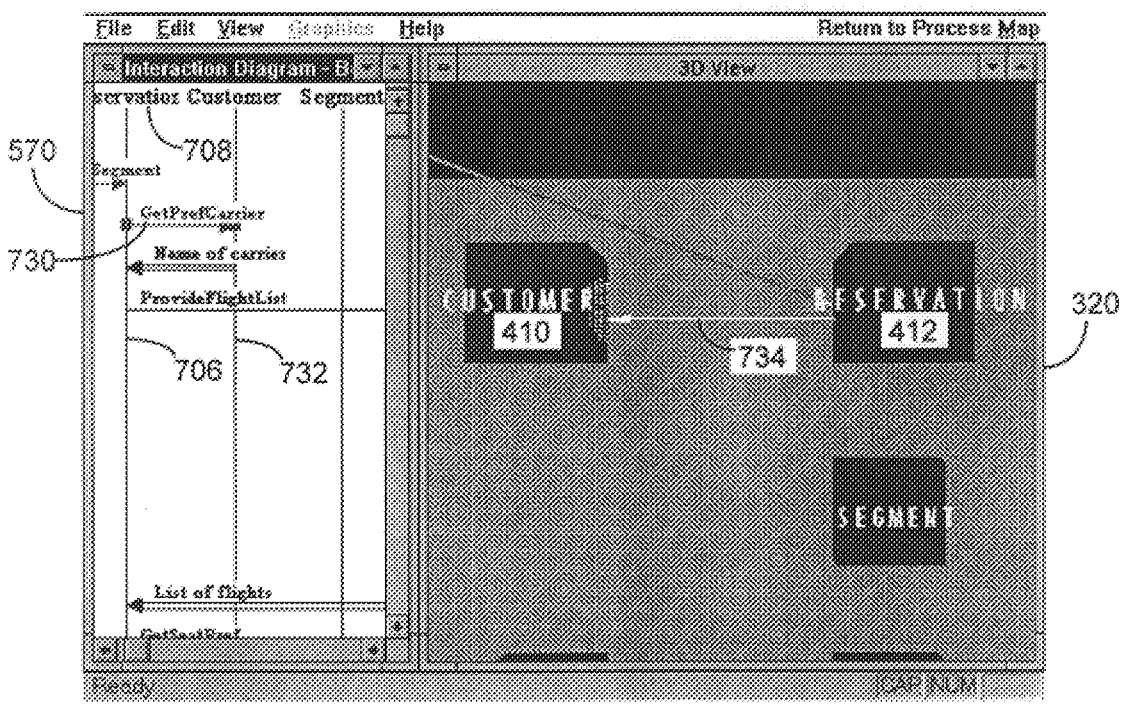
FIGS. 63 and 64 illustrate the ability to modify interactions from the interaction diagram window 570.
Figure 64:
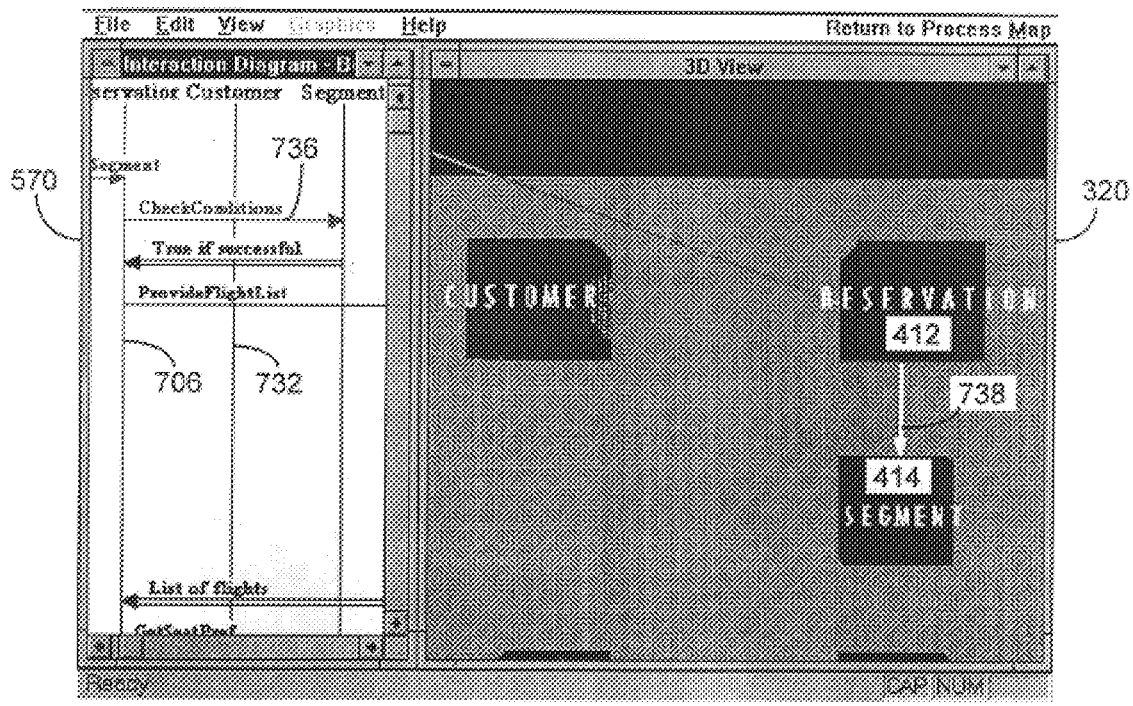

Referring now to FIGS. 63 and 64, the ability to modify interactions from the interaction diagram window 570 is shown. Referring first to FIG. 63, an interaction line 730 is shown in the interaction diagram window 570 from the reservation object line 706 to the customer object line 732. A three-dimensional representation of this interaction line is shown in the 3D object window 320. The corresponding 3D interaction line 734 is shown originating at the reservation cell 412 and terminating at the customer cell 410. The interaction represented by interaction line 730 can be deleted and replaced within the interaction diagram window 570, as is seen in FIG. 64. FIG. 64 shows that the interaction line 730 originating at the reservation object line 706 and terminating at the customer object line 732 of FIG. 63 as been deleted, and a new interaction line 736 is shown originating at the reservation object line 706 and terminating at the customer object line 732. The 3D interaction line 734 of FIG. 63 is therefore erased from the 3D object window 320 as shown in FIG. 64, and a new 3D interaction line 738 corresponding to the interaction line 736 is shown originating at the reservation cell 412 and terminating at the segment cell 414.

Figure 65:
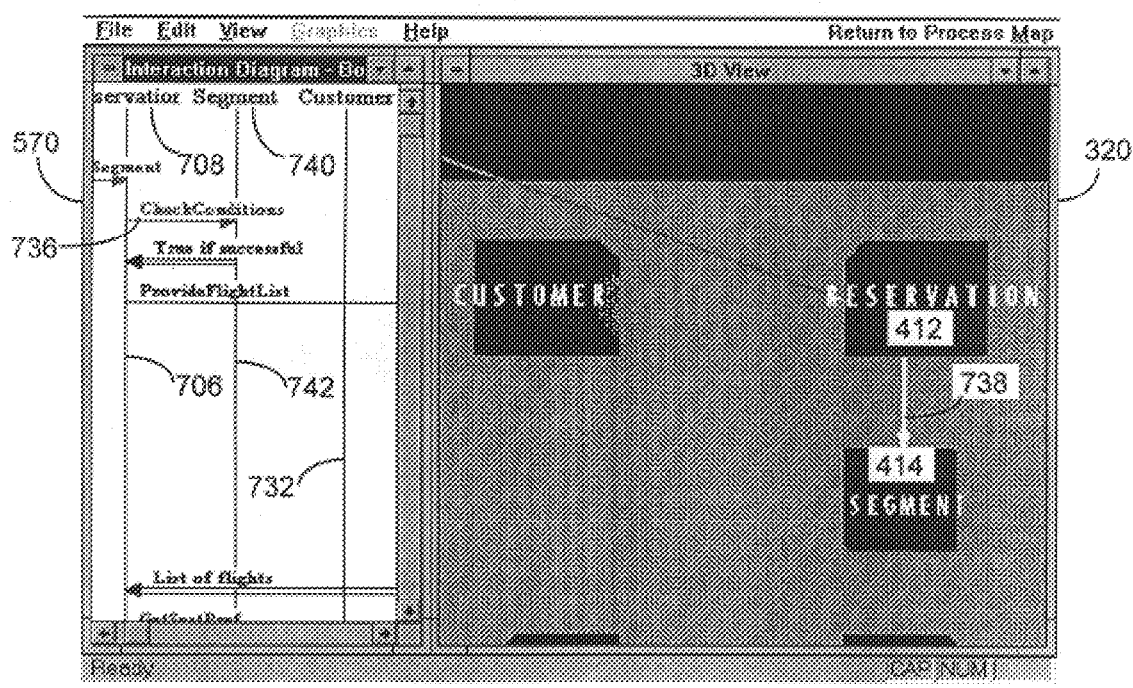
FIG. 65 illustrates the ability to move object lines in the interaction diagram window 570.

Referring now to FIG. 65, the ability to move object lines in the interaction diagram window 570 is shown. By clicking and dragging the segment class 740 to the position to the immediate right of the reservation class 708, the segment object line 742 is also moved to the immediate right of the reservation object line 706. Classes can be moved within the interaction diagram window 570 to create a class order for an interaction diagram that is desirable to the user. Each interaction diagram stores its own class order, so the classes can be ordered in any manner desired by the user. It should be noted that changing the order of the classes and the interaction diagram window 570 does not affect the view in the 3D object window 320.

Figure 66:
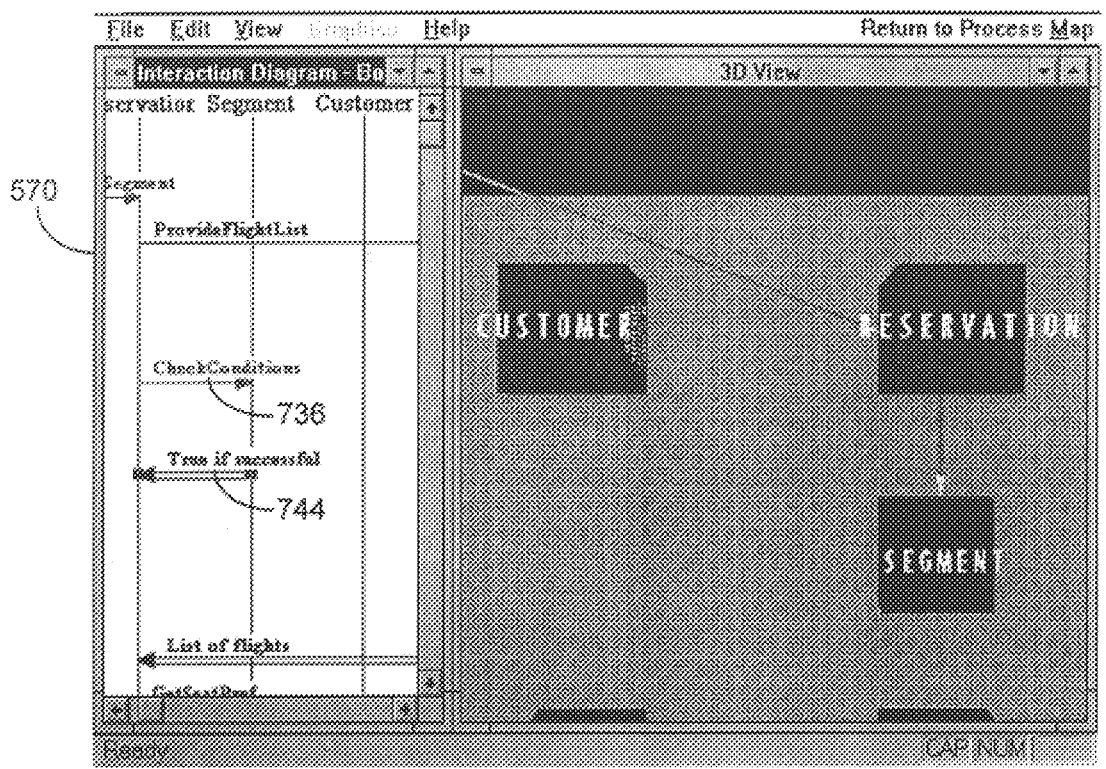
FIG. 66 illustrates the ability to change the sequence of the interactions in the interaction diagram window 570.
Figure 67:
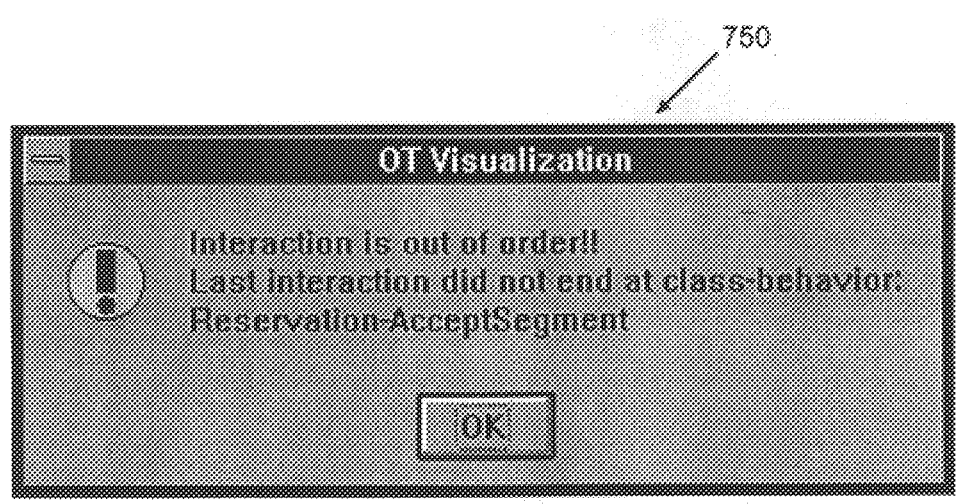
FIG. 67 is a depiction of the interaction sequence error window 750.

Referring now to FIG. 66, the ability to change the sequence of the interactions in the interaction diagram window 570 is shown. The interaction line 736 and the return interaction line 744 of FIG. 66 have been moved downward in the interaction diagram window 570 which will cause those interactions to occur later in time than all interactions shown above interaction line 736 and interaction return line 744. Therefore, the user can change the time in which the interaction will occur. However, interactions that have been moved and no longer make a consistent flow of messages between classes will cause the playback to fail. In other words, a particular interaction may require that another interaction occur prior to it. If this scheduling is adversely affected, an interaction sequence error will occur, and the interaction sequence error window 750 of FIG. 67 will be displayed. This will inform the user that corrections within the interaction diagram window 570 will be required to obtain a successful interaction playback.

Figure 68:
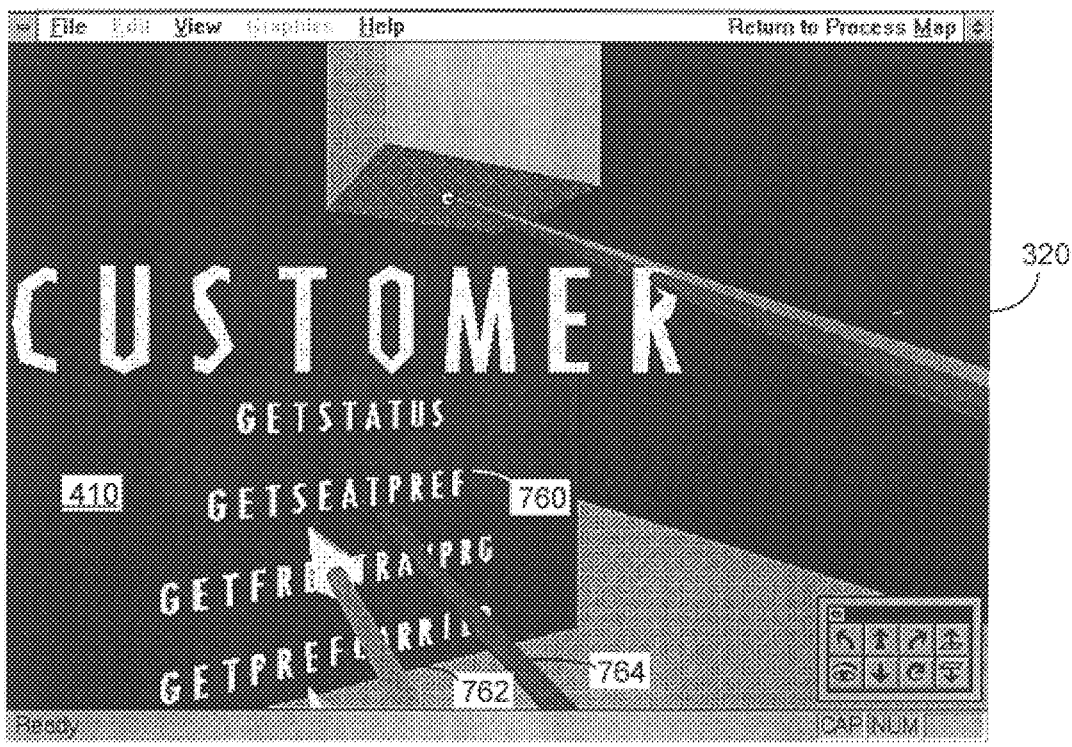
FIG. 68 is a three-dimensional depiction of an interaction with the customer cell 410 in the 3D object window 320.
Figure 69:
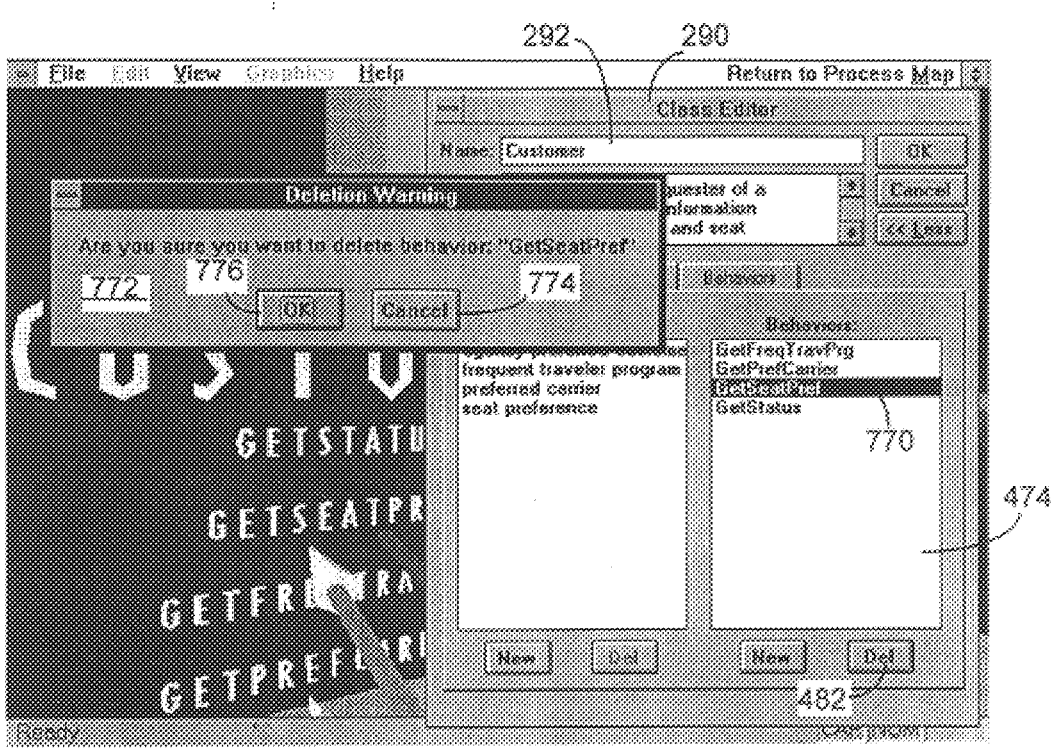
FIG. 69 is a depiction of the deletion warning window 772 for preventing inadvertent behavior deletions.
Figure 70:
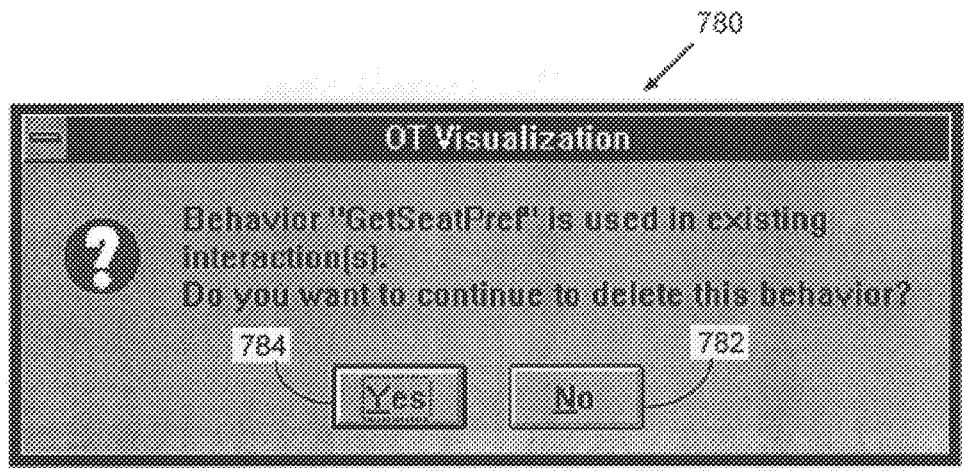
FIG. 70 is a depiction of the interaction deletion warning window 780.

Referring now to FIG. 68, an interaction with the customer cell 410 is shown in the 3D object window 320. The customer cell 410 includes four stacked behavior layers, one of which is the GETSEATPREF behavior layer 760. The user can delete the behavior layer 760 and its associated interactions, seen as interaction line 762 and interaction return line 764. To delete the behavior layer 760, the user selects the customer cell 410 by double-clicking on it, which presents the class editor window 290 as shown in FIG. 69. The class editor window 290 is presented having the name of the selected class in the class name entry field 292, which is "Customer" in FIG. 69. The highlighted behavior text name "GETSEATPREF" 770 is shown in the behaviors list 474. The user highlights the behavior text name in the behavior list 474 which is to be deleted, and subsequently selects the delete button 482 to delete the behavior. Deletion warning window 772 is presented upon selection of the delete button 482 to prevent inadvertent behavior deletions. The user can decide not to delete the selected behavior by selecting the cancel button 774, or can proceed with the behavior deletion by selecting the OK button 776. Where the behavior being deleted is used in existing interactions, the interaction deletion warning window 780 as shown in FIG. 70 is provided. This again provides the user with notification that deleting the desired behavior may affect various interactions. The user can decide not to delete the behavior by selecting the NO button 782, or can proceed with deleting the behavior by selecting the YES button 784.

Figure 71:
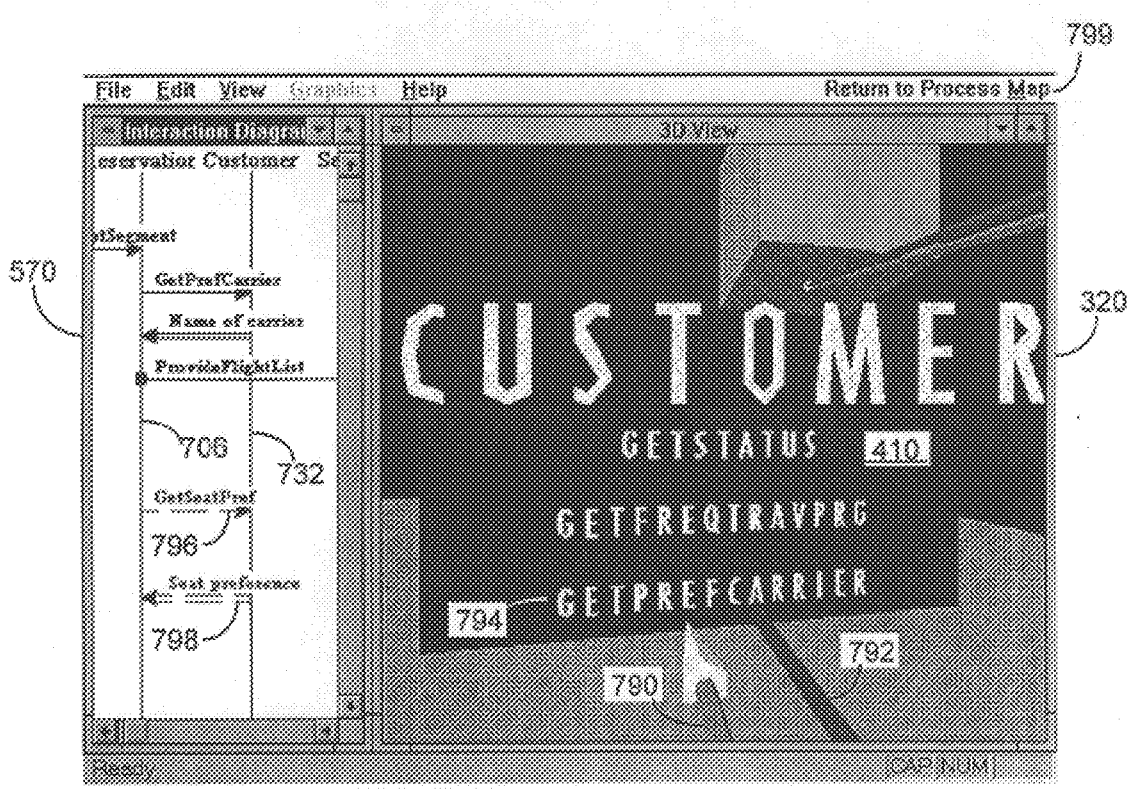
FIG. 71 illustrates the three-dimensional customer cell 410 after the behavior layer 760 has been deleted.

Referring now to FIG. 71, the customer cell 410 is shown after the "GETSEATPREF" behavior layer 760 has been deleted. By comparison of FIGS. 68 and 71, it can be seen that the behavior layer 760 has been deleted, and the 3D interaction line 762 and the 3D interaction return line 764 have also been erased from the 3D object window 320. Only the 3D interaction line 790 and the 3D interaction return line 792, which are associated with the "GETPREFCARRIER" behavior layer 794, remains as an interaction with the customer cell 410. The interaction diagram window 570 also provides an indication that the behavior has been deleted. The dashed interaction line 796 originating at the reservation object line 706 and terminating at the customer object line 732 indicates that the behavior "GETSEATPREF" on dashed interaction line 796 has been deleted. In the preferred embodiment, the dashed interaction line 796 is shown in a predetermined color, as well as being a dashed line, to indicate that the interaction has been deleted. Similarly, the dashed interaction return line 798 is also dashed and of a particular color to indicate to the user that the interaction return value has been deleted. The collaborations step 200 of FIG. 5 can then be exited, and the user can return to the process map window 170 of FIG. 4 by entering user input to return to the process may window 170. In the preferred embodiment, a "return to process map" menu item 799 is presented on the menu bar which can be selected by the user to return to the process map window 170. The process map window 170 of FIG. 4 can be reached from any window within the OTV software tool having the "return to process map" menu item 799.

Figure 72:
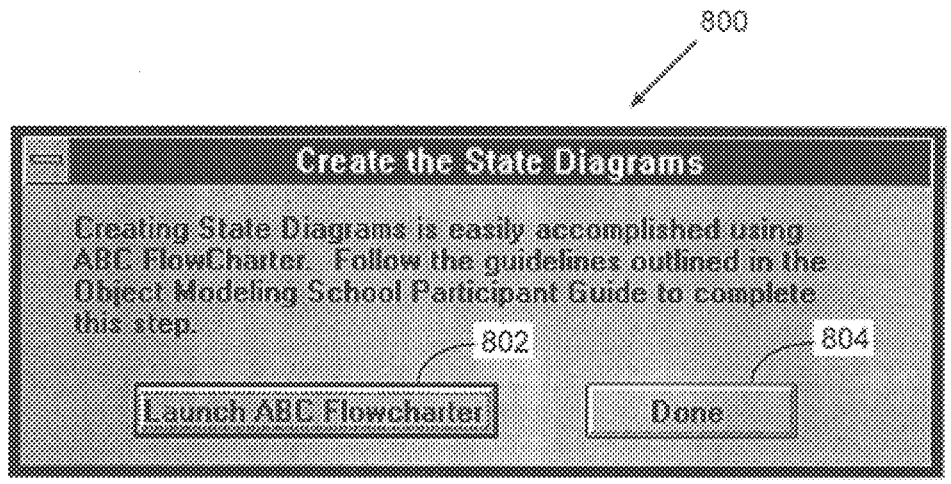
FIG. 72 is a depiction of the create state diagrams window 800.

Referring now to FIG. 72, selection of the diagram states process icon 182 of FIG. 4 displays the create state diagrams window 800. The purpose of a state diagram is to provide a description of the dynamic aspect of a class, in order to increase the understanding of it. The create state diagrams window 800 provides the user with the launch flowcharting tool button 802 which, upon selection, will launch a software tool capable of creating state diagrams. After the state diagrams have been prepared, and the flowcharting tool has been exited, the create state diagrams window 800 is again presented. At this time, the user selects the done button 804 to return to the process map window 170.

Selection of the encapsulation process icon 184 of FIG. 4 presents the object window 270 and 3D object window 320. Because system modeling is an iterative process, the encapsulation step allows the user to view the role of each object in the system model, and further enhance the system model by modifying the classes, attributes, and behaviors. This accomplished by viewing the objects and relationships in the object window 270 and the 3D object window 320, and through the use of the class editor window 290 as shown in the previous diagrams.

Figure 73:
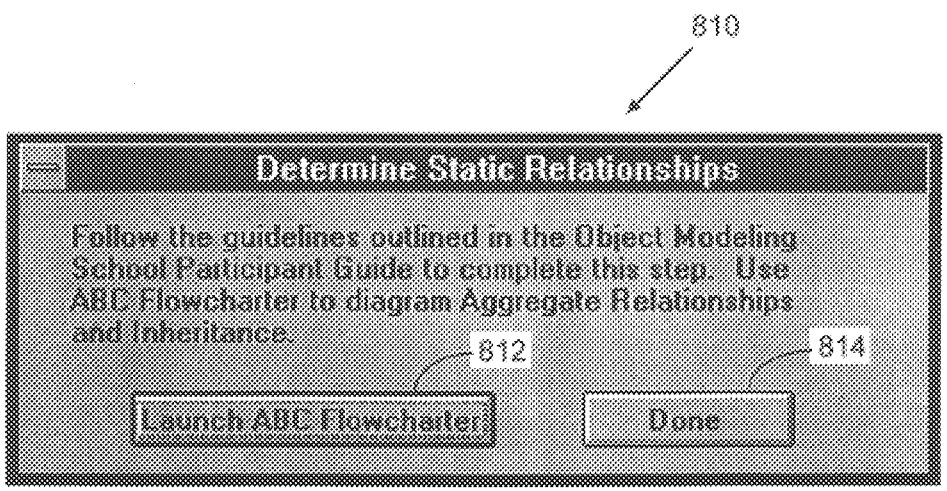
FIG. 73 is a depiction of the static relationships window 810.

Referring now to FIG. 73, selection of the static relationships process icon 186 of FIG. 4 displays the static relationships window 810. Each collaboration identified between the classes represents a dynamic relationship that exists between the classes. In the static relationships step, the focus is on the static relationship that exists between the classes. The difference between static and dynamic relationships is that dynamic relationships take their meaning during the execution of collaborations, while static relationship link two or more objects over a longer period of time. The static relationships window 810 provides the user with the launch flowcharting tool button 812 which, upon selection, will launch a software tool capable of creating a diagram of the static relationships. After the static relationship diagrams have been prepared, and the flowcharting tool has been exited, the static relationships window 810 is again presented. At this time, the user selects the done button 814 to return to the process map window 170.

Multiple system models developed using the OTV software tool can be brought together into one complete system model. The preferred embodiment of the invention allows these multiple models to be merged by using a model merge function. A variety of different user inputs can be used to initiate the model merge function, including menu-driven input, tool bar input, and keystroke input. In the preferred embodiment, a menu selection item is provided that can be selected by the user to initiate the model merge function.

Figure 74:
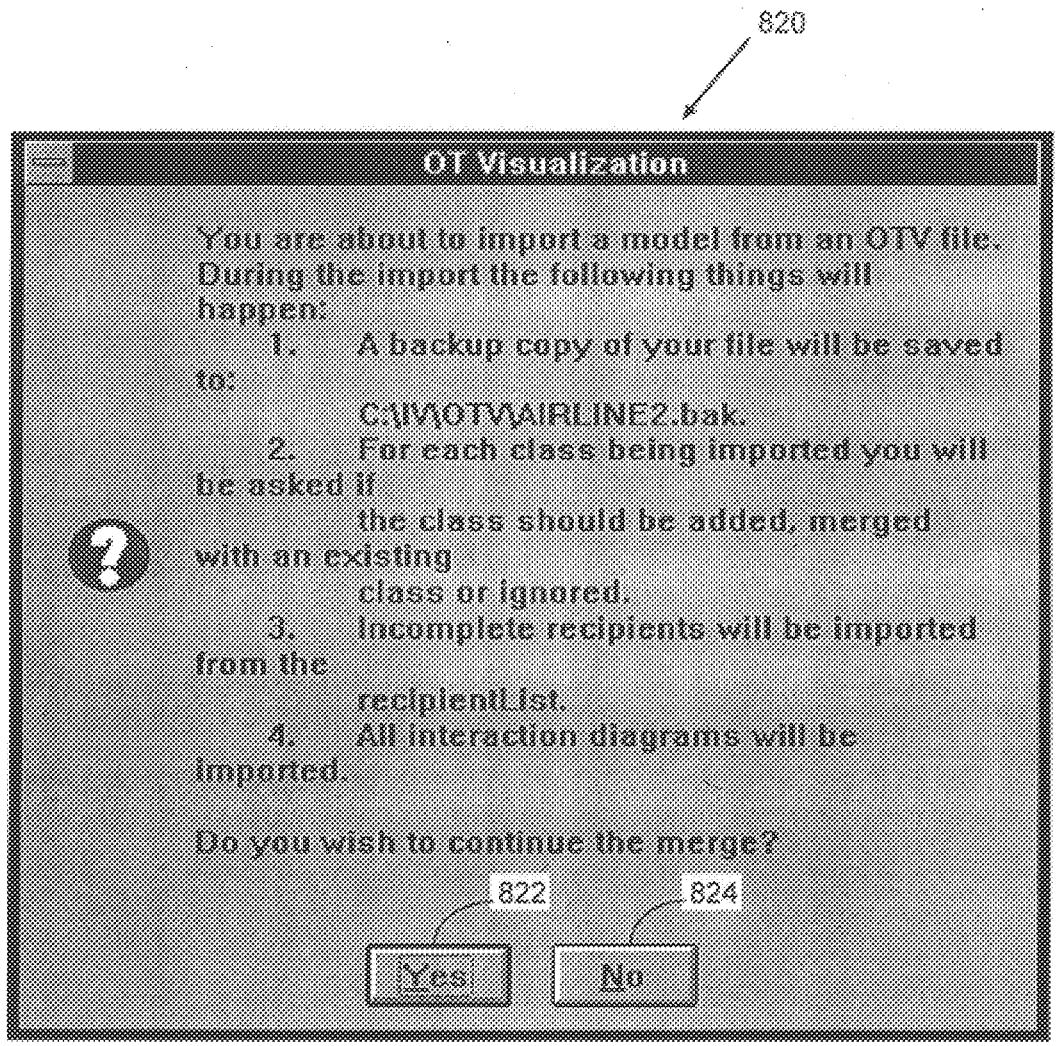
FIG. 74 is a depiction of the model merge window 820.

Upon selection of the model merge function, the model merge window 820 is presented as shown in FIG. 74. The model merge window 820 provides the user with details of what will occur upon merging individual system models. The user can continue with the process of merging models by selecting the YES button 822, or can cancel the model merge function by selecting the NO button 824. If the user proceeds with the model merge function, the user must determine whether each class being imported should be added or merged with an existing class, or whether the class being imported should be ignored. All interaction diagrams associated with the imported class will also be imported.

All of the information entered into the user's models can be printed in various formats. The printing function can be selected through various user inputs, including menu-driven input, tool bar input, and keystroke input. The printing function allows the user to print various diagrams, recipient lists, and interaction diagrams.

The printing function also provides an export function to export the model to Class, Responsibility, Collaboration (CRC) diagrams that describe the object in text format. A CRC diagram of the preferred embodiment is a table of text information that describes the behaviors and collaborations for a selected class. For instance, the CRC diagram for a particular class would list each of the behaviors associated with the class, describe each of the behaviors, and identify the collaborators corresponding to each behavior.

The OTV software tool of the preferred embodiment was built in Visual C++ version 2.2 using the Microsoft® Foundation Class (MFC) libraries. The three-dimensional view was constructed using Sense8's WorldToolKit for Windows Version 2.04. The graphic capabilities of the two-dimensional view was built using Kelro Software's Drag-It™ version 2.1. The development platform was Windows NT version 3.51.

Figure 75:
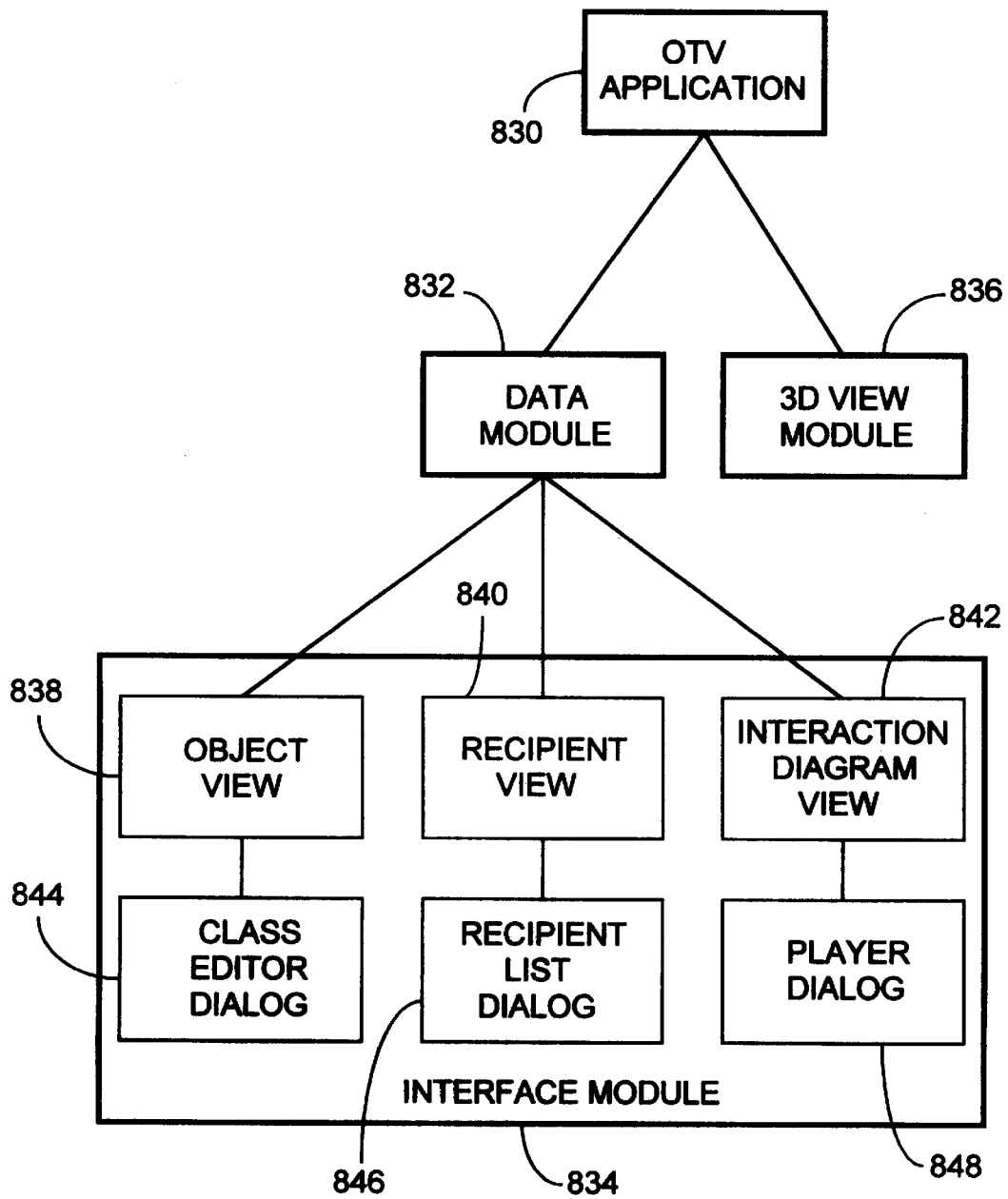
FIG. 75 is a block diagram illustrating the development modules within the OTV application 830.

The OTV application was implemented using MFC's Document-View architecture. Referring now to FIG. 75, the OTV application 830 is composed of three substantially independent modules: the data module 832, the interface module 834, and the 3D view module 836. The data module 832 contains specific information related to the models built using the OTV software tool. All communication with the data module 832 occurs through a data manager. The interface module 834 includes three main windows of the application, namely the object view 838 which includes the 2D object window 270, the recipient view 840 which includes the recipient list window 350, and the interaction diagram view 842 which includes the interaction diagram window 570. The interface module 834 also includes the various dialogs that are used for adding and modifying the data (object information). From the object view 838 the class editor dialog 844 is accessible which includes the class editor window 290. From the recipient view 840, all dialog associated with the recipient view 840 is available via the recipient list dialog 846. Various player dialog, seen as player dialog 848, is accessible from the interaction diagram view 842. Each module is a window to the stored object information. The 3D view module 836 handles all interaction with the 3D object window 320.

As previously described, the data module 832 contains most of the stored information related to an object model. The data module 832 was built using C++ and the Microsoft® Foundation Class (MFC) library. This module contains all validation necessary to maintain the accuracy of the data, and also contains a subset of the data in the form of a recipient list. This recipient list contains the data in an array form that is used to build the recipient list window 350. The data module 832 also contains all information related to the interaction diagrams which can be seen in the interaction diagram window 570. All communication with the 3D view module 836 related to classes occurs through the data manager.

The data module 832 manages all communication with the word processor, which is Microsoft® Word in the preferred embodiment. The OTV application uses the word processor to find tagged words and phrases words which are imported to the application. The word processor is also used to download all class information to document templates. The communication with the word processor is initiated and managed by the data manager, and is accomplished by using Object Linking and Embedding (OLE) Automation which is known in the art.

The data associated with the interaction diagrams in the data module 832 was developed differently from the data associated with the rest of the OTV application. The interaction diagrams are composed of interactions and classes. Each interaction is represented on the display screen as a horizontal line, and each class is depicted by the class name at the top of the display screen having a vertical line extending to the bottom of the display screen. The main difference in the construction of the interaction diagrams is that each element (interactions and classes) of the interaction diagram was developed with the capability of drawing itself on the display screen. The data aspect and interface aspect of the program code coexist. Any change related to interactions, including adding, deleting, and playing interactions, causes an appropriate message to be sent to the 3D view module 836.

The merge function of the system is also developed in the data manager. This function allows for the merging of classes and interaction diagrams from independent models into a single object model.

Upon starting the OTV application, the data module 832 and the 3D view module 836 is created. The OTV application provides the user a bitmap through which a variety of views can be selected, including the two-dimensional object window 270, the recipient list window 350, and the interaction diagram window 570. Each view controls the user's interaction with the data through "dragging & dropping" classes, and manipulating data through a variety of dialog windows. The 3D view module 836 works similarly, but is independent of the object window 270, the recipient list window 350 and the interaction diagram window 570. All views always exist, however at times some views are hidden within the OTV software tool.

The object view 838 within the interface module 834 contains the two-dimensional representations of the classes in the 2D object window 270. The object view in the interface module 834 was built using Kelro Software's Drag-It™ version 2.1. Drag-It™ is a class library and toolkit that provides for "drag and drop" graphical interfaces to Visual C++ applications. It allows symbols to be "dragged" from one view to another. This library of C++ functions handles graphical object placement, text placement, line drawing, drag & drop features, toolbar creation and usage, and all printing options for the two-dimensional object view. Graphic information about each class and line is stored independently of the data module 832 by internal functions of the Drag-It™ tool. A Drag-It™ application is essentially developed in three steps. First, the desired components are drawn and named. Next, a skeleton application OLE is generated. Finally, an action handler is developed to translate between the actions reported by Drag-It™ and the effects on the application.

The class editor dialog 844 includes the class editor window 290 which can be launched by selecting any class in the object window 270. This causes the object view 838 in the interface module 834 to make a request to the data module 832 for a copy of the specified class information.

When editing has been completed in the class editor window 290, the object view sends the updated information associated with the class back to the data module 832 for updating.

The recipient view 840 in the interface module 834 consists of the recipient list window 350 that has the appearance of a spreadsheet. When the recipient list window 350 is displayed, the recipient view 840 of the interface module 834 makes a request to the data module 832 for the recipient list information from which the recipient list window 350 is constructed. As the user moves from field to field in the recipient list window 350, messages are sent to the data module 832 which updates the recipient list and corresponding class information. The recipient view can also be implemented using a spreadsheet type of interface.

When the interaction diagram view is initiated, a request is made to the data manager within the data module 832 for a pointer to the requested interaction diagram, and as previously indicated, the interaction diagram was developed with the capability of drawing itself on the display screen. In essence, the request to the data manager is for the interaction diagram to draw itself. The interaction diagram view handles mouse movements for creating new interactions, selecting interactions and classes, deleting and repositioning interactions, and printing. The interaction player window 670 is created through this view. The player sends messages to the interaction diagram view to validate and play each interaction.

The 3D view module 836 was designed to be substantially independent from the rest of the application. The structure of the 3D view module 836 mirrors the structure of the data module 832. The constructors and destructors in the three-dimensional structure make function calls to three-dimensional functions for adding and placing the cells in the three-dimensional environment. The 3D view module 836 was built using Sense8's WorldToolKit for Windows version 2.04. WorldToolKit is comprised of a library of C language functions that manage graphic placement, viewpoint movement, viewpoint pathing, and all calculations related to the rendering of the images on the screen. Other than the function calls for creating and placing the view on the screen, there are approximately 24 function calls from the data module 832 to the 3D view module 836. The interface view module 834 only makes function calls to the 3D view module 836 for creating and placing the view. In the preferred embodiment, 25 function calls come from the data module 832, 9 of which come from the recipient view 840, 11 from the interaction diagram view 842, and 4 from the data manager. The 3D view module 836 utilizes a 3D object toolbar 324 to control movement and view switching. The 3D object toolbar 324 was implemented using the Microsoft® Foundation Class (MFC) libraries.

The OTV modeling system is therefore a computer-implemented software tool capable of carrying out programmed executable functions. A computer, such as the computer 102, includes memory to store the programmed executable functions. The memory includes, but is not limited to, an internal hard drive, external diskettes 126, server 114 hard disks 130, and CD-ROM memories. Computers include one or more processing units, such as processing unit 106, that process the programmed executable functions. The programmed executable functions of the present invention are carried out in such a manner.

In summary, the OTV modeling system is an interactive, computer-implemented, real-time software tool that physically transforms an applied objectoriented programming (OOP) based system or process into a visual representation. The OTV modeling system includes a class developer that develops the visual representation in a computer-readable medium for visualization on a display device of the computer. The class developer is a programmed executable function executed by the computer, where the class developer includes the interface module 834 which provides the class editor window 290, the recipient list window 350, and the interaction diagram window 570 to allow the user to interactively develop the system classes, class behaviors, class attributes, collaborations between classes, and collaboration message flows. Each of the class editor window 290, recipient list window 350, and interaction diagram window 570 can be used individually, or conjunctively, to develop the classes. The visual representation therefore includes these system classes, class behaviors, class attributes, collaborations between classes, and collaboration message flows. The system also includes a three-dimensional visual representation module 836 which provides the 3D object window 320 for displaying a three-dimensional depiction of the visual representation on the computer display device 104. The three-dimensional visual representation module is a programmed executable function which is carried out on the computer.

The OTV modeling system also has a common data model maintainer that automatically maintains a common data model of the visual representation in order to simultaneously reflect development of the common data model throughout the software tool. The common data model maintainer is a programmed executable function that is carried out on the computer. The common data model maintainer may be integral to the class developer. The common data model maintainer, including the data module 832, allows each of the views to simultaneously reflect representations of the data in real-time.

The OTV modeling system also includes a programmed executable validator function that validates, interactively and in real time, the classes, class behaviors, class attributes, collaborations, and collaboration message flows. The computer-implemented validator function is included within the data module 832, which maintains the accuracy of the data.

The OTV modeling system further includes a two-dimensional (2D) visual representation module, operatively coupled to the class developer, that displays a two-dimensional depiction of the visual representation on the computer display device 104. The 2D visual representation module is a programmed executable function that provides the object view 838, which provides the object window 270. The 2D visual representation module also includes the two-dimensional interaction diagram view 842, which provides the interaction diagram window 570. The 2D visual representation module may be integral to the class developer.

The 2D visual representation module includes a two-dimensional class developer, which is a programmed executable function for developing interactively and in real time, the visual representation as a 2D representation of the classes, class behaviors, class attributes, collaborations, and collaboration message flows. The 2D class developer includes executable program code to edit, interactively and in real time, the classes, class behaviors, class attributes, collaborations, and collaboration message flows through the use of a two-dimensional visual representation such as the interaction diagram window 570 and the object window 270. The 2D class developer includes program code to display each class textually and in a spatial order associated with the message flow in the interaction diagram window 570. The 2D class developer also includes program code to display each collaboration as a visual connection between an originating class and a recipient class, such as interaction line 620, where the collaborations are displayed in a spatial order associated with the message flow. The executable program code used to display each collaboration preferably displays each collaboration with a set of two arrows, the first arrow relating the originating class to the recipient class, and the second arrow relating the recipient class back to the originating class. The first arrow is preferably displayed with a single-lined body, and the second arrow with a double-lined body. The first arrow is labeled with a corresponding behavior of the originating class and the second arrow with a corresponding behavior, or return value, of the recipient class.

The 2D class developer, which includes program code to display each class textually in the interaction diagram window 570, includes executable program code to display the classes from left to right in an order determined by user preference on the computer display device 104. This program code further provides for a display in the interaction diagram window 570 of a corresponding vertical line for each class in order to reinforce the spatial order associated with the message flow in which the classes are displayed. The program code of the 2D class developer used to display each collaboration as a visual connection between an originating class and a recipient class also provides a display of the collaborations from top to bottom in the interaction diagram window 570 in an order determined by user preference.

The class developer in the OTV modeling system also includes a programmed executable analyzer to receiving and parse information from an external source into the classes, class behaviors, class attributes, collaborations, and collaboration message flows. The programmed analyzer includes document importing program code to import a text document, and provides the object parsing dialog window 240 and the action parsing dialog window 340 to provide a user-interface for designating the text document. The analyzer includes executable program code to distinctively characterize noun statements related to classes, and provides the identifying object dialog window 230 to allow the user to designate the noun statements related to the classes. The analyzer also distinctively characterizes action statements related to class behaviors, and provides the assigning responsibilities dialog window 330 to allow the user to designate the action statements related to class behaviors. The analyzer further includes executable program code to search the imported text document for the characterized noun statements for importing the characterized noun statements as classes, and to search the imported text document for the characterized action statements for importing the characterized action statements as class behaviors.

The three dimensional (3D) visual representation module 836 includes a 3D class developer, which is a programmed executable function for developing interactively and in real time, the visual representation of the classes, class behaviors, class attributes, collaborations, and collaboration message flows. The 3D class developer includes executable program code to edit, interactively and in real time, the classes, class behaviors, class attributes, collaborations, and collaboration message flows through the use of a three-dimensional visual representation such as the 3D object window 320.

The three-dimensional visual representation module 836 includes executable program code for displaying each class as a corresponding 3D cell model in the 3D object window 320 on the display device 104. The classes, class behaviors, class attributes, collaborations and collaboration message flows can be displayed in one or more different configurations. The executable program code for displaying each class as a corresponding 3D cell model provides for a display of each class as a corresponding 3D cell positioned within a three-dimensional space, and for a display of each collaboration as a visual connection between an originating class and a recipient class.

Displaying the classes, class behaviors, class attributes, collaborations and collaboration message flows in one or more configurations includes displaying a first configuration where an outer shell of each cell is displayed as one or more stacked opaque behavior layers relating to the behaviors of the class corresponding to the cell, and where each of the stacked opaque behavior layer is labeled, such as the waiting list cell 372 shown in FIG. 21. Displaying the classes, class behaviors, class attributes, collaborations and collaboration message flows in one or more configurations includes displaying a second configuration where an outer shell of each cell is displayed as a wire frame, an inner core of each cell is displayed as one or more stacked attribute layers relating to the attributes of the class corresponding to the cell, and the outer shell surrounds the inner core, such as the flight cell 530 of FIG. 33. The display of the second configuration includes displaying a label for each stacked attribute layer. Executable program code provides for alternatively selecting one of the different configurations for display of the classes, class behaviors, class attributes, collaborations, and collaboration message flows.

The three-dimensional visual representation module 836 also includes executable program code to adjust the position of each cell within the 3D space. It furthermore displays the visual connections between the originating class and the recipient class as a set of two three-dimensional arrows within the 3D space. Each arrow represents a message in the message flow sent between the originating class and the recipient class, the first arrow going from the originating class to the recipient class, and the second arrow going from the recipient class back to the originating class, such as 3D interaction line 720 and 3D interaction return line 722 of FIG. 61. The three-dimensional visual representation module 836 preferably displays each arrow as an extruded polygonal shape, where the first arrow is a different color than the second arrow.

The three-dimensional visual representation module 836 is further programmed to provide perspective displays for dynamically presenting the message flow from one or more different perspectives capable of being alternatively selected, made possible by the interaction player window 670. One such perspective includes viewing the message flow as a spectator from a stationary vantage point within the 3D space relative to the message flow, which includes the third person views selected in the playback view field 686. Another such perspective includes viewing the message flow from a leading edge of an active message arrow of the message flow, which includes the first person view selected in the playback view field 686.

The OTV modeling system also includes executable program code for permitting multiple users to collaborate in development and visual representation via network technology. The representation is distributed across the network having a plurality of nodes as seen by terminals 118 and 120, each node maintaining one or more of the classes. This network distribution can include a server 114, where terminals 118 and 120 represent clients, each client maintaining the class developer and the 3D visual representation module 836, and the server maintaining one or more classes.

In another embodiment of the invention, the OTV modeling system is an interactive, computer-implemented, real-time software tool that physically transforms an abstract system or process into a visual representation. The abstract system or process includes a business process, a database, a network architecture, and a client-server architecture.

In this embodiment of the OTV modeling system, a developer interactively develops the visual representation in a computer-readable medium for visualization on a computer display device in real-time. The developer is a programmed executable function executed by the computer, for developing at least one of an element, a quality of an element, and an interrelation relating an element with one or more other elements. The developer in this embodiment of the OTV modeling system also includes a programmed executable analyzer to receiving and parse information from an external source into the elements, qualities, and interrelations.

A three-dimensional visual representation module 836, which provides the 3D object window 320, displays a 3D depiction of the visual representation on the computer display device. This embodiment of the OTV modeling system further includes a two-dimensional (2D) visual representation module, operatively coupled to the developer, that displays a two-dimensional depiction of the visual representation on the computer display device 104. The 2D visual representation module is a programmed executable function that provides the object view 838, which provides the object window 270. The 2D visual representation module also includes the two-dimensional interaction diagram view 842, which provides the interaction diagram window 570. The 2D visual representation module may be integral to the developer.

This embodiment of the OTV modeling system also includes a common data model maintainer that automatically maintains a common data model of the visual representation in order to simultaneously reflect development of the common data model throughout the software tool. The common data model maintainer is a programmed executable function that is carried out on the computer. The common data model maintainer may be integral to the developer. The common data model maintainer, including the data module 832, allows each of the views to simultaneously reflect representations of the data in real-time.

Figure 76:
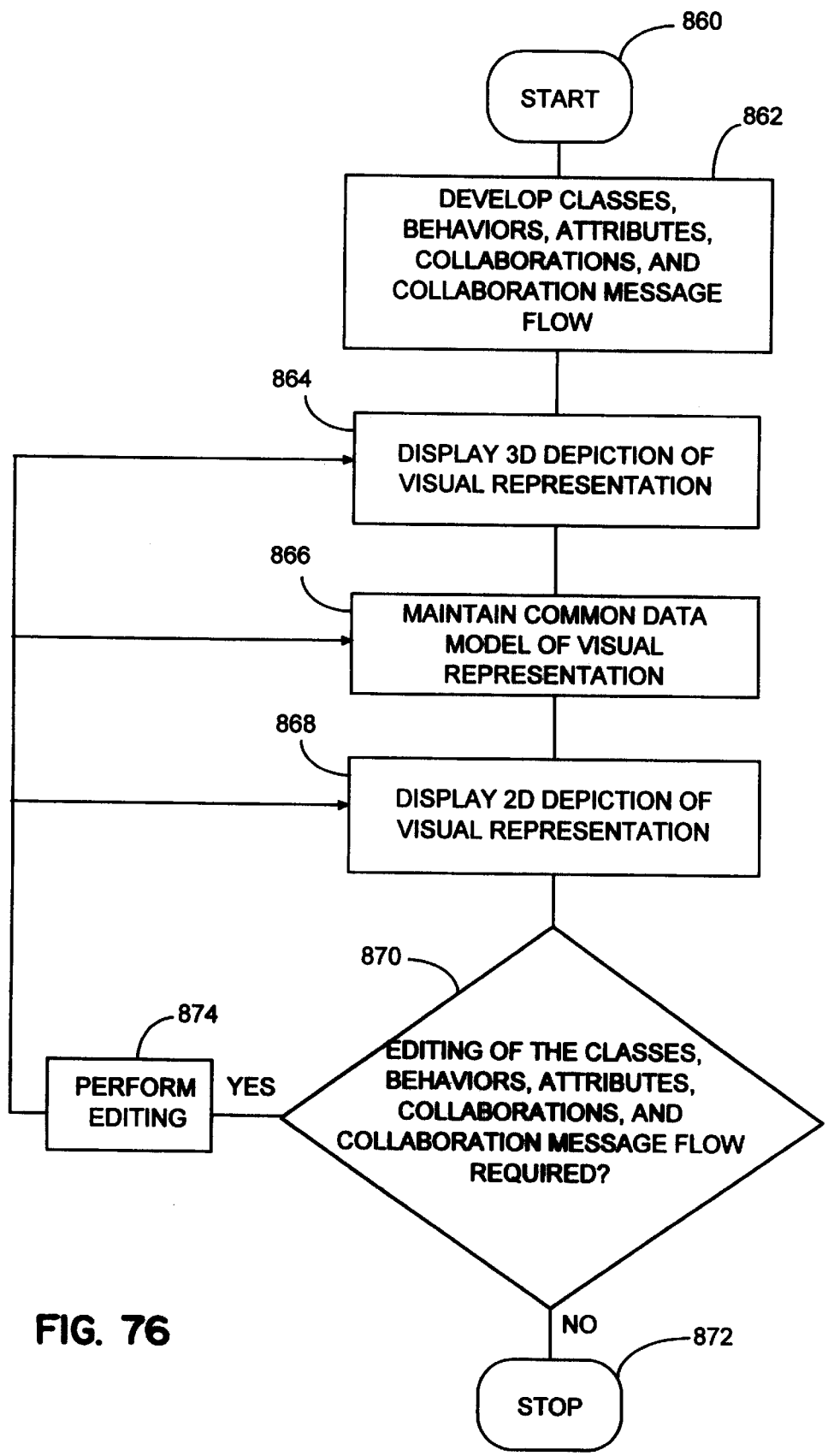
FIG. 76 is a flow diagram of a method for physically transforming an applied object-oriented programming (OOP) system or process into a visual representation.

The invention may also be implemented in the form of a computer-implemented method. The computer-implemented method physically transforms an applied object-oriented programming (OOP) system or process into a visual representation. Referring now to FIG. 76, a flowchart of such a method is shown. Following start step 860, processing continues at step 862, which includes interactively developing the visual representation in real time through computer control such as computer 102. The visual representation has at least one of a class, a class behavior, a class attribute, a collaboration, and a message flow of the collaborations. Processing continues at step 864, where a three-dimensional (3D) depiction of the visual representation is displayed to a user.

Step 866 is the step of maintaining a common data model of the visual representation. The computer-implemented method automatically maintains a common data model of the visual representation in order to simultaneously reflect development of the common data model. This step may be integral to the step of interactively developing the visual representation. Maintaining a common data model allows each of the views to simultaneously reflect representations of the data in real-time. The computer-implemented method also includes the step of interactively validating the classes, class behaviors, class attributes, collaborations, and collaboration message flows in real-time.

The computer-implemented method also includes step 868 of displaying a two-dimensional depiction of the visual representation, such as the object window 270 and the interaction diagram window 570, on the computer display device 104. At decision step 870, the user determines whether editing of the classes, behaviors, attributes, collaborations, or collaboration message flow is necessary. If not, processing ends at stop step 872. If editing is necessary, processing continues at step 874, where the classes, behaviors, attributes, collaborations, and collaboration message flow are modified. From step 874, any of steps 864, 866 or 868 can be reached.

Figure 77:
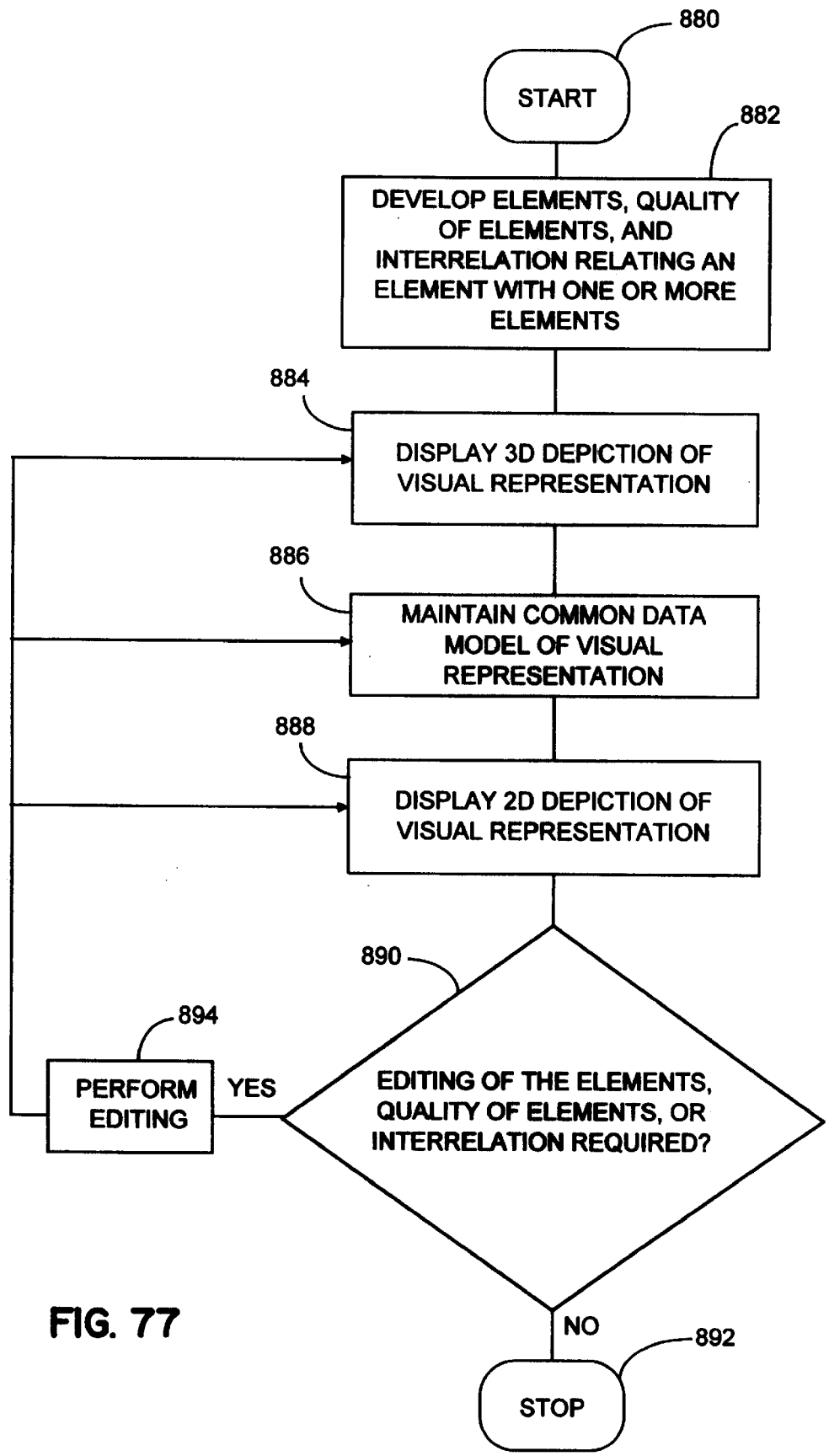
FIG. 77 is a flow diagram of a method for physically transforming an abstract system or process into a visual representation.

In another embodiment of the invention, the computer-implemented method physically transforms an abstract system or process into a visual representation. Referring now to FIG. 77, a flowchart of such a method is shown. Following start step 880, processing continues at step 882, which includes interactively developing the visual representation in real time through computer control such as computer 102. The visual representation has at least one of an element, a qulaity of an element, and an interrelation relating an element with one or more other elements. Processing continues at step 884, where a three-dimensional (3D) depiction of the visual representation is displayed to a user.

Step 886 is the step of maintaining a common data model of the visual representation. The computer-implemented method automatically maintains a common data model of the visual representation in order to simultaneously reflect development of the common data model. This step may be integral to the step of interactively developing the visual representation. Maintaining a common data model allows each of the views to simultaneously reflect representations of the data in real-time. The computer-implemented method also includes the step of interactively validating the elements, quality of elements, and interrelations in real-time.

The computer-implemented method also includes step 888 of displaying a two-dimensional depiction of the visual representation, such as the object window 270 and the interaction diagram window 570, on the computer display device 104. At decision step 890, the user determines whether editing of the elements, quality of elements, or interrelations is necessary. If not, processing ends at stop step 892. If editing is necessary, processing continues at step 894, where the elements, quality of elements, and interrelations can be modified. From step 894, any of steps 884, 886 or 888 can be reached.

The invention can also be represented in the form of a program storage device readable by a computer system tangibly embodying a program of instructions executable by the computer system. The program of instructions executable by the computer system physically transforms an applied object-oriented programming (OOP) system or process into a visual representation. The method performed by the program on the program storage device includes interactively developing the visual representation in real time through computer control such as computer 102. The visual representation has at least one of a class, a class behavior, a class attribute, a collaboration, and a message flow of the collaborations. A three-dimensional (3D) depiction of the visual representation is displayed to a user.

The program of instructions stored on the program storage device also includes the step of maintaining a common data model of the visual representation. The computer-implemented method automatically maintains a common data model of the visual representation in order to simultaneously reflect development of the common data model. This step may be integral to the step of interactively developing the visual representation. Maintaining a common data model allows each of the views to simultaneously reflect representations of the data in real-time.

The method also includes the step of displaying a two-dimensional depiction of the visual representation, such as the object window 270 and the interaction diagram window 570, on the computer display device 104.

The program of instructions executable by the computer system can also physically transform an abstract system or process into a visual representation. The method performed by the program on the program storage device includes interactively developing the visual representation in real time through computer control such as computer 102. The visual representation has at least one of an element, a quality of an element, and an interrelation relating an element with one or more other elements.

What is claimed is:

1. An interactive, real-time software tool, implemented by a computer, for physically transforming an applied object-oriented programming (OOP) based system or process into a visual representation, the software tool comprising:
   (a) class-interactively developing means for developing, in real time, the visual representation which is physically embodied in a computer-readable medium for visualization on a computer display device, the visual representation having at least one of: a class, a class behavior, a class attribute, a collaboration, and a message flow of the collaborations; and
   (b) three-dimensional (3D) visual representation means, operatively coupled to the class-developing means, for displaying a 3D depiction of the visual representation on the display device.

2. The interactive, real-time software tool of claim 1, wherein the class-developing means comprises validating means for validating, interactively and in real time the at least one of: the class, the class behavior, the class attribute, the collaboration, and the message flow of the collaborations.

3. The interactive, real-time software tool of claim 1, wherein the software tool further comprises two-dimensional (2D) visual representation means, operatively coupled to the class-developing means, for displaying a 2D depiction of the visual representation on the display device.

4. The interactive, real-time software tool of claim 3, wherein the 2D visual representation means is integral to the class-developing means.

5. The interactive, real-time software tool of claim 3, wherein the 2D visual representation means comprises 2D class-developing means, for developing interactively and in real time, the visual representation as a 2D representation of the at least one of: the class, the class behavior, the class attribute, the collaboration, and the message flow of the collaborations.

6. The interactive, real-time software tool of claim 3, wherein the 2D visual representation means comprises means for editing, interactively and in real time, the at least one of: the class, the class behavior, the class attribute, the collaboration, and the message flow of the collaborations through the use of a 2D visual representation.

7. The interactive, real-time software tool of claim 3, wherein the 2D visual representation means comprises:
   (a) means for displaying each class textually and in a spatial order associated with the message flow; and
   (b) means for displaying each collaboration as a visual connection between an originating class and a recipient class, wherein the collaborations are displayed in a spatial order associated with the message flow.

8. The interactive, real-time software tool of claim 7, wherein the means for displaying each collaboration as a visual connection comprises means for displaying each collaboration with a set of two arrows, the first arrow relating the originating class to the recipient class, and the second arrow relating the recipient class back to the originating class.

9. The interactive, real-time software tool of claim 8, wherein the means for displaying each collaboration with a set of two arrows comprises means for labeling the first arrow with a corresponding behavior of the originating class and the second arrow with a corresponding behavior of the recipient class.

10. The interactive, real-time software tool of claim 8, wherein the means for displaying each collaboration with a set of two arrows comprises means for displaying the first arrow with a single-lined body and the second arrow with a double-lined body.

11. The interactive, real-time software tool of claim 7, wherein the means for displaying each class textually comprises means for displaying the classes from left to right in an order determined by user preference.

12. The interactive, real-time software tool of claim 11, wherein the means for displaying each class textually further comprises means for displaying a corresponding vertical line for each class in order to reinforce the spatial order associated with the message flow in which the classes are displayed.

13. The interactive, real-time software tool of claim 7, wherein the means for displaying each collaboration as a visual connection comprises means for displaying the collaborations from top to bottom in the an order determined by user preference.

14. The interactive, real-time software tool of claim 1, wherein the class-developing means comprises an analysis means for receiving and parsing information from an external source into the at least one of: the class, the class behavior, the class attribute, the collaboration, and the message flow of the collaborations.

15. The interactive, real-time software tool of claim 14, wherein the analysis means comprises:
   (a) importing means for importing a text document;
   (b) first characterizing means for distinctively characterizing noun statements related to classes;
   (c) means, operatively coupled to the importing means and the first characterizing means, for searching the text document for the characterized noun statements and for importing the characterized noun statements as classes;
   (d) second characterizing means for distinctively characterizing action statements related to class behaviors; and
   (e) means, operatively coupled to the second characterizing means, for searching the text document for the characterized action statements and for importing the characterized action statements as class behaviors.

16. The interactive, real-time software tool of claim 1, wherein the 3D visual representation means comprises 3D class-developing means, for developing, interactively and in real time, the visual representation as a 3D representation of the at least one of: the class, the class behavior, the class attribute, the collaboration, and the message flow of the collaborations.

17. The interactive, real-time software tool of claim 1, wherein the 3D visual representation means comprises means for editing, interactively and in real time, the visual representation as a 3D representation of the at least one of: the class, the class behavior, the class attribute, the collaboration, and the message flow of the collaborations through the use of a 3D visual representation.

18. The interactive, real-time software tool of claim 1, wherein the 3D visual representation means comprises means for displaying each class as a corresponding 3D cell model on the display device.

19. The interactive, real-time software tool of claim 1, wherein the 3D visual representation means comprises:
   (a) first means for displaying the at least one of: the class, the class behavior, the class attribute, the collaboration, and the message flow of the collaborations in one or more different configurations;
   (b) second means for displaying each class as a corresponding 3D cell positioned within a 3D space; and
   (c) third means for displaying each collaboration as a visual connection between an originating class and a recipient class.

20. The interactive, real-time software tool of claim 19, wherein the first means comprises means for displaying a first configuration wherein an outer shell of each cell is displayed as one or more stacked opaque behavior layers relating to the behaviors of the class corresponding to the cell.

21. The interactive, real-time software tool of claim 20, wherein the means for displaying a first configuration comprises means for labeling each stacked opaque behavior layer.

22. The interactive, real-time software tool of claim 19, wherein the first means comprises means for displaying a second configuration wherein an outer shell of each cell is displayed as a wire frame, an inner core of each cell is displayed as one or more stacked attribute layers relating to the attributes of the class corresponding to the cell, and the outer shell surrounds the inner core.

23. The interactive, real-time software tool of claim 22, wherein the means for displaying a second configuration comprises means for labeling each stacked attribute layer.

24. The interactive, real-time software tool of claim 19, wherein the 3D visual representation means comprises means, operatively coupled to the first means, second means, and third means, for alternatively selecting one of the different configurations for display of the at least one of: the class, the class behavior, the class attribute, the collaboration, and the message flow of the collaborations.

25. The interactive, real-time software tool of claim 19, wherein the 3D visual representation means comprises means, operatively coupled to the second means, for adjusting the position of each cell within the 3D space.

26. The interactive, real-time software tool of claim 19, wherein the 3D visual representation means comprises arrow displaying means, operatively coupled to the third means, for displaying each collaboration with a set of two arrows, each arrow representing a message in the message flow sent between the originating class and the recipient class, the first arrow going from the originating class to the recipient class, and the second arrow going from the recipient class back to the originating class.

27. The interactive, real-time software tool of claim 26, wherein the arrow displaying means comprises means for displaying each arrow as an extruded polygonal shape.

28. The interactive, real-time software tool of claim 26, wherein the arrow displaying means comprises means for displaying the first arrow in a different color than the second arrow.

29. The interactive, real-time software tool of claim 19, wherein the 3D visual representation means comprises perspective displaying means for dynamically presenting the message flow from one or more different perspectives.

30. The interactive, real-time software tool of claim 29, wherein the 3D visual representation means further comprises means, operatively coupled to the perspective displaying means, for alternatively selecting one of the one or more different perspectives for dynamically presenting the message flow.

31. The interactive, real-time software tool of claim 29, wherein the perspective displaying means further comprises means for displaying a perspective as viewing the message flow as a spectator from a stationary vantage point within the 3D space relative to the message flow.

32. The interactive, real-time software tool of claim 29, wherein the perspective displaying means further comprises means for displaying a perspective as viewing the message flow from a leading edge of an active message arrow of the message flow.

33. The interactive, real-time software tool of claim 1, further comprising networking means, operatively coupled to the class-developing means, for permitting multiple users to collaborate in development and visual representation via network technology.

34. The interactive, real-time software tool of claim 1, further comprising distribution means, operatively coupled to the class-developing means, for distributing the representation across a network having a plurality of nodes, each node maintaining one or more of the classes.

35. The interactive, real-time software tool of claim 34, wherein the distribution means comprises means for distributing the representation across a network having a server and a plurality of clients, each client maintaining the class-developing means and the 3D visual representation means, the server maintaining one or more classes.

36. An interactive, real-time software tool, implemented by a computer, for physically transforming an applied object-oriented programming (OOP) based system or process into a visual representation, the software tool comprising:
   (a) class-interactively developing means for developing, in real time, the visual representation which is physically embodied in a computer-readable medium for visualization on a computer display device, the visual representation having at least one of: a class, a class behavior, a class attribute, a collaboration, and a message flow of the collaborations;
   (b) maintaining means, operatively coupled to the class-developing means, for automatically maintaining a common data model of the visual representation in order to simultaneously reflect of development of the common data model throughout the software tool; and
   (c) three-dimensional (3D) visual representation means, operatively coupled to the class-developing means and the maintaining means, for displaying a 3D depiction of the visual representation on the display device.

37. The interactive, real-time software tool of claim 36, wherein the maintaining means is integral to the class-developing means.

38. The interactive, real-time software tool of claim 36, wherein the class-developing means comprises validating means for validating, interactively and in real time the at least one of: the class, the class behavior, the class attribute, the collaboration, and the message flow of the collaborations.

39. The interactive, real-time software tool of claim 36, wherein the software tool further comprises two-dimensional (2D) visual representation means, operatively coupled to the class-developing means, for displaying a 2D depiction of the visual representation on the display device.

40. The interactive, real-time software tool of claim 39, wherein the 2D visual representation means is integral to the class-developing means.

41. The interactive, real-time software tool of claim 39, wherein the 2D visual representation means comprises 2D class-developing means, for developing interactively and in real time, the visual representation as a 2D representation of the at least one of: the class, the class behavior, the class attribute, the collaboration, and the message flow of the collaborations.

42. The interactive, real-time software tool of claim 39, wherein the 2D visual representation means comprises means for editing, interactively and in real time, the at least one of: the class, the class behavior, the class attribute, the collaboration, and the message flow of the collaborations through the use of a 2D visual representation.

43. The interactive, real-time software tool of claim 39, wherein the 2D visual representation means comprises:
  (a) means for displaying each class textually and in a spatial order associated with the message flow; and
  (b) means for displaying each collaboration as a visual connection between an originating class and a recipient class, wherein the collaborations are displayed in a spatial order associated with the message flow.

44. The interactive, real-time software tool of claim 43, wherein the means for displaying each collaboration as a visual connection comprises means for displaying each collaboration with a set of two arrows, the first arrow relating the originating class to the recipient class, and the second arrow relating the recipient class back to the originating class.

45. The interactive, real-time software tool of claim 44, wherein the means for displaying each collaboration with a set of two arrows comprises means for labeling the first arrow with a corresponding behavior of the originating class and the second arrow with a corresponding behavior of the recipient class.

46. The interactive, real-time software tool of claim 44, wherein the means for displaying each collaboration with a set of two arrows comprises means for displaying the first arrow with a single-lined body and the second arrow with a double-lined body.

47. The interactive, real-time software tool of claim 43, wherein the means for displaying each class textually comprises means for displaying the classes from left to right in an order determined by user preference.

48. The interactive, real-time software tool of claim 47, wherein the means for displaying each class textually further comprises means for displaying a corresponding vertical line for each class in order to reinforce the spatial order associated with the message flow in which the classes are displayed.

49. The interactive, real-time software tool of claim 43, wherein the means for displaying each collaboration as a visual connection comprises means for displaying the collaborations from top to bottom in the an order determined by user preference.

50. The interactive, real-time software tool of claim 36, wherein the class-developing means comprises an analysis means for receiving and parsing information from an external source into the at least one of: the class, the class behavior, the class attribute, the collaboration, and the message flow of the collaborations.

51. The interactive, real-time software tool of claim 50, wherein the analysis means comprises:

(a) importing means for importing a text document;
(b) first characterizing means for distinctively characterizing noun statements related to classes;
(c) means, operatively coupled to the importing means and the first characterizing means, for searching the text document for the characterized noun statements and for importing the characterized noun statements as classes;
(d) second characterizing means for distinctively characterizing action statements related to class behaviors; and
(e) means, operatively coupled to the second characterizing means, for searching the text document for the characterized action statements and for importing the characterized action statements as class behaviors.

52. The interactive, real-time software tool of claim 36, wherein the 3D visual representation means comprises 3D class-developing means, for developing, interactively and in real time, the visual representation as a 3D representation of the at least one of: the class, the class behavior, the class attribute, the collaboration, and the message flow of the collaborations.

53. The interactive, real-time software tool of claim 36, wherein the 3D visual representation means comprises means for editing, interactively and in real time, the visual representation as a 3D representation of the at least one of: the class, the class behavior, the class attribute, the collaboration, and the message flow of the collaborations through the use of a 3D visual representation.

54. The interactive, real-time software tool of claim 36, wherein the 3D visual representation means comprises means for displaying each class as a corresponding 3D cell model on the display device.

55. The interactive, real-time software tool of claim 36, wherein the 3D visual representation means comprises:
  (a) first means for displaying the at least one of: the class, the class behavior, the class attribute, the collaboration, and the message flow of the collaborations in one or more different configurations;
  (b) second means for displaying each class as a corresponding 3D cell positioned within a 3D space; and
  (c) third means for displaying each collaboration as a visual connection between an originating class and a recipient class.

56. The interactive, real-time software tool of claim 55, wherein the first means comprises means for displaying a first configuration wherein an outer shell of each cell is displayed as one or more stacked opaque behavior layers relating to the behaviors of the class corresponding to the cell.

57. The interactive, real-time software tool of claim 56, wherein the means for displaying a first configuration comprises means for labeling each stacked opaque behavior layer.

58. The interactive, real-time software tool of claim 55, wherein the first means comprises means for displaying a second configuration wherein an outer shell of each cell is displayed as a wire frame, an inner core of each cell is displayed as one or more stacked attribute layers relating to the attributes of the class corresponding to the cell, and the outer shell surrounds the inner core.

59. The interactive, real-time software tool of claim 58, wherein the means for displaying a second configuration comprises means for labeling each stacked attribute layer.

60. The interactive, real-time software tool of claim 55, wherein the 3D visual representation means comprises means, operatively coupled to the first means, second means, and third means, for alternatively selecting one of the different configurations for display of the at least one of: the class, the class behavior, the class attribute, the collaboration, and the message flow of the collaborations.

61. The interactive, real-time software tool of claim 55, wherein the 3D visual representation means comprises means, operatively coupled to the second means, for adjusting the position of each cell within the 3D space.

62. The interactive, real-time software tool of claim 55, wherein the 3D visual representation means comprises arrow displaying means, operatively coupled to the third means, for displaying each collaboration with a set of two arrows, each arrow representing a message in the message flow sent between the originating class and the recipient class, the first arrow going from the originating class to the recipient class, and the second arrow going from the recipient class back to the originating class.

63. The interactive, real-time software tool of claim 62, wherein the arrow displaying means comprises means for displaying each arrow as an extruded polygonal shape.

64. The interactive, real-time software tool of claim 62, wherein the arrow displaying means comprises means for displaying the first arrow in a different color than the second arrow.

65. The interactive, real-time software tool of claim 55, wherein the 3D visual representation means comprises perspective displaying means for dynamically presenting the message flow from one or more different perspectives.

66. The interactive, real-time software tool of claim 65, wherein the 3D visual representation means further comprises means, operatively coupled to the perspective displaying means, for alternatively selecting one of the one or more different perspectives for dynamically presenting the message flow.

67. The interactive, real-time software tool of claim 65, wherein the perspective displaying means further comprises means for displaying a perspective as viewing the message flow as a spectator from a stationary vantage point within the 3D space relative to the message flow.

68. The interactive, real-time software tool of claim 65, wherein the perspective displaying means further comprises means for displaying a perspective as viewing the message flow from a leading edge of an active message arrow of the message flow.

69. The interactive, real-time software tool of claim 36, further comprising networking means, operatively coupled to the class-developing means, for permitting multiple users to collaborate in development and visual representation via network technology.

70. The interactive, real-time software tool of claim 36, further comprising distribution means, operatively coupled to the class-developing means, for distributing the representation across a network having a plurality of nodes, each node maintaining one or more of the classes.

71. The interactive, real-time software tool of claim 70, wherein the distribution means comprises means for distributing the representation across a network having a server and a plurality of clients, each client maintaining the object-developing means and the 3D visual representation means, the server maintaining one or more classes.

72. An interactive, real-time software tool, implemented by a computer, for physically transforming an abstract system or process into a visual representation, the software tool comprising:
(a) developing means for intractively developing, in real time, the visual representation which is physically embodied in a computer-readable medium for visualization on a computer display device, the visual representation having at least one of: an element, a quality of an element, and an interrelation relating an element with one or more other elements; and
(b) three-dimensional (3D) visual representation means, operatively coupled to the developing means, for displaying a 3D depiction of the visual representation on the display device.

73. The interactive real-time software tool of claim 72, wherein the software tool further comprises two-dimensional (2D) visual representation means, operatively coupled to the developing means, for displaying a 2D depiction of the visual representation on the display device.

74. The interactive, real-time software tool of claim 73, wherein the 2D visual representation means is integral to the developing means.

75. The interactive, real-time software tool of claim 72, wherein the developing means further comprising an analysis means , for receiving and parsing information from an external source into the at least one of: the element, the quality, and the interrelation.

76. The interactive, real-time software tool of claim 72, wherein the abstract system or process is chosen from the following set of abstract system or processes: a business process, a database, a network architecture, and a client-server architecture.

77. An interactive, real-time software tool, implemented by a computer, for physically transforming an abstract system or process into a visual representation, the software tool comprising:
(a) developing means for interactively developing, in real time, the visual representation which is physically embodied in a computer-readable medium for visualization on a computer display device, the visual representation having at least one of: an element, a quality of an element, and an interrelation relating an element with one or more other elements;
(b) maintaining means, operatively coupled to the developing means, for automatically maintaining a common data model of the visual representation in order to simultaneously reflect of development of the common data model throughout the software tool; and
(c) three-dimensional (3D) visual representation means, operatively coupled to the developing means and the maintaining means, for displaying a 3D depiction of the visual representation on the display device.

78. The interactive, real-time software tool of claim 77, wherein the maintaining means is integral to the developing means.

79. The interactive, real-time software tool of claim 77, wherein the software tool further comprises two-dimensional (2D) visual representation means, operatively coupled to the developing means, for displaying a 2D depiction of the visual representation on the display device.

80. The interactive, real-time software tool of claim 79, wherein the 2D visual representation means is integral to the developing means.

81. The interactive, real-time software tool of claim 77, wherein the developing means further comprising an analysis means, for receiving and parsing information from an external source into the at least one of: the element, the quality, and the interrelation.

82. A computer-implemented method for physically transforming an applied object-oriented programming (OOP) system or process into a visual representation, the computer-implemented method comprising steps of:
(a) developing, interactively and in real time through computer control, the visual representation which has at least one of: a class, a class behavior, a class attribute, a collaboration, and a message flow of the collaborations; and (b) displaying a three-dimensional (3D) depiction of the visual representation to a user.

83. The method of claim 82 further comprising a step of automatically maintaining a common data model of the visual representation in order to simultaneously reflect development of the common data model throughout other related visual representations.

84. The method of claim 82 further comprising a step of displaying a two dimensional (2D) depiction of the visual representation to the user.

85. The method of claim 82 further comprising a step of editing, interactively and in real time, the at least one of: the class, the class behavior, the class attribute, the collaboration, and the message flow of the collaborations through the use of the visual representation.

86. The method of claim 82 further comprising a step of receiving and parsing information from an external source into the at least one of: the class, the class behavior, the class attribute, the collaboration, and the message flow of the collaborations.

87. A computer-implemented method for physically transforming an abstract system or process into a visual representation, the computer-implemented method comprising steps of:

(a) developing, interactively and in real time through computer control, the visual representation which has at least one of: an element, a quality of an element, and an interrelation relating an element with one or more other elements; and (b) displaying a three-dimensional (3D) depiction of the visual representation to a user.

88. The method of claim 87 further comprising a step of automatically maintaining a common data model of the visual representation in order to simultaneously reflect development of the common data model throughout other related visual representations.

89. The method of claim 87 further comprising a step of displaying a two dimensional (2D) depiction of the visual representation to the user.

90. The method of claim 87 further comprising a step of editing, interactively and in real time, the at least one of: t the element, the quality, and the interrelation through the use of the visual representation.

91. The method of claim 87 further comprising a step of receiving and parsing information from an external source into the at least one of: the element, the quality, and the interrelation.

92. A program storage device readable by a computer system tangibly embodying a program of instructions executable by the computer system to physically transform an applied object-oriented programming (OOP) system or process into a visual representation, the method comprising steps of:

(a) developing, interactively and in real time through computer control, the visual representation which has at least one of: a class, a class behavior, a class attribute, a collaboration, and a message flow of the collaborations; and (b) displaying a three-dimensional (3D) depiction of the visual representation to a user.

93. The program storage device of claim 92 wherein the method further comprises a step of automatically maintaining a common data model of the visual representation in order to simultaneously reflect development of the common data model throughout other related visual representations.

94. The program storage device of claim 92 wherein the method further comprises a step of displaying a two dimensional (2D) depiction of the visual representation to the user.

95. The program storage device of claim 92 wherein the method further comprises a step of editing, interactively and in real time, the at least one of: the class, the class behavior, the class attribute, the collaboration, and the message flow of the collaborations through the use of the visual representation.

96. The program storage device of claim 92 wherein the method further comprises a step of receiving and parsing information from an external source into the at least one of: the class, the class behavior, the class attribute, the collaboration, and the message flow of the collaborations.

97. A program storage device readable by a computer system tangibly embodying a program of instructions executable by the computer system to physically transform an abstract system or process into a visual representation, the method comprising steps of:

(a) developing, interactively and in real time through computer control, the visual representation which has at least one of: an element, a quality of an element, and an interrelation relating an element with one or more other elements; and (b) displaying a three-dimensional (3D) depiction of the visual representation to a user.

98. The program storage device of claim 97 wherein the method further comprises a step of automatically maintaining a common data model of the visual representation in order to simultaneously reflect development of the common data model throughout other related visual representations.

99. The program storage device of claim 97 wherein the method further comprises a step of displaying a two dimensional (2D) depiction of the visual representation to the user.

100. The program storage device of claim 97 wherein the method further comprises a step of editing, interactively and in real time, the at least one of: the element, the quality, and the interrelation through the use of the visual representation.

101. The program storage device of claim 97 wherein the method further comprises a step of receiving and parsing information from an external source into the at least one of: the element, the quality, and the interrelation.

\* \* \* \* \*

UNITED STATES PATENT AND TRADEMARK OFFICE
CERTIFICATE OF CORRECTION

PATENT NO. : 5,838,973
DATED : November 17, 1998
INVENTOR(S) : Carpenter-Smith et al.

It is certified that error appears in the above-identified patent and that said Letters Patent is hereby corrected as shown below:

Title page,
Item [75] Inventors: "El Grove" should read -- Elk Grove --

Column 2,
Line 61: insert a new paragraph at "FIG. 24..."

Column 35,
Line 24, claim 1: "class-interactively developing means for developing" should read -- class-developing means for interactively developing --

Column 38,
Line 41, claim 36: "class-interactively developing means for developing" should read -- class-developing means for interactively developing --

Signed and Sealed this

Thirty-first Day of July, 2001

Attest:

NICHOLAS P. GODICI
Attesting Officer  Acting Director of the United States Patent and Trademark Office